United States Statutory Invention Registration [19]

[11] Reg. Number: H963

Hirai et al. [43] Published: Sep. 3, 1991

[54] COLOR LIGHT-SENSITIVE MATERIAL

[75] Inventors: Hiroyuki Hirai; Keizo Furuya; Koki Nakamura, all of Ashigara, Japan

[73] Assignee: Fuji Photo Film Co., Ltd., Kanagawa, Japan

[21] Appl. No.: 415,483

[22] Filed: Oct. 2, 1989

Related U.S. Application Data

[63] Continuation of Ser. No. 127,841, Dec. 2, 1987, abandoned.

[30] Foreign Application Priority Data

Dec. 2, 1986 [JP] Japan ..... 61-287455
Apr. 3, 1987 [JP] Japan ..... 62-82284

[51] Int. Cl.[5] ..... G03C 5/54; G03C 7/26

[52] U.S. Cl. ..... 430/559; 430/219; 430/223; 430/957

[58] Field of Search ..... 430/223, 219, 218, 505, 430/544, 564, 239, 240, 242, 955, 957, 958

[56] References Cited

U.S. PATENT DOCUMENTS

| | | | |
|---|---|---|---|
| 4,139,379 | 2/1979 | Chasman et al. | 430/223 |
| 4,199,355 | 4/1980 | Hinshaw et al. | 430/219 |
| 4,232,107 | 11/1980 | Janssens | 430/218 |
| 4,371,604 | 2/1983 | Van de Sande et al. | 430/223 |
| 4,584,257 | 4/1986 | Okamura et al. | 430/957 |
| 4,678,739 | 7/1987 | Kitaguchi et al. | 430/351 |
| 4,695,525 | 9/1987 | Tsukase et al. | 430/353 |
| 4,740,453 | 4/1988 | Nakamura et al. | 430/957 |
| 4,783,396 | 11/1988 | Nakamura et al. | 430/353 |

FOREIGN PATENT DOCUMENTS 0220746 5/1987 European Pat. Off. .

*Primary Examiner*—Robert L. Stoll
*Assistant Examiner*—Joseph D. Anthony
*Attorney, Agent, or Firm*—Sughrue, Mion, Zinn, Macpeak & Seas

[57] ABSTRACT

A color light-sensitive material is provided, comprising on a support at least a light-sensitive silver halide, a binder, a dye providing substance which provides a mobile dye in inverse-relationship to the reduction reaction of silver ion to silver, and a development inhibitor precursor of the general formula (I):

$$\text{PWR—Time—}_t\text{AF} \qquad \text{(I)}$$

wherein PWR represents a group which releases (Time—hd tAF by being reduced; AF represents a group which serves as a development inhibitor after being released; Time represents a group which releases AF through a reaction following the release of —Time—$_t$AF from PWR; and t represents an integer of 0 or 1.

In a preferred embodiment, the compound of the general formula (I) is represented by the general formula (II):

(II)

In another embodiment, the compound of the general formula (II) is represented by the general formula (III):

(III)

10 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COLOR LIGHT-SENSITIVE MATERIAL

This is a continuation of application Ser. No. 07/127,841, filed Dec. 2, 1987, now abandoned.

FIELD OF THE INVENTION

The present invention relates to a color light-sensitive material. More particularly, the present invention relates to a color light-sensitive material which can be effectively used to provide a positive dye image in a diffusion transfer process.

BACKGROUND OF THE INVENTION

Various attempts have heretofore been made to prepare a color light-sensitive material capable of providing a positive dye image in a diffusion transfer process. U.S. Pat. Nos. 3,209,016, 3,362,819, 3,597,200, 3,544,545, and 3,482,972, and Japanese Patent Application (OPI) No. 165054/84 describe processes which comprise formation of a positive dye image in a wet development process or heat development process using a color developing agent. Japanese Patent Application (OPI) Nos. 63618/76, 69033/78, 130927/79, 111628/74, 4819/77, and 152440/84 (the term "OPI" as used herein means an "unexamined published application") describe processes which comprise formation of a positive dye image in a wet development process or heat development process using a reductive nondiffusible, dye providing substance which releases a mobile dye under an alkaline condition and/or under heating but which does not release the dye upon reaction with exposed silver halide. Japanese Patent Application (OPI) Nos. 35533/78, 110827/78, 130927/79, 164342/81, and 154445/84, European Patent 220746A, and U.S. Pat. Nos. 4,356,249 and 4,358,525 disclose processes which comprise formation of a positive dye image in a wet development process or heat development process using a nondiffusible, dye providing substance which releases a mobile dye upon reduction by a reductive substance (electron donor and/or electron transfer agent).

However, these known positive dye image formation processes have a disadvantage in recognition of image. That is, these processes can provide only a positive dye image having a low density and a high stain.

SUMMARY OF THE INVENTION

It is therefore an object of the invention to provide a color light-sensitive material capable of providing a high image density and low stain positive dye image which can be well recognized.

The above and other objects of the present invention will become more apparent from the following detailed description and examples.

These objects of the present invention are accomplished with a color light-sensitive material, comprising on a support at least a light-sensitive silver halide, a binder, a dye providing substance which provides a mobile dye in inverse-relationship to the reduction reaction of silver ion to silver, and a development inhibitor precursor of the general formula (I):

$$\text{PWR}\text{-}(\text{Time})_t\text{AF} \qquad \text{(I)}$$

wherein PWR represents a group which releases $(\text{Time})_t$AF upon being reduced; AF represents a group which serves as a development inhibitor after being released; Time represents a group which releases AF through a reaction following the release of $(\text{Time})_t$AF from PWR; and t represents an integer of 0 to 1.

DETAILED DESCRIPTION OF THE INVENTION

PWR will be first described in detail hereinafter.

PWR may correspond to a portion containing an electron accepting center and an intramolecular nucleophilic displacement reaction center in a compound which undergoes an intramolecular nucleophilic displacement reaction after being reduced to release a photographic reagent as disclosed in U.S. Pat. Nos. 4,139,389 and 4,139,379 and Japanese Patent Application (OPI) No. 189333/84; a portion containing an electron accepting quinonoid center and a carbon atom which binds the electron accepting quinonoid center to a photographic reagent in a compound which undergoes an intramolecular electron migration reaction after being reduced to release the photographic reagent as disclosed in U.S. Pat. No. 4,232,107 and Japanese Patent Application (OPI) Nos. 101649/84 and 88257/86; a portion containing an aryl group substituted by an electrophilic group and an atom which binds the aryl group to a photographic reagent (e.g., sulfur atom, carbon atom, or nitrogen atom) in a compound which undergoes cleavage of single bond after being reduced to release the photographic reagent as disclosed in Japanese Patent Application (OPI) No. 142530/81 and U.S. Pat. Nos. 4,343,893 and 4,619,884; a portion containing a nitro group and a carbon atom which binds the nitro group to a photographic reagent in a compound which releases the photographic reagent after accepting electrons as disclosed in U.S. Pat. No. 4,450,223; or a portion containing a dieminaldinitro portion and a carbon atom which binds the dieminaldinitro portion to a photographic reagent in a dinitro compound which undergoes $\beta$-release of the photographic reagent after accepting electrons as disclosed in U.S. Pat. No. 4,609,610. However, compounds represented by the following general formula (II) are preferred.

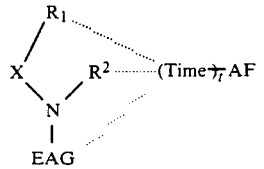

(II)

In the general formula (II),

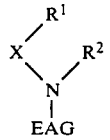

corresponds to PWR. $(\text{Time})_t$AF is bonded to at least one of $R^1$, $R^2$, and EAG.

The portion corresponding to PWR in the general formula (II) will be further described hereinafter.

X represents an oxygen atom (—O—), a sulfur atom (—S—), or a nitrogen atom-containing group

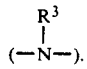

$R^1$, $R^2$ and $R^3$ each represents a group other than a hydrogen atom, or a mere bond.

$R^1$ and $R^3$ each are preferably a substituted or unsubstituted alkyl group, aryl group, heterocyclic residual group, acyl group, or sulfonyl group.

$R^2$ is preferably a substituted or unsubstituted acyl group or sulfonyl group. Any two of $R^1$, $R^2$, and $R^3$ may be bonded to each other to form a 5-membered to 8-membered ring.

The solid lines indicate a bond; and the broken lines indicate that at least one thereof represents a bond.

EAG will be described later.

Among those compounds represented by the general formula (II), compounds represented by the general formula (III) are preferred.

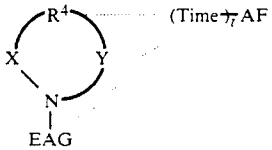

(III)

In the general formula (III),

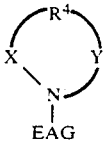

corresponds to PWR. (Time $\rightarrow_t$AF is bonded to at least one of $R^4$ and EAG. The portion corresponding to PWR in the general formula (III) will be further described hereinafter. Y represents a divalent linking group which is preferably

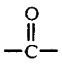

or $-SO_2-$. X is as described above and preferably represents an oxygen atom.

$R^4$ represents an atomic group which is bonded to X and Y to form a 5-membered to 8-membered monocyclic or fused heterocyclic ring containing nitrogen atoms.

Preferred examples of portions corresponding to

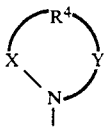

and sites at which $\leftarrow$Time$\rightarrow_t$AF may be bonded will be shown hereafter.

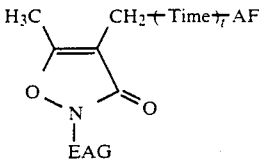

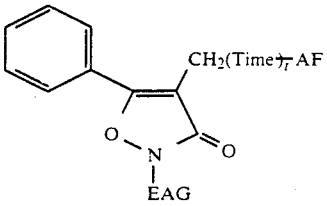

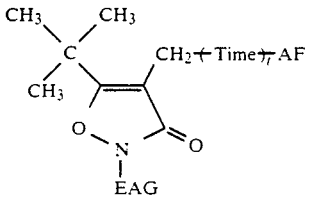

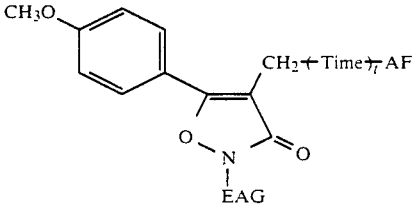

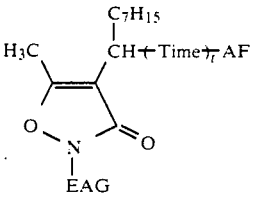

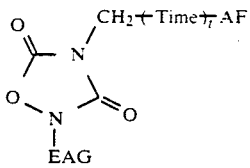

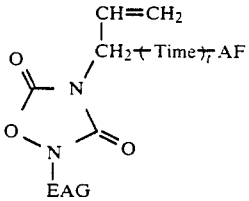

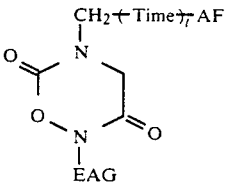

-continued
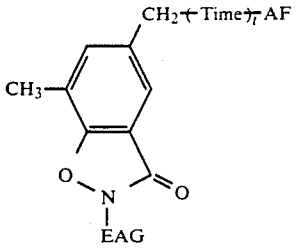
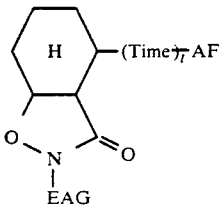
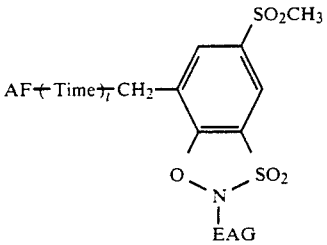
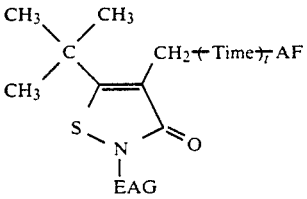
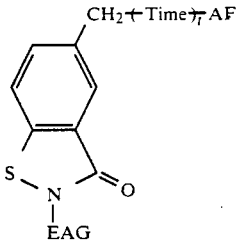
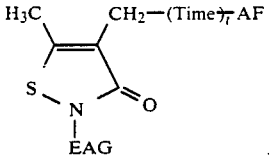
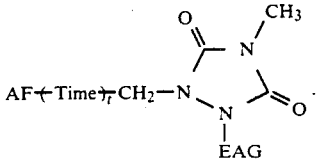
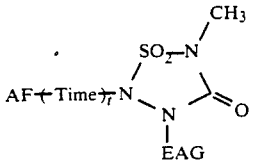
-continued
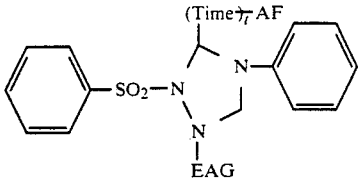
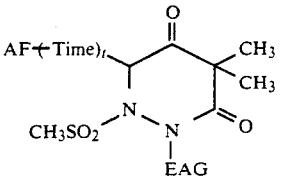
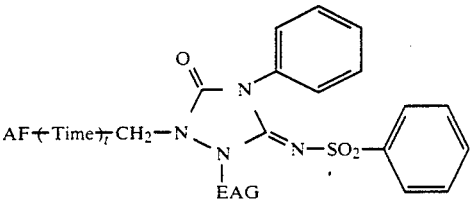
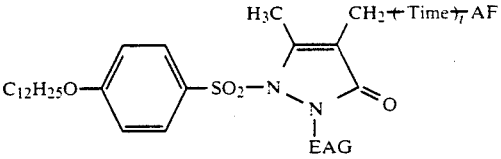
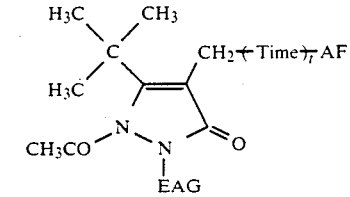
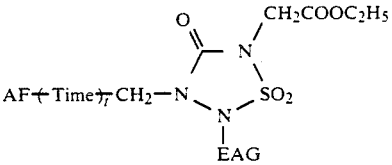
As EAG there may preferably be used a group represented by the general formula (A) or (B):
(A)
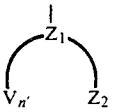
(B)
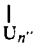
In the general formula (A), $Z_1$ represents
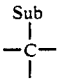
or —N<.

$V_n'$ represents an atomic group which forms a 3-membered to 8-membered ring together with $Z_1$ and $Z_2$. The suffix n' represents an integer of 3 to 8. In the case of $V_3$, $V_4$, $V_5$, $V_6$, $V_7$, and $V_8$, $V_n'$ represents $—Z_3—$, $—Z_3—Z_4—$, $—Z_3—Z_4—Z_5—$, $—Z_3—Z_4—Z_5—Z_6—$, $—Z_3—Z_4—Z_5—Z_6—Z_7—$, and $—Z_3—Z_4—Z_5—Z_6—Z_7—Z_8—$, respectively. $Z_2$ to $Z_8$ each represents

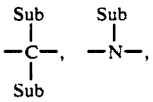

—O—, —S—, or $—SO_2—$, wherein Sub represents a mere bond ($\pi$ bond), hydrogen atom, or substituent as described hereinafter. These groups represented by Sub may be the same or different and may from 3-membered to 8-membered saturated or unsaturated carbon rings or heterocycles which may be bonded to each other. In the general formula (A), Sub is selected such that the sum total of the Hammet's substituent constant $\sigma p$ of the substituents is +0.09 or more, preferably +0.3 or more, particularly +0.45 or more.

In the general formula (B), n'' represents an integer of 1 to 6. In the case of $U_1$, $U_2$, $U_3$, $U_4$, $U_5$, and $U_6$, $U_n''$ represents $—Y_1$, $—Y_1—Y_2$, $—Y_1—Y_2—Y_3$, $—Y_1—Y_2—Y_3—Y_4$, $—Y_1—Y_2—Y_3—Y_4—Y_5$, and $—Y_1—Y_2—Y_3—Y_4—Y_5—Y_6$, respectively. $Y_1$ to $Y_6$ each represents

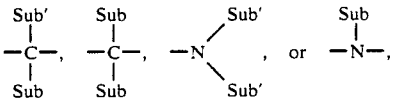

wherein Sub' represents a mere bond ($\delta$ bond or $\pi$ bond), hydrogen atom, or substituent as described hereinafter In the general formula (B), Sub' is selected such that the sum total of the Hammett's substituent constant $\sigma p$ of the substituents is +0.09 or more, preferably +0.3 or more, particularly +0.45 or more.

Examples of the substituents represented by Sub include substituted or unsubstituted alkyl groups, such as a methyl group, an ethyl group, a sec-butyl group, a t-octyl group, a benzyl group, a cyclohexyl group, a chloromethyl group, a dimethylaminomethyl group, a n-hexadecyl group, a trifluoromethyl group, a 3,3,3-trichloropropyl group, and a methoxycarbonylmethyl group; substituted or unsubstituted alkenyl groups, such as a vinyl group, a 2-chlorovinyl group, and a 1-methylvinyl group; substituted or unsubstituted alkynyl groups, such as an ethynyl group and a 1-propynyl group; a cyano group; a nitro group; halogen atoms, such as fluorine, chlorine, bromine, and iodine; substituted or unsubstituted heterocyclic residual groups, such as a 2-pyridyl group, a 1-imidazolyl group, a benzothiazole-2-yl group, a morpholino group, and a benzoxazole 2 yl group; a sulfo group; a carboxyl group; substituted or unsubstituted aryloxycarbonyl or alkoxycarbonyl groups, such as a methoxycarbonyl group, an ethoxycarbonyl group, a tetradecyloxycarbonyl group, a 2-methoxylethycarbonyl group, a phenoxycarbonyl group, a 4-cyanophenylcarbonyl group, and a 2-chlorophenoxycarbonyl group; substituted or unsubstituted carbamoyl groups, such as a carbamoyl group, a methylcarbamoyl group, a diethylcarbamoyl group, a methylhexadecylcarbamoyl group, a methyloctadecylcarbamoyl group, a phenylcarbamoyl group, a 2,4,6-trichlorocarbamoyl group, an N-ethyl-N-phenylcarbamoyl group, and a 3-hexadecylsulfamoylphenylcarbamoyl group; a hydroxyl group; substituted or unsubstituted azo groups, such as a phenylazo group, a p methoxyphenylazo group, and a 2-cyano-4-methanesulfonylphenylazo group; substituted or unsubstituted aryloxy or alkoxy groups, such as a methoxy group, an ethoxy group, a dodecyloxy group, a benzyloxy group, a phenoxy group, a 4-methoxyphenoxy group, a 3-acetylaminophenoxy group, a 3-methoxycarbonylpropyloxy group, and a 2-trimethylammonioethoxy group; a sulfino group; a sulfeno group; a mercapto group; substituted or unsubstituted acyl groups, such as an acetyl group, a trifluoroacetyl group, an n-butyloyl group, a t-butyloyl group, a benzoyl group, a 2-carboxybenzoyl group, a 3-nitrobenzoyl group, and a formyl group; substituted or unsubstituted aryl or alkylthio groups, such as a methylthio group, an ethylthio group, a t-octylthio group, a hexadecylthio group, a phenylthio group, a 2,4,5-trichlorothio group, a 2-methoxy-5-t octylphenylthio group, and a 2-acetylaminophenylthio group; substituted or unsubstituted aryl groups such as a phenyl group, a naphthyl group, a 3-sulfophenyl group, a 4-methoxyphenyl group and a 3-laurylaminophenyl group; substituted or unsubstituted sulfonyl groups such as a methylsulfonyl group, a chloromethylsulfonyl group, an n-octylsulfonyl group, an n-hexadecylsulfonyl group, a sec-octylsulfonyl group, a p-toluenesulfonyl group, a 4-chlorophenylsulfonyl group, a 4-dodecylphenylsufonyl group, a 4-dodecyloxyphenylsulfonyl group, and a 4-nitrophenylsufonyl group; substituted or unsubstituted sulfinyl groups, such as a methylsulfinyl group, a dodecylsulfinyl group, a phenylsulfinyl group, and a 4-nitrophenylsulfinyl group substituted or unsubstituted amino groups, such as a methylamino group, a diethylamino group, a methyloctadecylamino group, a phenylamino group, an ethylphenylamino group, a 3-tetradecylsulfamoylphenylamino group, an acetylamino group, a trifluoroacetylamino group, an N-hexadecylacetylamino group, an N-methylbenzoylamino group, a methoxycarbonylamino group, a phenoxycarbonylmethyl group, an N-methoxyacetylamino group, an amidiamino group, a phenylaminocarbonylamino group, a 4-cyanophenylaminocarbonylamino group, an N-ethylethoxycarbonylamino group, an N-methyldodecylsulfonylamino group, an N-(2-cyanoethyl)-p-toluenesulfonylamino group, and a hexadecylsulfonylamino group; substituted or unsubstituted sulfamoyl groups, such as a dimethylsulfamoyl group, a hexadecylsulfamoyl group, a sulfamoyl group, a methyloctadecylsulfamoyl group, a methylhexadecylsulfamoyl group, a 2-cyanoethylhexadecylsulfamoyl group, a phenylsulfamoyl group, an N-(3,4-dimethylphenyl)-N-octylsulfamoyl group, a dibutylsulfamoyl group, a dioctadecylsulfamoyl group, and a bis(2-methoxycarbonyl)sulfamoyl group; substituted or unsubstituted acyloxy groups, such as an acetoxy group, a benzoyloxy group, a decyloyloxy group, and a chloroacetoxy group; and substituted or unsubstituted sulfonyloxy groups such as a methylsulfonyloxy group, a p-toluenesulfonyloxy group, and a p-chlorophenylsulfonyloxy group. These groups may preferably contain 0 to 40 carbon atoms.

Specific examples of EAG include aryl groups substituted by at least one electrophilic group, such as a 4-nitrophenyl group, a 2-nitro-4-N-methyl-N-octadecylsulfamoylphenyl group, a 2-N,N-dimethylsulfamoyl-4-nitrophenyl group, a 2-cyano-4-octadecylsulfonylphenyl group, a 2,4-dinitrophenyl group, a 2,4,6-tricyanophenyl group, a 2-nitro-4-N-methyl-N-octadecylcarbamoylphenyl group, a 2-nitro-5-octylthiophenyl group, a 2,4-dimethanesulfonylphenyl group, a 3,5-dinitrophenyl group, a 2-chloro-4-nitro 5-methylphenyl group, a 2-nitro-3,5-dimethyl-4-tetradecylsulfonylphenyl group, a 2,4-dinitronaphthyl group, a 2-ethylcarbamoyl-4-nitrophenyl group, a 2,4-bisdodecylsulfonyl5-trifluoromethylphenyl group, a 2,3,4,5,6-pentafluorophenyl group, a 2-acetyl-4-nitrophenyl group, a 2,4-diacetylphenyl group, and a 2-nitro-4-trifluoromethylphenyl group; substituted or unsubstituted heterocyclic rings, such as a 2-pyridyl group, a 2-pyradyl group, a 5-nitro-2-pyridyl group, a 5-N-hexadecylcarbamoyl-2-pyridyl group, a 4-pyridyl group, a 3,5-dicyano-2-pyridyl group, a 5-dodecylsulfonyl-2-pyridyl group, a 5-cyano-2-pyradyl group, a 4-nitrothiophene-2-yl group, a 5-nitro1,2-dimethylimidazole-4-yl group, a 3,5-diacetyl-2-pyridyl group, and a 1-dodecyl-5-carbamoylpyridinium-2-yl group; and substituted or unsubstituted quinones such as a 1,4-benzoquinone-2-yl group, a 3,5,6-trimethyl-1,4-benzoquinone-2-yl group, a 3-methyl-1,4-naphthoquinone-2-yl group, a 3,6-dimethyl-5-hexadecylthio-1,4-benzoquinone-2-yl group, and a 5-pentadecyl-1,2-benzoquinone-4-yl group. Besides the above described vinylogs there can be used nitroalkanes and $\alpha$-diketo compounds.

$\text{(Time)}_t$AF will be further described hereinafter.

Time represents a group which releases AF through a reaction triggered by cleavage of a nitrogen-oxygen single bond. The suffix t represents 0 or 1.

As groups represented by Time there have been known various groups as described in Japanese Patent Application (OPI) Nos. 147244/86 and 236549/86.

As development inhibitors represented by AF there may be used compounds containing mercapto groups bonded to heterocycles. Examples of such compounds include substituted or unsubstituted mercaptoazoles, such as 1-phenyl-5-mercaptotetrazole, 1-(4 carboxyphenyl)-5-mercaptotetrazole, 1-(3-hydroxyphenyl)-5-mercaptotetrazole, 1-(4-sulfophenyl)-5-mercaptotetrazole, 1-(3-sulfophenyl)-5-mercaptotetrazole, 1-(4-sulfamoylphenyl)-5-mercaptotetrazole, 1-(3-hexanoylaminophenyl)-5-mercaptotetrazole, 1-ethyl-5-mercaptotetrazole, 1-(2-carboxyethyl) -5-mercaptotetrazole, 2-methylthio 5-mercapto 1,3,4-thiadiazole, 2-(2-carboxylethylthio)-5-mercapto 1,3,4-thiadiazole, 3-methyl-4-phenyl-5-mercapto-1,2,4-triazole, 2-(2-dimethylaminoethylthio)-5-mercapto-1,3,4-thiadiazole, 1-(4-n-hexylcarbamoylphenyl)-2-mercaptoimdazole, 3-acetylamino-4-methyl-5-mercapto-1,2,4-triazole, 2-mercaptobenzoxazole, 2-mercaptobenzimidazole, 2-mercaptobenzothiazole, 2-mercapto 6-nitro-1,3-benzoxazole, 1-(1-naphthyl)-5-mercaptotetrazole, 2-phenyl-5-mercapto-1,3,4-oxadiazole, 1-[3-(3-methylureido)-phenyl]-5-mercaptotetrazole, 1-(4-nitrophenyl)-5-mercaptotetrazole, and 5-(2-ethylhexanoylamino)-2-mercaptobenzimidazole; substituted or unsubstituted mercaptoazaindenes, such as 6-methyl-4-mercapto- 1,3,3a,7-tetrazaindene, 6-methyl-2-benzyl-4-mercapto-1,3,3a,7-tetrazaindene, 6-phenyl-4-mercaptotetrazaindene, and 4,6-dimethyl-2-mercapto-1,3,3a,7-tetrazaindene; and substituted or unsubstituted mercaptopyrimidines, such as 2-mercaptopyrimidine, 2-mercapto 4-methyl-6-hydroxypyrimidine, and 2 mercapto-4-propylpyrimidine. As other development inhibitors represented by AF there may be used heterocyclic compounds capable of producing imino silver. Examples of such compounds include substituted or unsubstituted benzotriazoles, such as benzotriazole, 5-nitrobenzotriazole, 5-methylbenzotriazole, 5,6-dichlorobenzotriazole, 5-bromobenzotriazole, 5-methoxybenzotriazole, 5-acetylaminobenzotriazole, 5-n-butylbenzotriazole, 5-nitro 6-chlorobenzotriazole, 5,6-dimethylbenzotriazole, and 4,5,6,7-tetrachlorobenzotriazole; substituted or unsubstituted indazoles, such as indazole, 5-nitroindazole, 3-nitroindazole, 3-chloro-5-nitroindazole, 3-cyano indazole, 3-n-butylcarbamoylindazole, and 5-nitro-3-methanesulfonylindazole; and substituted or unsubstituted benzimidazoles, such as 5-nitrobenzimidazole, 4-nitrobenzimidazole, 5,6-dichlorobenzimidazole, 5-cyano 6-chlorobenzimidazole, and 5-trifluoromethyl-6-chlorobenzimidazole. Such a development inhibitor may be one which is released from an oxidation-reduction nucleus in the general formula (I) by a reaction following an oxidation-reduction reaction in the development step, and then becomes a development inhibiting compound which will then be converted to a compound having substantially no development inhibiting effect or remarkably small development inhibiting effect.

Specific examples of such a development inhibitor include 1-(3-phenoxycarbonylphenyl)-5-mercaptotetrazole, 1-(4-phenoxycarbonylphenyl)-5-mercaptotetrazole, 1-(3-maleimidophenyl)-5-mercaptotetrazole, 5-(phenoxycarbonyl)benzotriazole, 5-(p-cyanophenoxycarbonyl)benzotriazole, 2-phenoxycarbonylmethylthio-5-mercapto-1,3,4-thiadiazole, 5-nitro-3-phenoxycarbonylindazole, 5-phenoxycarbonyl-2-mercaptobenzimidazole, 5-(2,3-dichloropropyloxycarbonyl)benzotriazole, 5-benzyloxycarbonylbenzotriazole, 5-(butylcarbamoylmethoxycarbonyl)benzotriazole, 5-(butoxycarbonylmethoxycarbonyl)benzotriazole, 1-(4-benzoyloxyphenyl)-5-mercaptotetrazole, 5-(2-methanesulfonylethoxycarbonyl)-2-mercaptobenzothiazole, 1-[4-(2-chloroethoxycarbonyl)phenyl]-2-mercaptoimidazole, 2-[3-{thiophene-2-yl-carbonyl}propyl]thio-5-mercapto-1,3,4-thiadiazole, 5-cinnamoylaminobenzotriazole, 1-(3-vinylcarbonylphenyl)-5-mercaptotetrazole, 5-succinimidomethylbenzotriazole, 2-[4-succinimidophenyl]-5-mercapto-1,3,4-oxadiazole, 3-[4- benzo-1,2-isothiazole-3-oxo-1,1-dioxy-2-yl)phenyl]-5-mercapto-4-methyl-1,2,4-triazole, and 6-phenoxycarbonyl 2-mercaptobenzoxazole.

These development inhibitors may be bonded to Time, $R^1$, $R^2$, $R^3$, $R^4$, or EAG via a portion of development inhibitor which serves to inhibit upon release (e.g. S atom in —SH, and N atom in an amino group).

Specific examples of the development inhibitors according to the present invention represented by the general formula (I) are shown below.

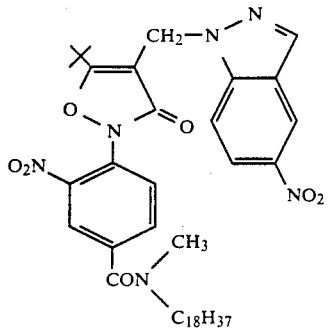
AF-1
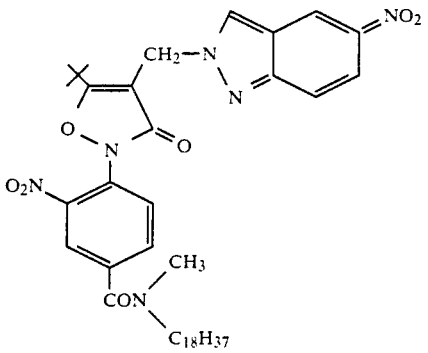
AF-2
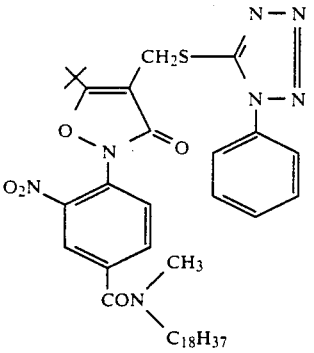
AF-3
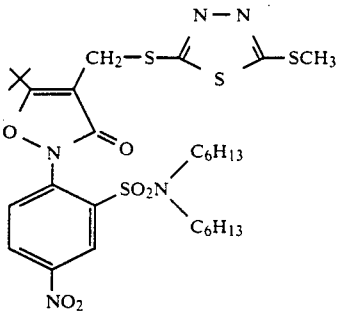
AF-4

-continued
AF-5
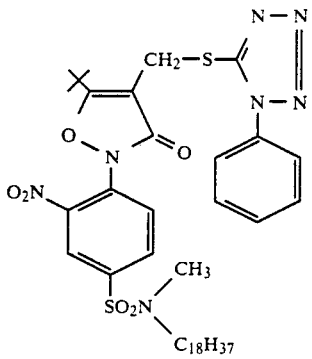
AF-6
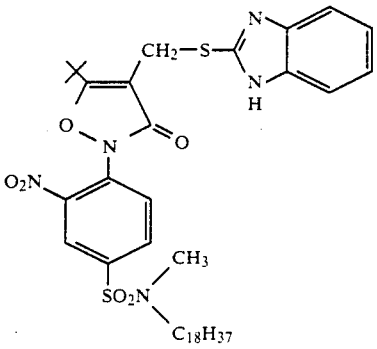
AF-7
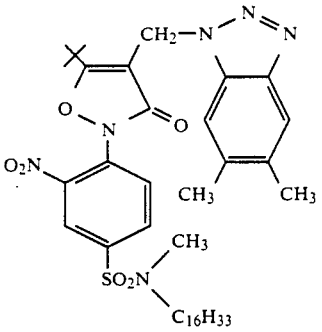
AF-8
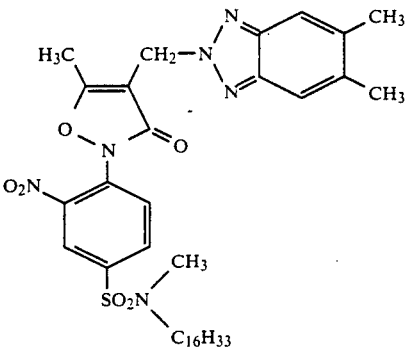

-continued
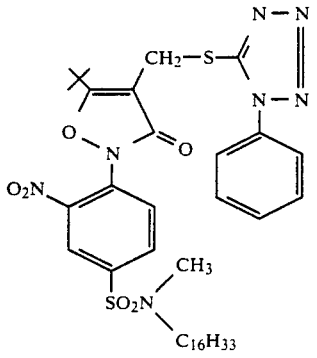
AF-9
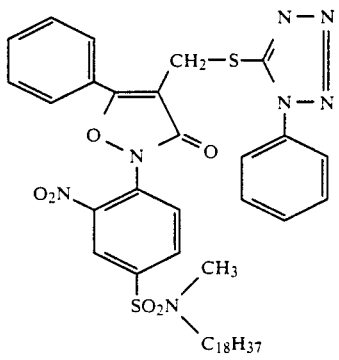
AF-10
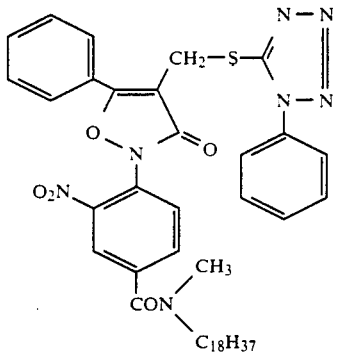
AF-11
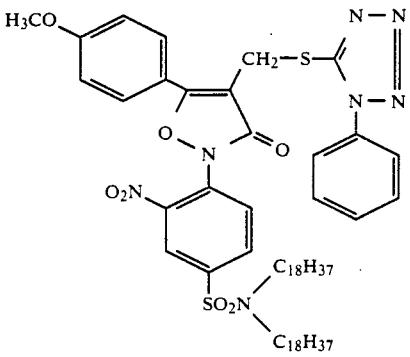
AF-12

-continued
AF-13
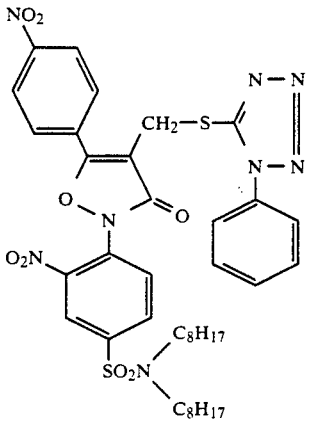
AF-14
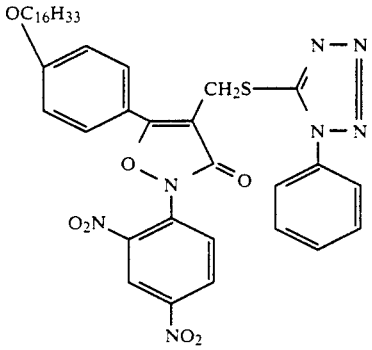
AF-15
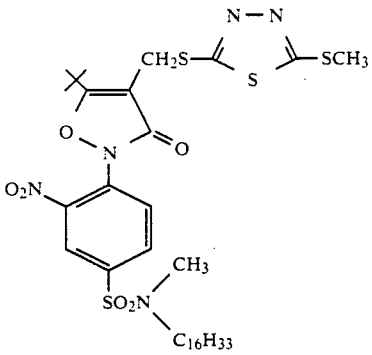
AF-16
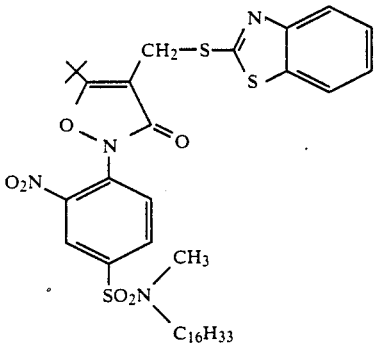

-continued
AF-17
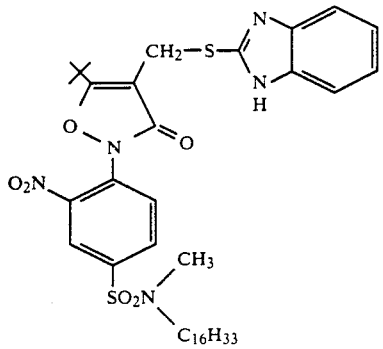
AF-18
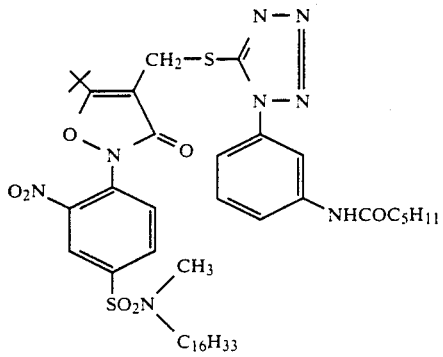
AF-19
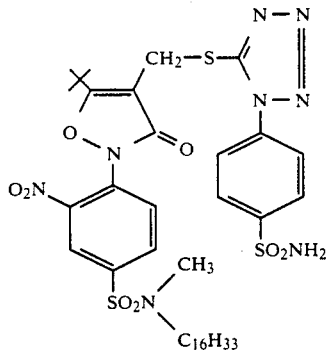
AF-20
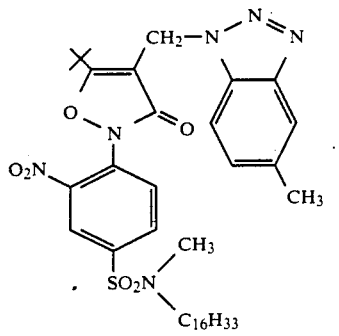

-continued
AF-21
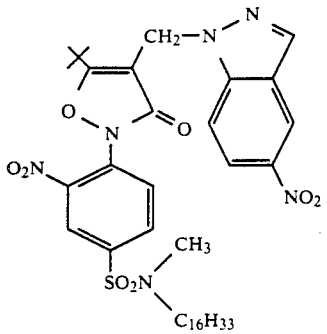
AF-22
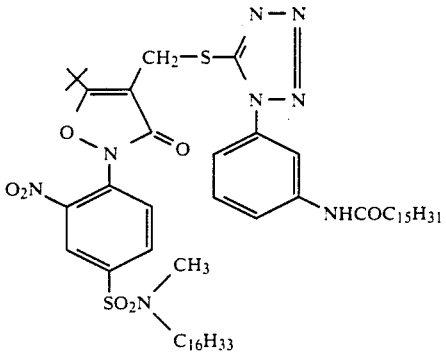
AF-23
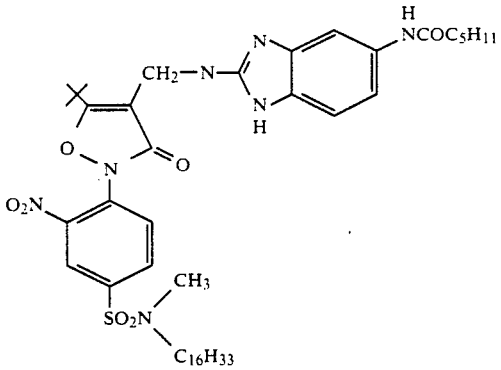
AF-24
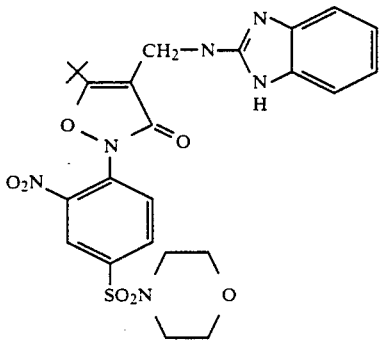

-continued
AF-25
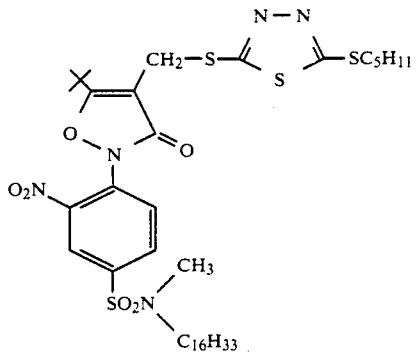
AF-26
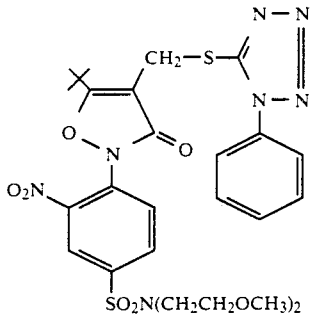
AF-27
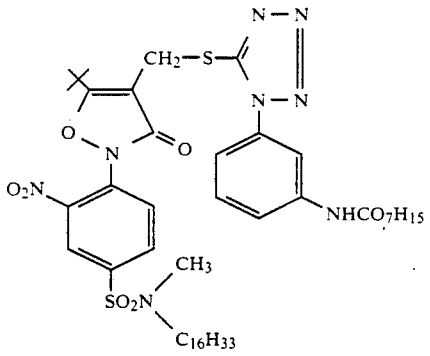
AF-28
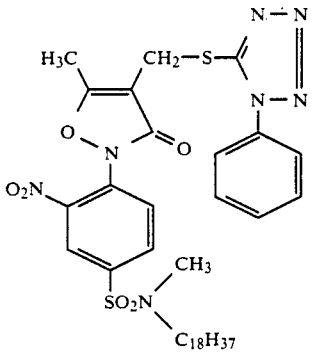

-continued
AF-29
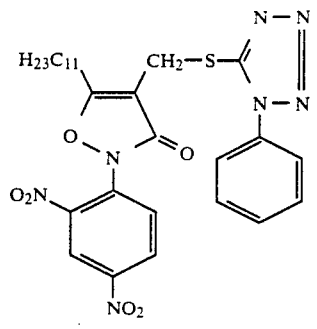
AF-30
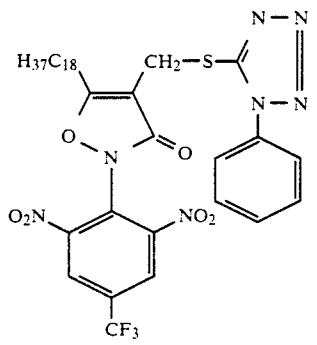
AF-31
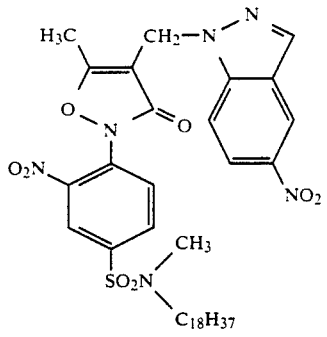
AF-32
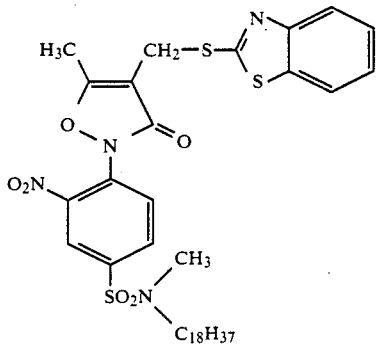

-continued
AF-33
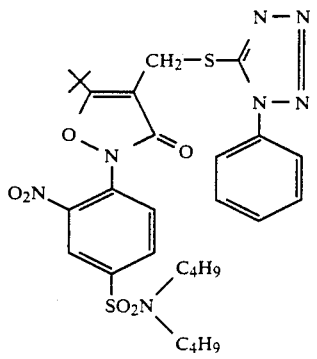
AF-34
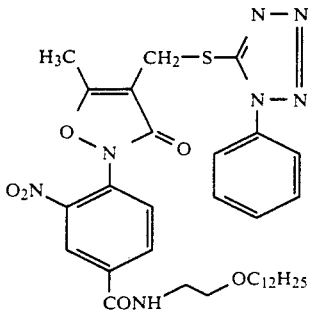
AF-35
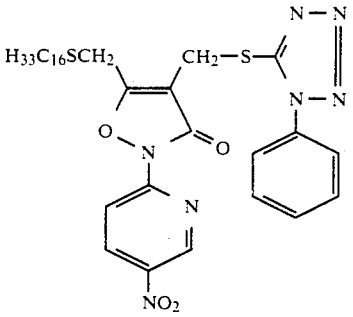
AF-36
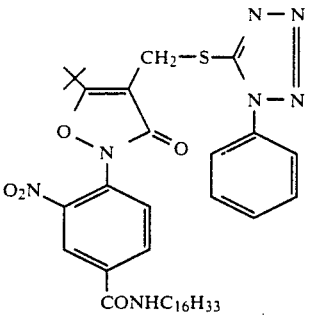
AF-37
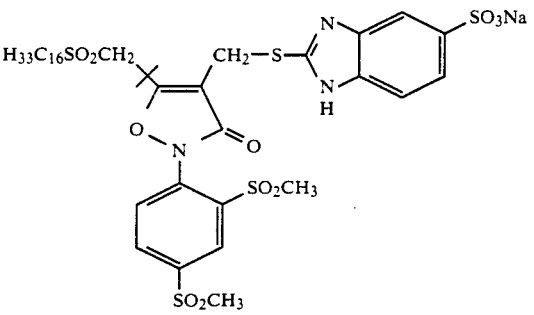

-continued
AF-38
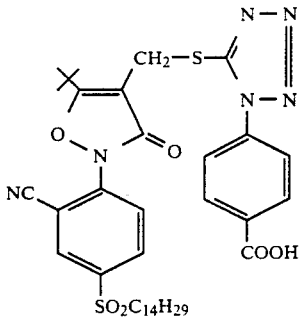
AF-39
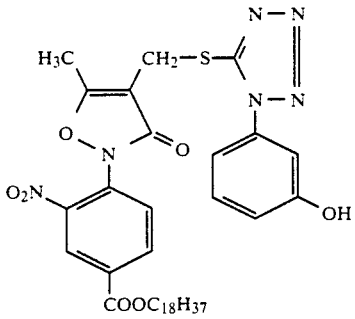
AF-40
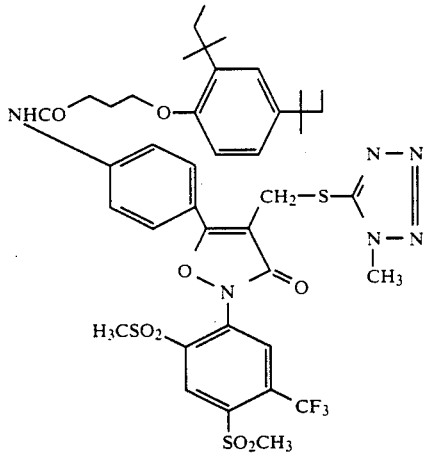
AF-41
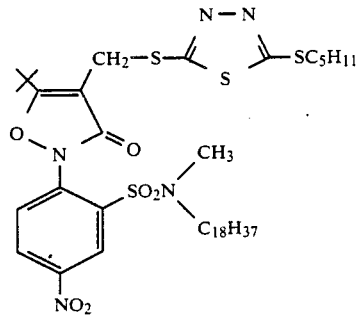

-continued
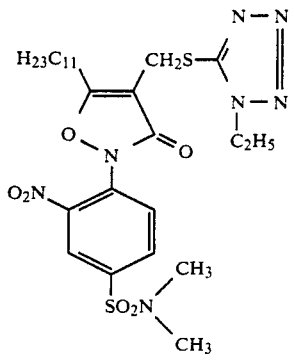
AF-42
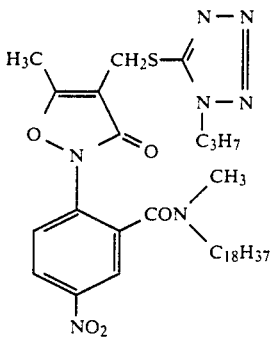
AF-43
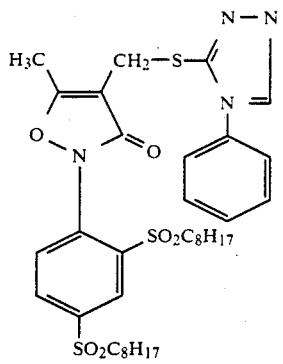
AF-44
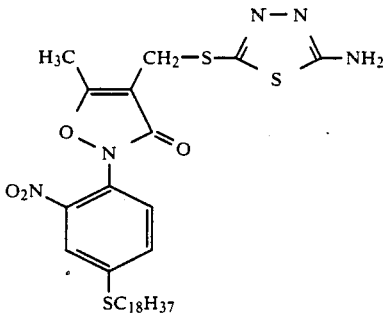
AF-45

-continued
AF-46
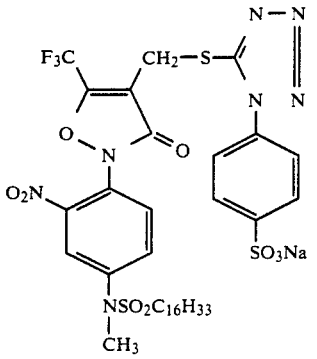
AF-47
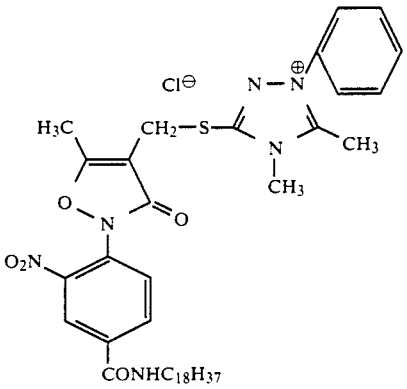
AF-48
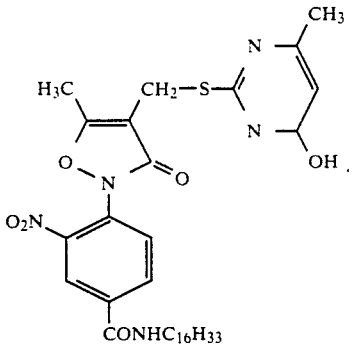
AF-49
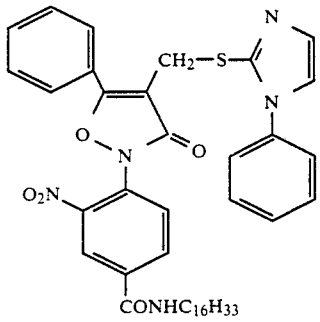

-continued
AF-50
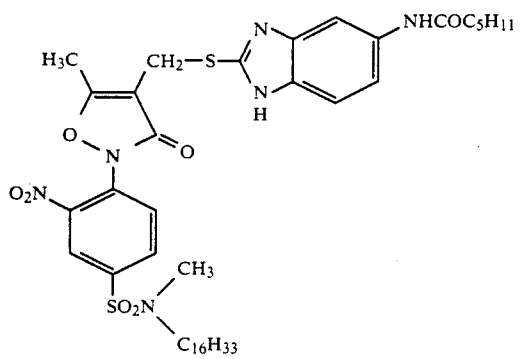
AF-51
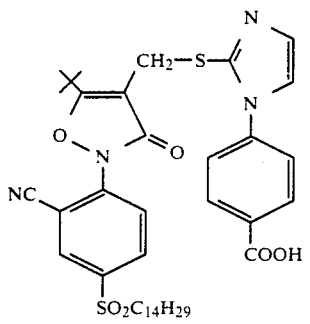
AF-52
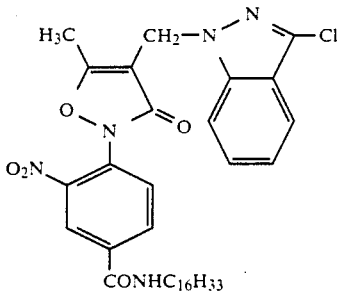
AF-53
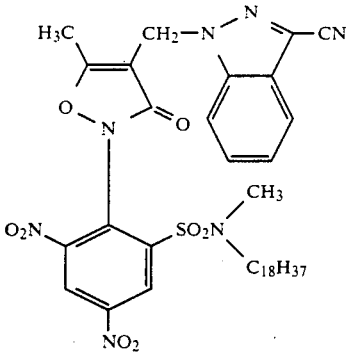
AF-54
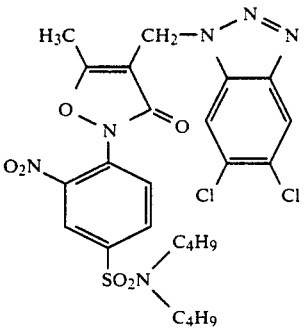

-continued
AF-55
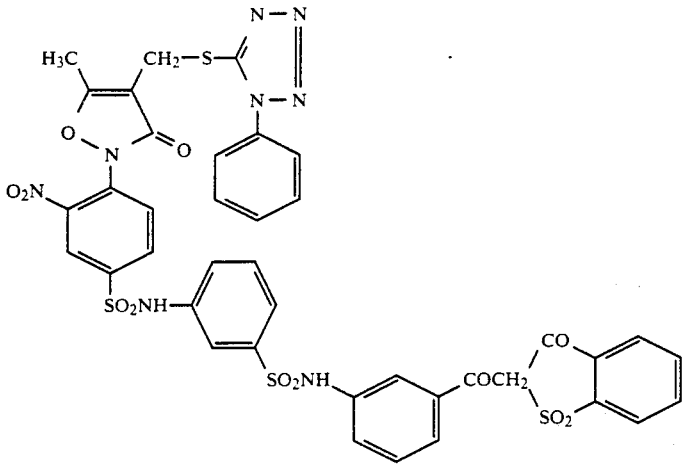
AF-56
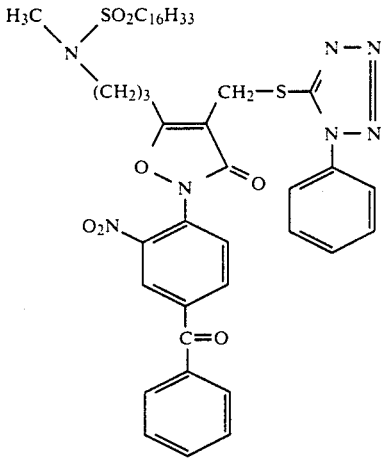
AF-57
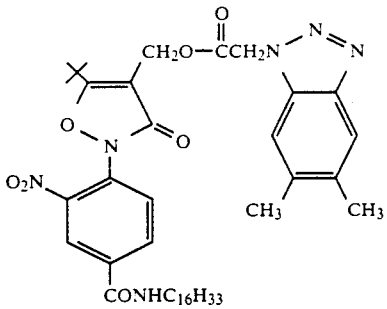
AF-58
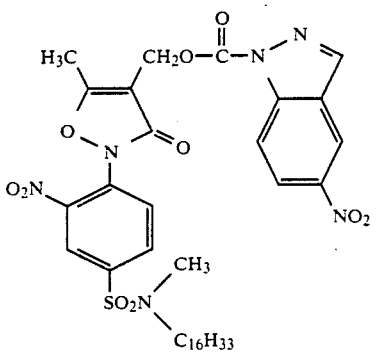

-continued
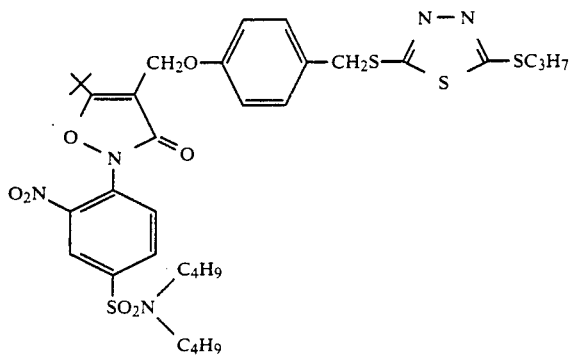
AF-59
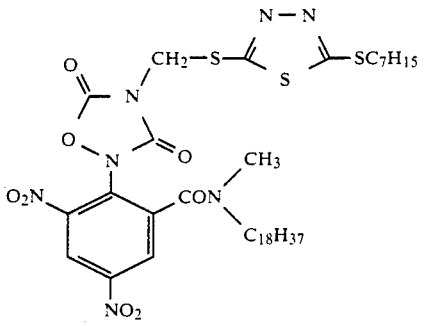
AF-60
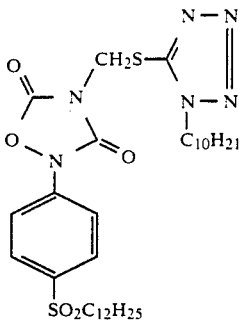
AF-61
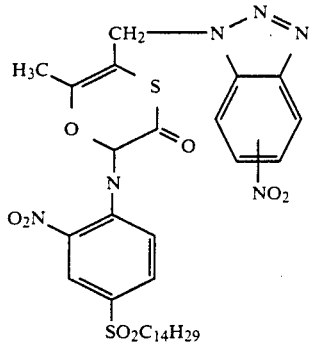
AF-62

-continued
AF-63
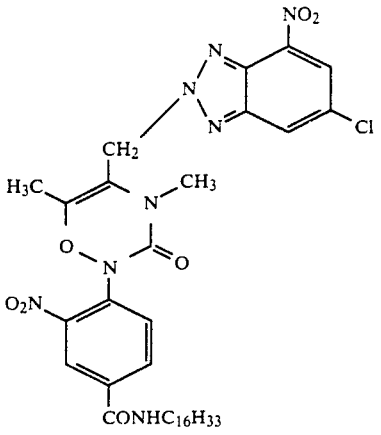
AF-64
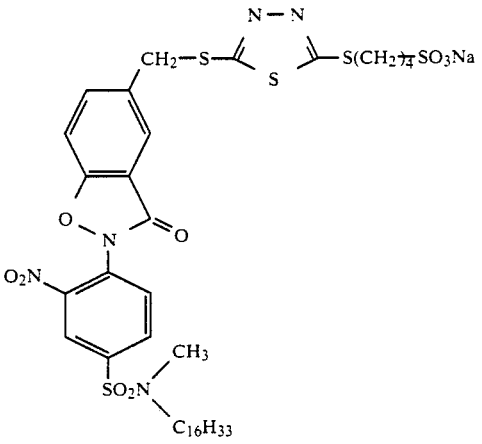
AF-65
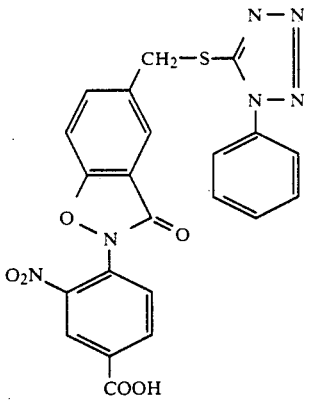
AF-66
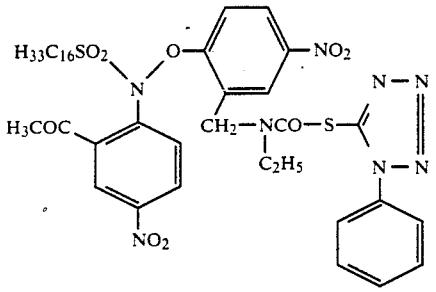

-continued
AF-67
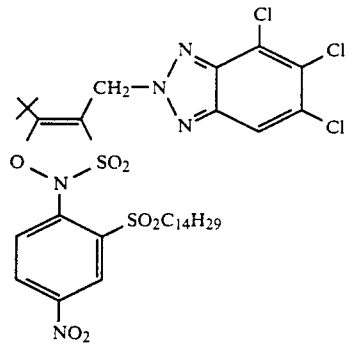
AF-68
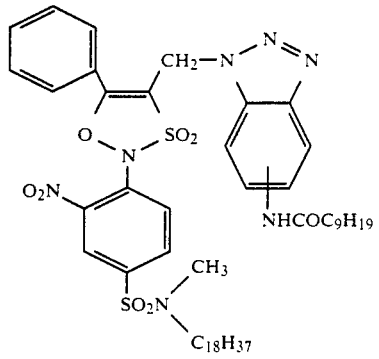
AF-69
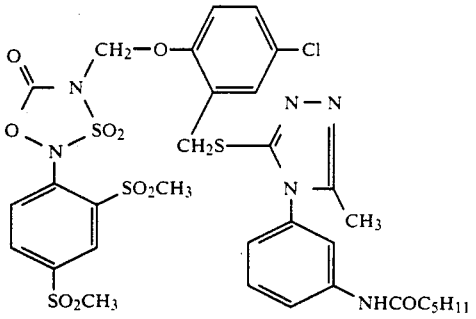
AF-70
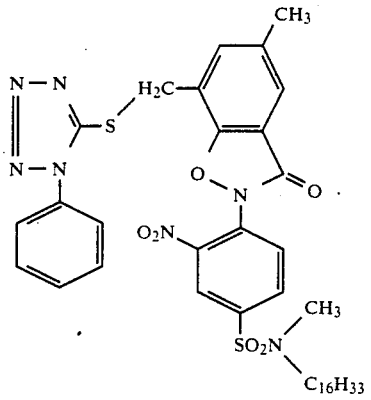

-continued
AF-71
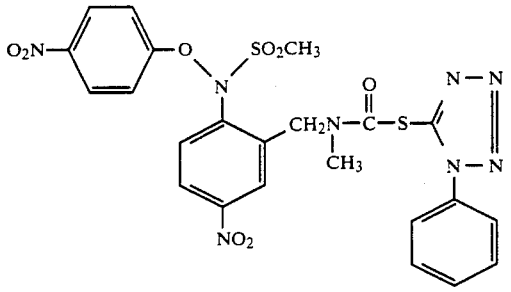
AF-72
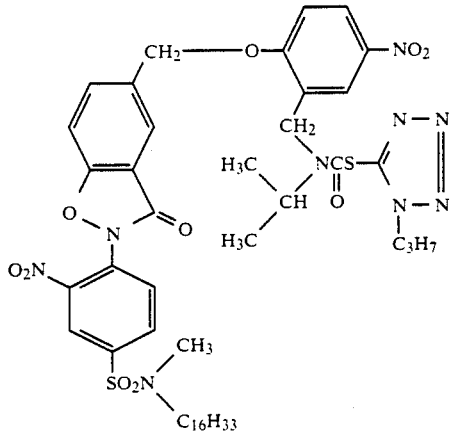
AF-73
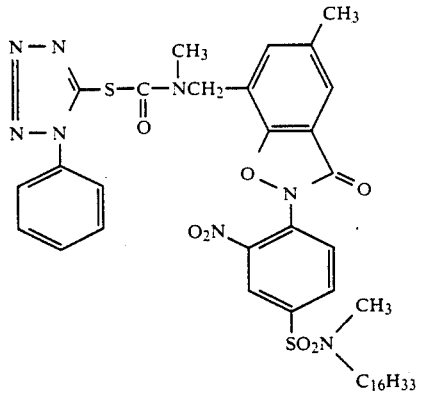
AF-74
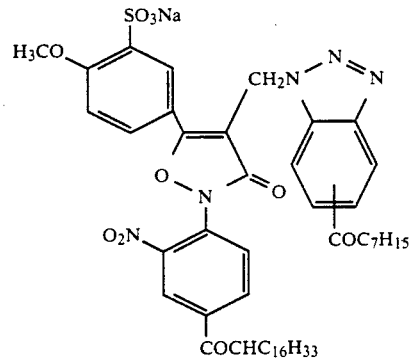

-continued
AF-75
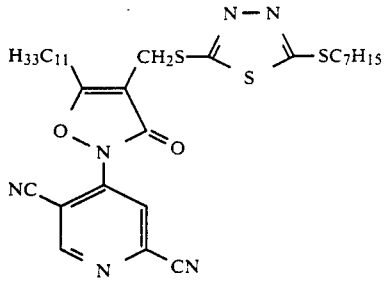
AF-76
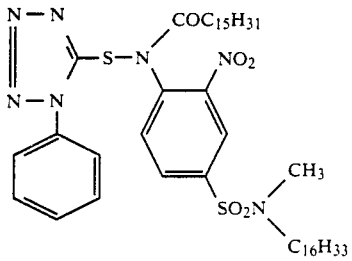
AF-77
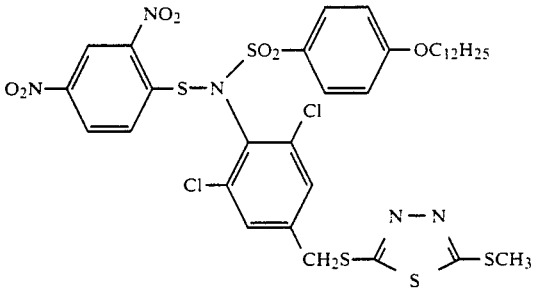
AF-78
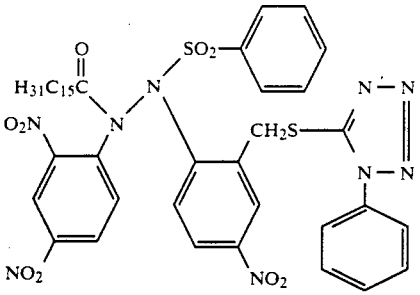
AF-79
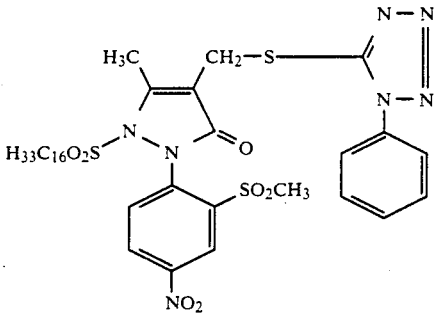

-continued
AF-80
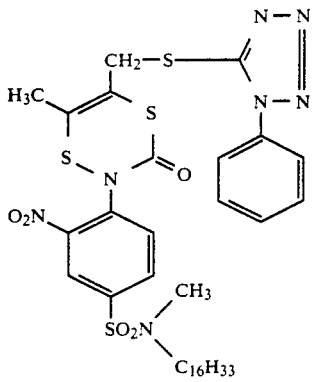
AF-81
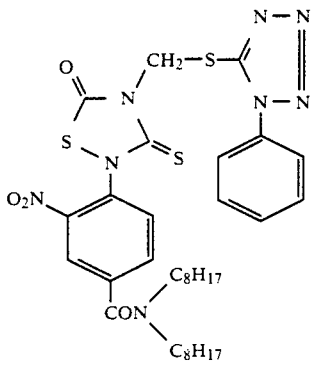
AF-82
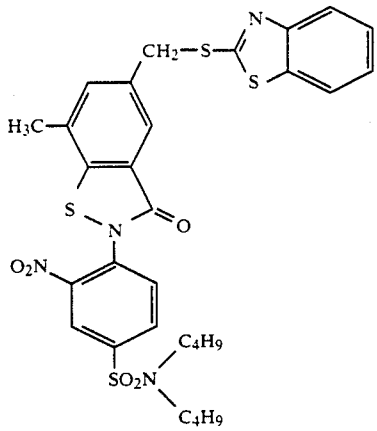
AF-83
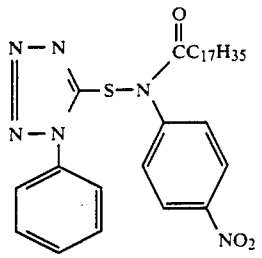

-continued
AF-84
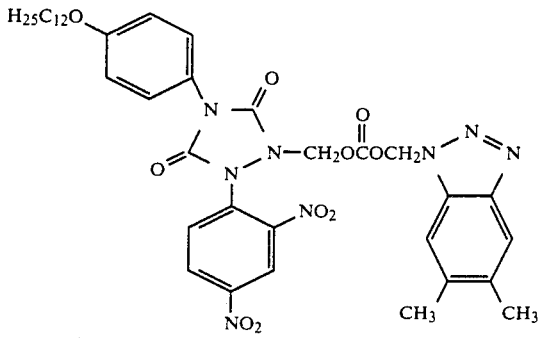
AF-85
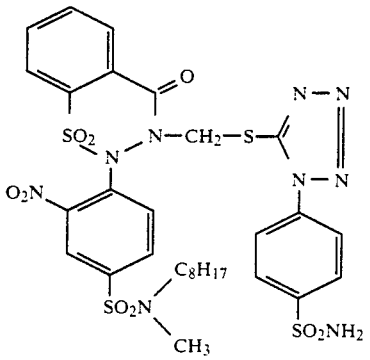
AF-86
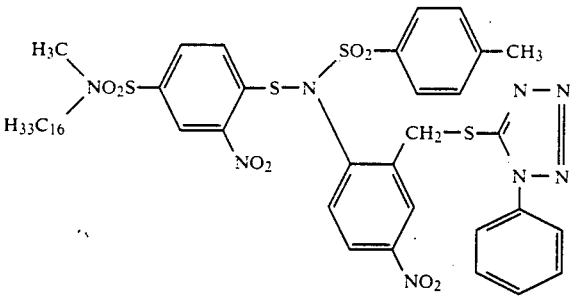
AF-87
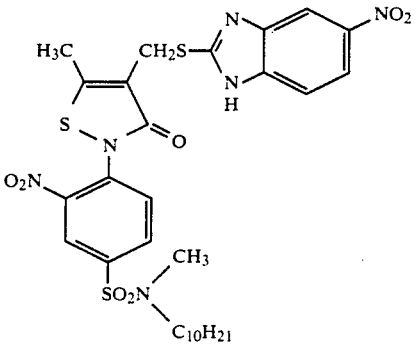

-continued
AF-88
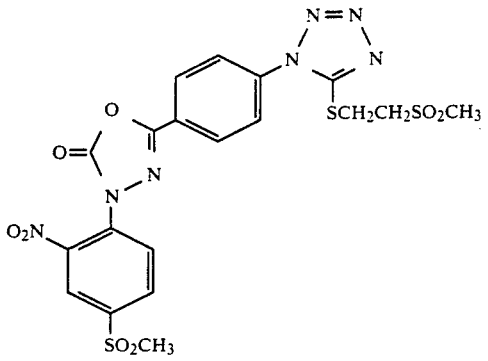
AF-89
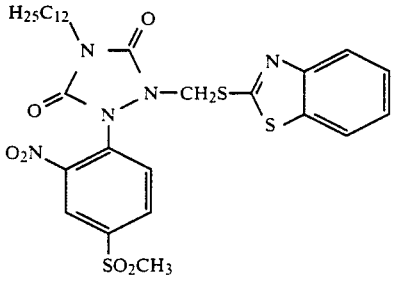
AF-90
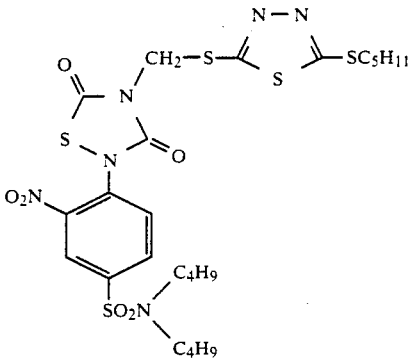
AF-91
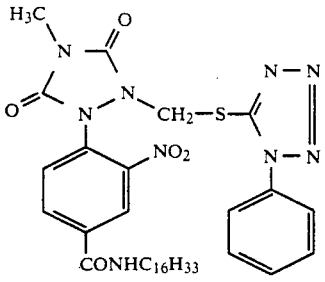
AF-92
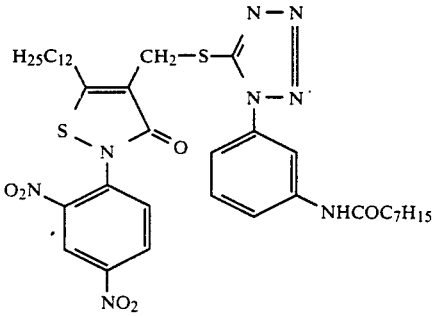

-continued
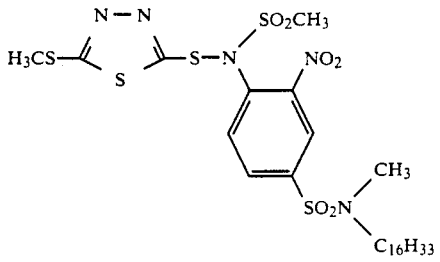
AF-93
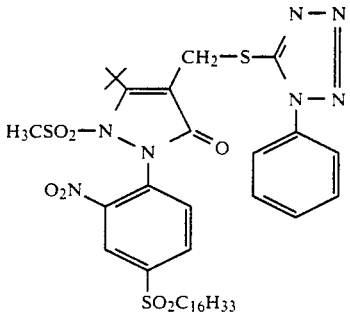
AF-94
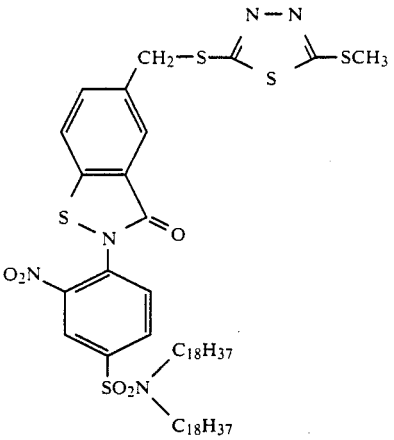
AF-95
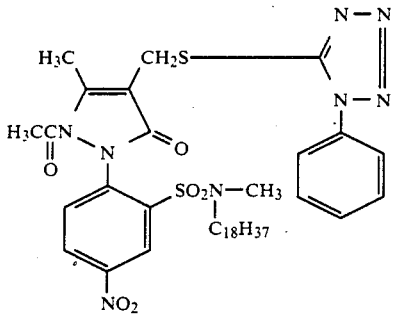
AF-96

-continued

AF-97

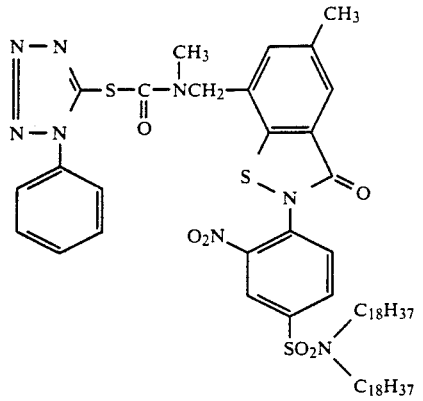

AF-98

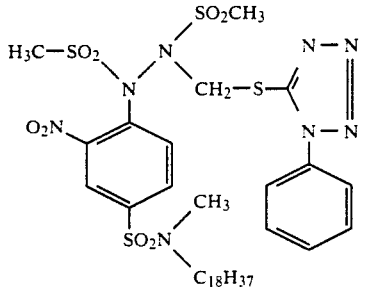

AF-99

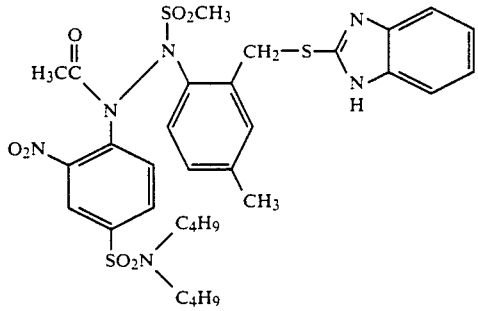

Examples of the process for the synthesis of the compounds employed in the present invention are described in European Patent 220746A and Japanese Patent Application (OPI) No. 244048/87, which are incorporated herein by reference.

In order to facilitate the understanding of the present invention, specific examples of the process for the synthesis of the present compound will be described hereinafter. Unless otherwise specified, all parts, percentages and proportions are by weight.

(I) Synthesis of Compound AF-3

Synthesis Example I-1

Synthesis of
N-methyl-N-octadecyl-3-nitro-4-chlorobenzamide 105.7 g of 3-nitro-4-chlorobenzoic acid and 800 ml. of acetonitrile were mixed. 68.6 g of thionyl chloride was added to the admixture. The admixture was heated under reflux for 4 hours. After being cooled, the solvent was removed from the solution. The residual material was dissolved in chloroform. 63.5 g of triethylamine was then added to the solution. The admixture was cooled to a temperature of 5° C. A chloroform solution of 148.6 g of N-methyloctadecylamine was added dropwise to the admixture. After the reaction was completed, water was added to the solution. The admixture was subjected to separation. The organic phase was dried over anhydrous sodium sulfate. The inorganic material was filtered out, and the solvent was removed therefrom. The residual material was then recrystallized from a 1:3 mixture of acetonitrile and methanol. (Yield: 186 g (76.0%); m.p.: 55°-56° C.)

Synthesis Example I-2

Synthesis of 5-t-butyl-3-hydroxyisoxazole 583.7 g of hydroxylamine hydrochloride was dissolved in 2 l of a 4N aqueous solution of sodium hydroxide. 2 l of ethanol was added to the solution under cooling with ice. A 1:1 mixture of a 4N aqueous solution of sodium hydroxide and ethanol was added to the solution so that the pH thereof was adjusted to 10.0. 1,380 g of ethyl pivaloylacetate and a 1:1 mixture of a 4N aqueous solution of sodium hydroxide and ethanol were simultaneously added dropwise to the solution in such a manner that the pH of the reaction solution was 10±0.2 and the temperature thereof was 0° to 5° C. After the dropwise addition was finished, the reaction mixture was stirred at room temperature for 2 hours, and then poured into 6 kg of concentrated hydrochloric acid. The reaction mixture was allowed to stand for 12 hours. The resulting crystal was filtered off, thoroughly washed with water, and then dried. (Yield: 770 g (68.2%); m.p.: 99°-101° C.)

Synthesis Example I-3

Synthesis of
5-t-butyl-2-(4-N-methyl-N-octadecylcarbamoyl-2-nitrophenyl)-3-isoxazolone 300 ml of dimethylformamide was added to 34.1 g of N-methyl-N-octadecyl-3-nitro-4-chlorobenzamide, 12.4 g of 5-t-butyl-3-hydroxyisoxazole, and 12.4 g of potassium carbonate. The admixture was then allowed to react at a temperature of 100° C. for 5 hours. The solvent was removed under reduced pressure. Ethyl acetate and water were added to the reaction mixture. The admixture was stirred. The organic phase was taken and subjected to silica gel column chromatography to fractionate the main product therefrom. The main product was then recrystallized from an n-hexane-ethyl acetate mixture. (Yield: 18.0 g (43.1%); m.p.: 64° C.)

Synthesis Example I-4

Synthesis of
4-chloromethyl-5-t-butyl-2-(4-N-methyl-N-octadecylcarbamoyl-2-nirophenyl)-3-isoxazolone 36 g of 5-t-butyl-2-(4-N-methyl-N-octadecylcarbamoyl-2-nitrophenyl)-3-isoxazolone, 5.7 g of paraformaldehyde, and 10.3 g of zinc chloride were mixed with 250 ml of acetic acid. The reaction mixture was then allowed to react at a temperature of 100° C. for 20 hours with hydrogen chloride gas bubbled thereinto. After the reaction was completed, the reaction mixture was cooled and then put in an ice water bath. The resulting solid precipitate was filtered off, dissolved in chloroform, and then purified by column chromatography. (Yield: 10.0 g (25.6%); m.p.: 77° C.)

Synthesis Example I-5

Synthesis of Compound AF-3

40 g of 5-t-butyl-2-(4-N-methyl-N-octadecylcarbamoyl-2-nitrophenyl)-3-isoxazolone obtained in Synthesis Example I-4 and 12 g of 1-phenyl-5-mercaptotetrazole were dissolved in acetone. 14 g of potassium carbonate was added to the admixture. The admixture was then stirred at room temperature for 3 hours. The resulting inorganic material was filtered out, and the residue was then recrystallized from methanol to obtain 33 g (67% yield) of colorless crystals. (m.p. 66°-68° C.)

(II) Synthesis of Compound AF-9

Synthesis Example II-1

Synthesis of
4-chloro-3-nitro-N-methyl-N-hexadecylbenzenesulfonamide

Synthesis Example II-1-1

Synthesis of 4-chloro-3-nitrobenzenesulfonyl chloride 1,250 ml of phosphorus oxychloride was added dropwise to a mixture of 1,280 g of potassium 4-chloro-3-nitrobenzenesulfonate, 1,150 ml of acetonitrile, 250 ml of sulfolane, and 30 ml of dimethylacetamide in such a manner that the internal temperature thereof was kept at 60° to 70° C. After being allowed to react at a temperature of 73° C. for 3 hours, the reaction mixture was cooled with water, and 400 ml of water was gradually added to the reaction mixture. The cooled reaction mixture was then added to 5 l of ice water. The resulting crystals were filtered off, washed with water, and then dried. (Yield: 1,060 g (84%); m.p.: 55°-56° C.)

Synthesis Example II-1-2

Synthesis of 4-chloro
3-nitro-N-hexadecylbenzenesulfonamide 1 l of dichloromethane was added to 800 g of 4-chloro-3-nitrobenzenesulfonyl chloride. The admixture was cooled to a temperature of 0° C. A mixture of 600 g of hexadecylamine, 251 ml of triethylamine, and 780 ml of dichloromethane was added dropwise to the solution in such a manner that the temperature thereof was kept at 20° to 30° C. After being allowed to react at room temperature for 20 hours, dichloromethane was removed from the reaction mixture under reduced pressure. The residue was dissolved in 3 l of methanol under heating. The solution was gradually cooled to room temperature where crystallization took place. 3 of methanol was then added to the solution. The solution was cooled with ice to induce crystallization. The crystals were then filtered off and dried. (Yield: 1,020 g (88%); m.p.: 91°-93° C.)

Synthesis Example II-1-3

Synthesis of
4-chloro-3-nitro-N-methyl-N-hexadecylbenzenesulfonamide 170 g of 4-chloro-3-nitro-N-hexadecylbenzenesulfonamide was dissolved in 640 ml of acetone. 79 g of potassium carbonate, 400 ml of polyethylene glycol, and 71 g of dimethylsulfuric acid were added to the solution. The admixture was heated under reflux for 5 hours. 240 ml of acetone was added to the solution. 870 ml of water was then added dropwise to the solution in such a manner that the temperature thereof was kept at 40° C. Upon cooling to room temperature, crystallization occurred. The crystals were filtered off, washed with water and methanol, and dried. (Yield: 169 g (97%); m.p.: 74°-75° C.)

Synthesis Example II-2

Synthesis of Compound AF-9

Synthesis Example II-2-1

Synthesis of
5-t-butyl-2-(4-N-methyl-N-hexadecylsulfamoyl 2-nitrophenyl)-3-isoxazolone 470 g of 4-chloro-3-nitro-N-hexadecylbenzenesulfonamide obtained in Synthesis Example II-1-3, 169 g of 5-t-butyl-3-hydroxyisoxazole obtained in Synthesis Example I-2, 168 g of potassium carbonate, and 1.2 l of dimethyl sulfoxide were mixed. The reaction mixture was then allowed to react at a temperature of 65° C. for 6 hours. The reaction mixture was then poured into ice water. The resulting crystals were filtered off, washed with water, and dried. (Yield: 576 g (100%); m.p.: 67°-68° C.)

Synthesis Example II-2-2

Synthesis of
5-t-butyl-4-chloromethyl-2-(4-N-methyl-N-hexadecylsulfamoyl-2-nitrophenyl)-3-isoxazolone 550 g of 5-t-butyl-2-(4-N-methyl-N-hexadecylsulfamoyl-2-nitrophenyl) 3-isoxazolone, 200 g of zinc chloride, 200 g of paraformaldehyde, and 1.5 l of acetic acid were mixed. The reaction mixture was then heated under reflux for 10 hours with hydrogen chloride gas bubbled thereinto.

After being cooled, the reaction mixture was poured into water. The resulting crystals were filtered off and then recrystallized from a 1:4 mixture of aceto nitrile and methanol. (Yield: 585 g (96%); m.p.: 56° C.)

Synthesis Example II-2-3

Synthesis of Compound AF-9

250 g of 5-t-butyl-4-chloromethyl-2-(4-N-methyl-N-hexadecylsulfamoyl-2-nitrophenyl)-3-isoxazolone and 75 g of 1-phenyl-5-mercaptotetrazole were dissolved in 500 ml of acetone. 60 g of potassium carbonate and 5 g of potassium iodide were added to the solution, followed by stirring at room temperature for 2 hours. The reaction mixture was poured into a dilute hydrochloric acid aqueous solution and then extracted with ethyl acetate. The extract was washed with water and concentrated under reduced pressure. One liter of ethanol and 100 ml of ethyl acetate were added to the residue to effect recrystallization. (Yield: 250 g (82%); m.p.: 73°-75° C.)

cooled to a temperature of 0° C. A chloroform solution of 84.3 g of methyloctadecylamine was added dropwise to the solution. 39.5 g of triethylamine was then added dropwise to the solution while the temperature thereof was kept at 0° to 10° C. The solution was stirred at room temperature for 1 hour. Chloroform was removed from the solution under reduced pressure. 500 ml of methanol was added to the residue. The reaction mixture was heated to complete dissolution. The solution was cooled., The resulting crystals were filtered off and dried. (Yield: 109 g (71%); m.p.: 86°-87° C.)

Synthesis Example III-3

Synthesis of Compound AF-10

Compound AF-10 was prepared in accordance with the process steps described above for Synthesis Examples II-2-1 to II-2-3 for Compound AF-9. (m.p.: 117°-118° C.)

The present compounds may be incorporated in a silver halide photographic material in accordance with the process described hereinafter. These compounds may be reduced in electron migration paths represented by the arrow in the following equation to release a development inhibitor.

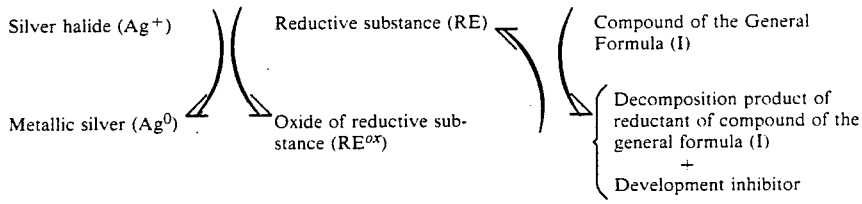

(III) Synthesis of Compound AF-10

Synthesis Example III-1

Synthesis of 5-phenyl-3-hydroxyisoxazole 40 g of sodium hydroxide was dissolved in 200 ml of water and 300 ml of ethanol. 69.5 g of hydroxylamine hydrochloride was added to the solution. A mixed solution of 2N sodium hydroxide and a 3:2 mixture of ethanol and water was added to the solution so that the pH thereof was adjusted to 10.0. 192 g of ethyl benzoylacetate and a mixed solution of 2N sodium hydroxide and a 3:2 mixture of ethanol and water were added dropwise to the solution at the same time under cooling with ice in such a manner that the pH thereof was 10±0.3. After the dropwise addition was finished, the solution was stirred at room temperature for 3 hours. The reaction mixture was then poured into a mixture of 500 g of conc. hydrochloric acid and 500 g of ice. 2.5 l of ethanol was added to the reaction mixture. The reaction mixture was heated under reflux for 3 hours. 2 l of water was added to cool the solution. The resulting crystals were filtered off, washed with water, and dried. (Yield: 98 g (61%); m.p.: 150°-151° C.)

Synthesis Example III-2

Synthesis of 4-chloro-3-nitro-N-methyl-N-octadecylbenzenesulfonamide 300 ml of chloroform was added to 100 g of 4-chloro-3-nitrobenzenesulfonyl chloride. The solution was then If a negative silver emulsion which is commonly used is used, this reductive substance (RE) is used and consumed for the reduction of silver halide depending on the degree of exposure. Therefore, this reductive substance is used in the reaction with the present compound of the general formula (I) in an amount inverse-relationship to the degree of exposure, i.e. the amount left unused for the reduction of silver halide. This means that the development inhibitor is released more at portions less exposed to light. On the contrary, if an auto positive emulsion is used, silver halide is reduced at unexposed portions unlike in the case of negative emulsion. Therefore, this means that the reaction of the present compound of the general formula (I) with the reductive substance occurs more and the development inhibitor is released more at portions more exposed to light.

As described above, the compound employed in the present invention is released less at portions to be developed (portions where the reaction of silver halide with the reductive substance occurs) and more at non-developed portions. For the purpose of adjusting (normally improving) the ratio of the amount of the development inhibitor released at portions to be developed to that at non-developed portions or like purposes, a reductive substance called electron transfer agent (ETA) represented by the following equation may be used in combination with the above described reductive substance.

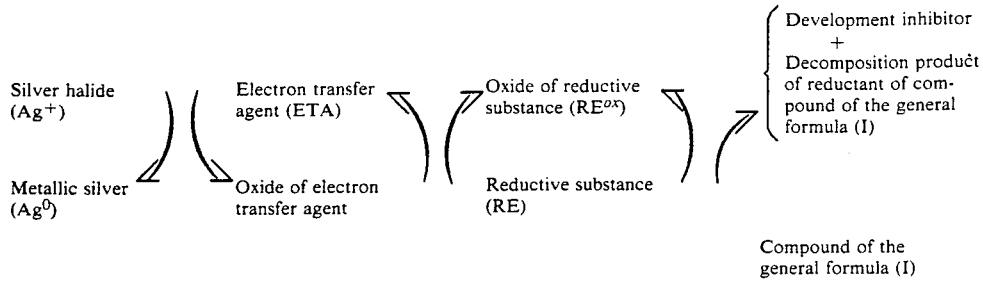

In the present invention, the combined use of a dye providing substance (positive dye providing substance) which provides a mobile dye in inverse-relationship to the reduction reaction of silver ion to silver with a development inhibitor precursor of the general formula (I) can improve the image density without generation of stain. The reason for this effect is believed to be as follows. That is, the compound of the general formula (I) releases a development inhibitor at non developed portions to inhibit fog development of silver halide. This can inhibit the positive dye providing substance from undergoing an oxidation-reduction reaction with silver halide at non-developed portions of silver halide or the reductive substance from undergoing undesired reaction with silver halide. As a result, a mobile dye is produced more at non developed portions. The development inhibitor is released less at the developed portions. Therefore, the reaction of silver halide with a positive dye providing substance or the reaction of silver halide with a reductive substance occurs thoroughly, eliminating the possibility of stain generation.

The amount of the development inhibitor precursor of the general formula (I) to be used depends on the type of AF but is normally in the range of $1\times10^{-7}$ to 1 mol, preferably $1\times10^{-3}$ to $1\times10^{-1}$ mol, per mol of silver halide, or in the range of $1\times10^{-3}$ to $1\times10^{2}$ mol, preferably $1\times10^{-2}$ to 10 mol, per mol of positive dye providing substance as described hereinafter. These development inhibitor precursors may be used singly or in combination. These development inhibitor precursors may be used in combination with any suitable known development inhibitors.

As a suitable dye providing substance there may be used a compound of the general formula (CI):

$$(\text{Dye}—\text{X})_n—\text{Y} \qquad \text{(CI)}$$

wherein Dye represents a dye group, a dye group which has been temporarily shifted to shorter wavelengths, or a dye precursor group; X represents a simple bond or a connecting group; Y represents a group which controls the diffusibility of a compound represented by $(\text{Dye}—\text{X})_n—\text{Y}$ or releases Dye and then differentiates between the Dye thus released and $(\text{Dye}—\text{X})_n—\text{Y}$ in the diffusibility in inverse-relationship to light-sensitive silver salts having a latent image distributed imagewise; and n represents an integer of 1 or 2, with the proviso that when n is 2, the two (Dye—Y)'s may be the same or different.

Typical examples of a dye providing substance (positive dye providing substance) which provides a mobile dye in inverse-relationship to the reduction of silver ion to silver include:

i. A dye providing substance (i.e., a dye developing agent which becomes mobile under an alkaline condition and/or under heating and becomes immobile when oxidized by development.

ii. A reductive nondiffusible dye providing substance which releases a mobile dye under an alkaline condition and/or under heating but doesn't release a dye when oxidized by development.

iii. A nondiffusible dye providing substance which undergoes a reaction with a reductive substance left unconsumed in the development to release a mobile dye.

Preferred among those belonging to substances ii and iii are substances which have been made immobile by known ballast groups.

As positive dye providing substances belonging to substance i there may be used dye developing agents as described in U.S. Pat. Nos. 3,134,764, 3,362,819, 3,597,200, 3,544,545, and 3,482,972, and Japanese Patent Application (OPI) No. 165054/84, incorporated herein by reference.

As positive dye providing substances belonging to substance ii there may be used compounds as described in Japanese Patent Application (OPI) Nos. 63618/76, 69033/78, 130927/79, 111628/74, and 4819/77, incorporated herein by reference.

In the present invention there may be particularly preferably used positive dye providing substances belong to substance iii. Examples of positive dye providing substances belonging to substance iii will be described hereinafter.

An example of such positive dye providing substances is a BEND compound as disclosed in Japanese Patent Application (OPI) No. 110827/78. In a simplified equation, such a BEND compound undergoes an intramolecular nucleophilic displacement reaction containing the undermentioned reduction to release a mobile dye.

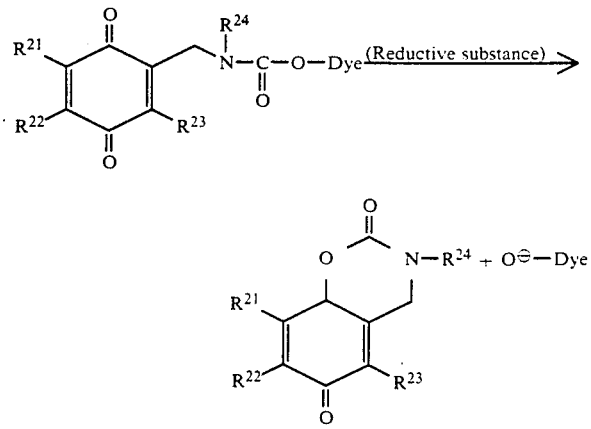

wherein $R^{21}$ to $R^{24}$ each represents a substituent such as alkyl group.

Another example of such positive dye providing substance is a compound as disclosed in Japanese Patent Application (OPI) No. 110828/78. In the undermentioned simplified equation, a nitro group which is a nucleophilic precursor undergoes an intramolecular nucleophilic displacement reaction by reduction to release a mobile dye.

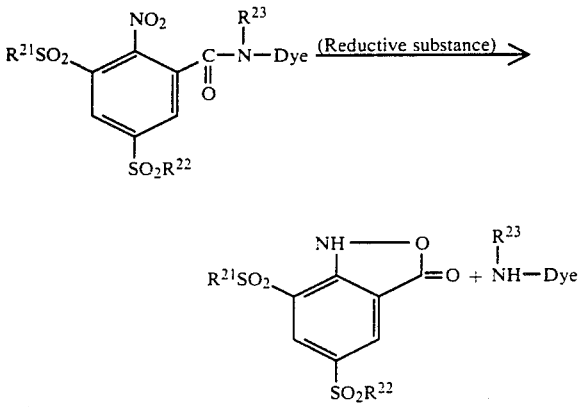

wherein $R^{21}$ and $R^{22}$ each represents a substituent such as alkyl group; and $R^{23}$ represents a hydrogen atom or a substituent such as alkyl group.

A further example of such positive dye providing substances is a compound as disclosed in Japanese Patent Application (OPI) No. 130927/81. In the undermentioned simplified equation, such a compound undergoes the following reaction to release a mobile dye.

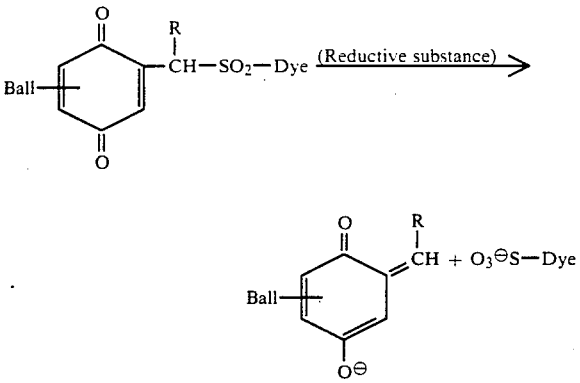

wherein R represents a substituent such as alkyl group; and Ball represents a ballast group.

A further example of such positive dye providing substances is a compound as disclosed in U.S. Pat. No. 4,444,867 and Japanese Patent Application (OPI) No. 196266/83. In a simplified equation, such a compound undergoes the following reaction to release a mobile dye.

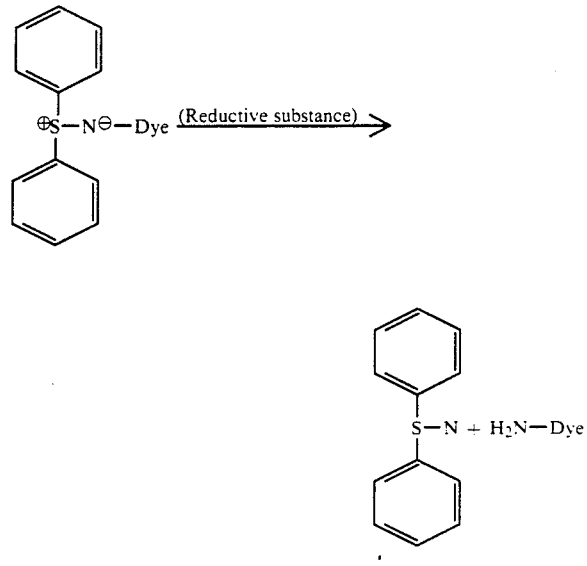

A further example of such positive dye providing substances is a compound as disclosed in Japanese Patent Application No. 88625/86. Such a compound is represented by the undermentioned general formula (CII). In the general formula (CII), the N—X bond is reduced by a reductive substance to undergo cleavage which causes the release of a mobile dye. This compound is particularly useful in the present invention.

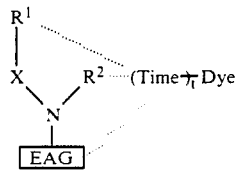

(CII)

wherein Dye represents a group providing a compound which serves as a mobile dye after being reduced; and $R^1$, $R^2$, EAG, Time, t, N, X, broken lines, and solid lines have the same meanings as defined in the general formula (II). There may be more preferably used a compound represented by the general formula (CIII):

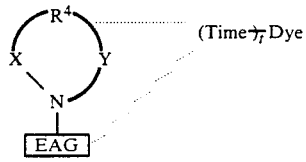

(CIII)

wherein Dye is as defined in the general formula (CII); and the others are as defined in the general formula (II).

There may be particularly preferably, used a compound represented by the general formula (CIV):

(CIV)

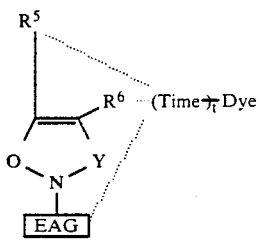

wherein Dye is as defined in the general formula (CII); and Y is as defined in the general formula (III). $R^5$ and $R^6$ each represents a hydrogen atom or substitutable group. $R^5$ and $R^6$ may be bonded to each other to form a saturated or unsaturated carbon ring or heterocyclic group.

Preferred examples of $R^5$ include a hydrogen atom; a substituted or unsubstituted alkyl group, such as a methyl group, an ethyl group, a t-butyl group, an octadecyl group, a phenethyl group, and a carboxymethyl group; a substituted or unsubstituted aryl group, such as a phenyl group, a 3-nitrophenyl group, a 4-methoxyphenyl group, a 4-acetylaminophenyl group, a 4-methanesulfonylphenyl group, a 2,4-dimethylphenyl group, a 4-tetradecyloxyphenyl group, and a

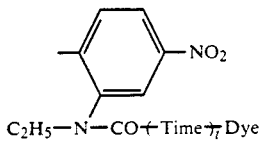

group; and a substituted or unsubstituted heterocyclic group, such as a 2-pyridyl group, a 2-furyl group, and a 3-pyridyl group.

Preferred examples of $R^6$ include a hydrogen atom; a substituted or unsubstituted alkyl group, such as a methyl group; a hydroxymethyl group, and a $—CH_2—(Time)_t Dye$ group; a substituted or unsubstituted aryl group, such as a phenyl group, a 4-chlorophenyl group, a 2-methylphenyl group, a

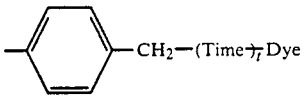

group, and a

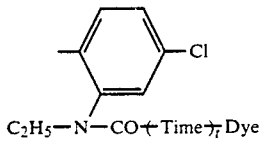

group; and a substituted or unsubstituted heterocyclic group, such as a 4-pyridyl group.

Examples of $R^5$ and $R^6$ which together form a fused ring include:

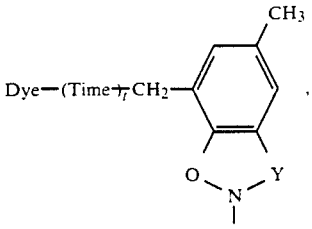

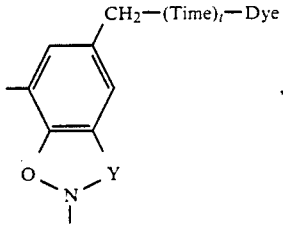

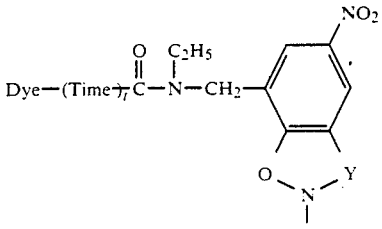

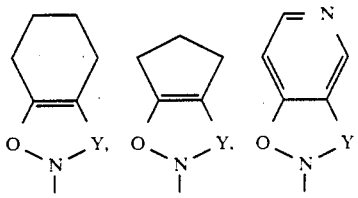

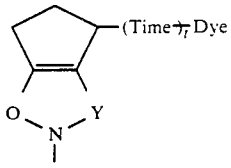

(These fused rings are entirely shown.)

Examples of dyes represented by Dye in the general formula (CI) include azo dyes, azomethine dyes, anthraquinone dyes, naphthoquinone dyes, styryl dyes, nitro dyes, quinoline dyes, carbonyl dyes, and phthalocyanine dyes. These dyes can be used in the form of having temporarily shorter wavelengths, the color of which is recoverable in the development processing.

More specifically, the dyes as described in European Patent 76,492A and Japanese Patent Application (OPI) No. 165054/84 can be utilized.

Specific examples of dye providing substance which can be used in the present invention will be shown here inafter, but the present invention should not be construed as being limited thereto.

(1)
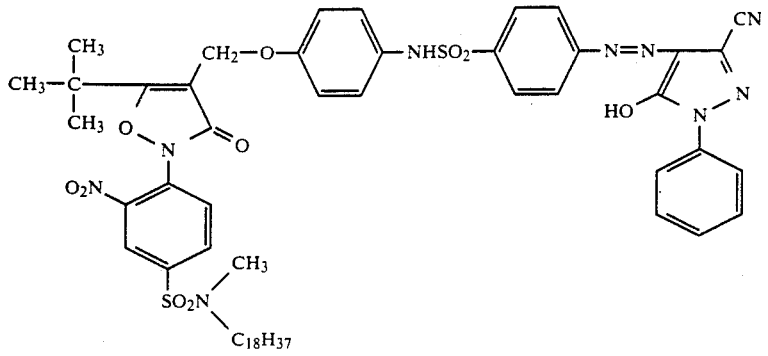
(2)
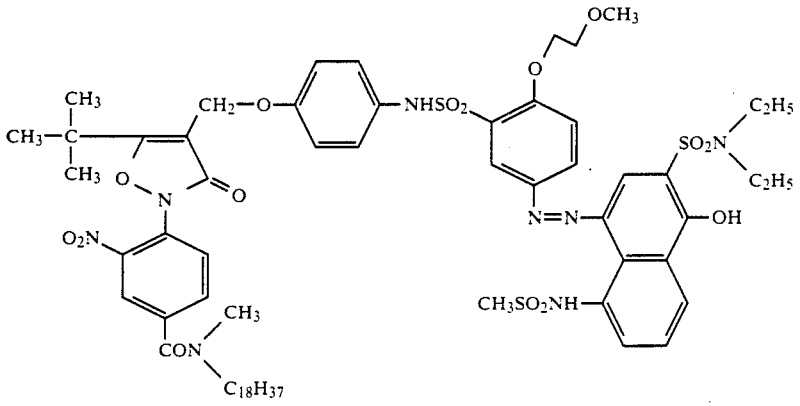
(3)
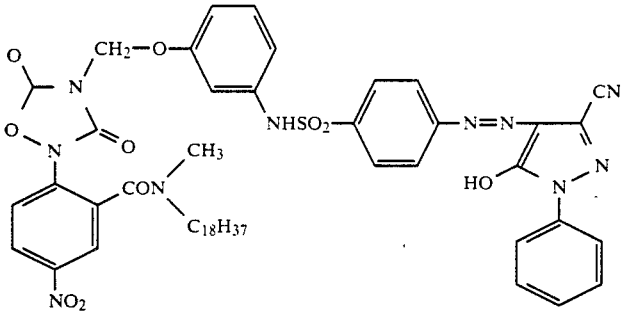
(4)
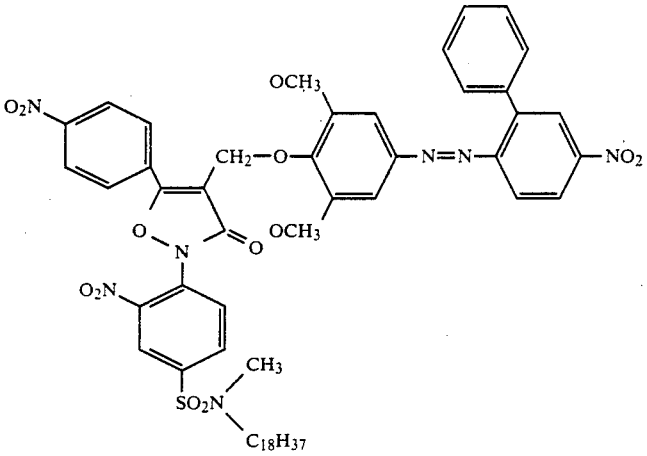

-continued
(5)
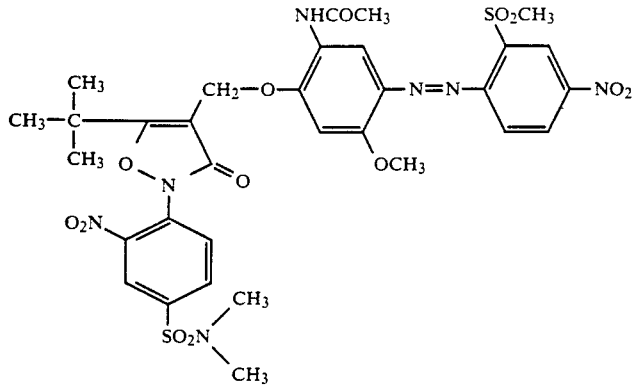
(6)
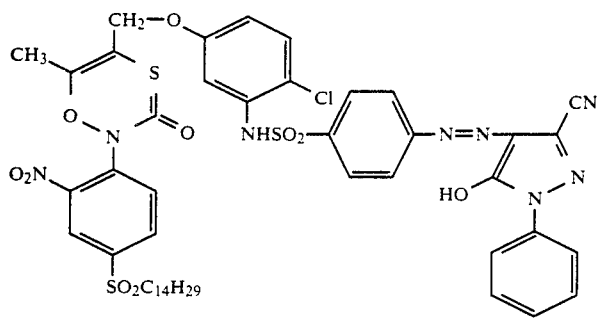
(7)
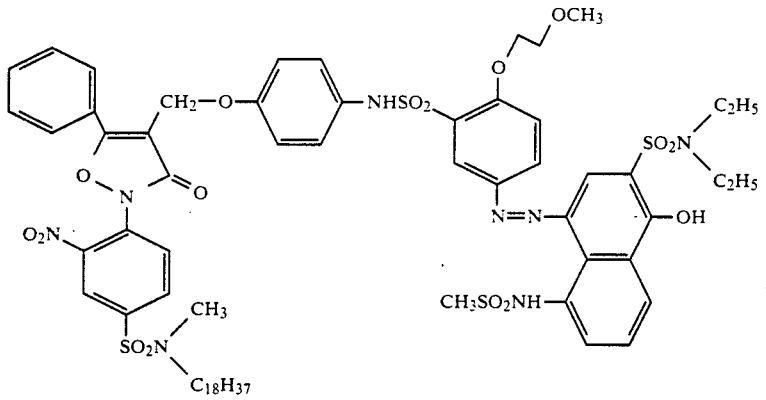
(8)
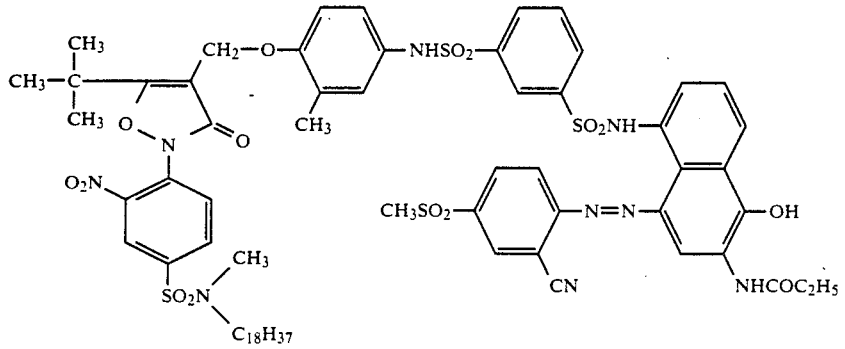

-continued
(9)
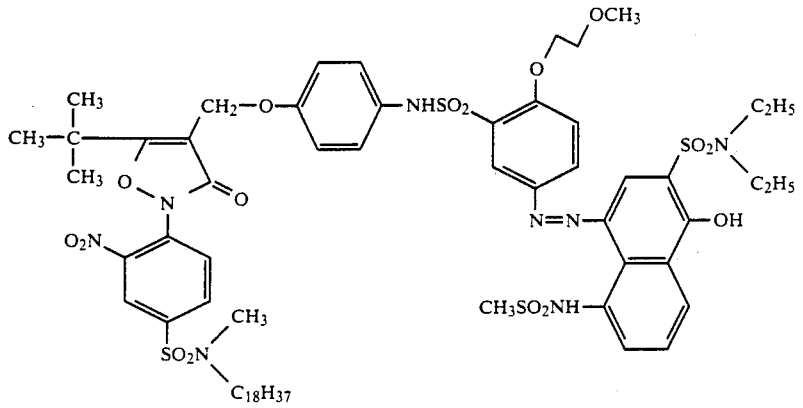
(10)
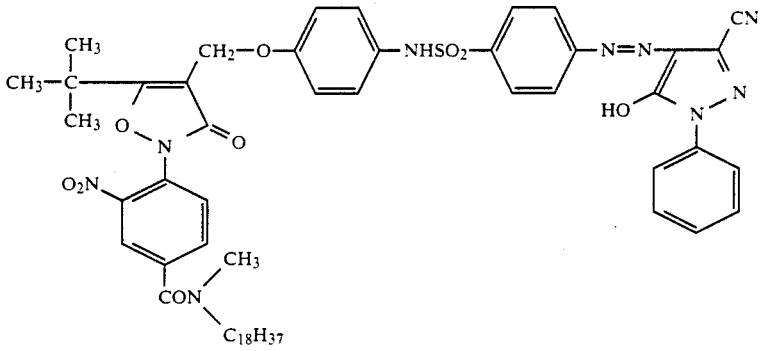
(11)
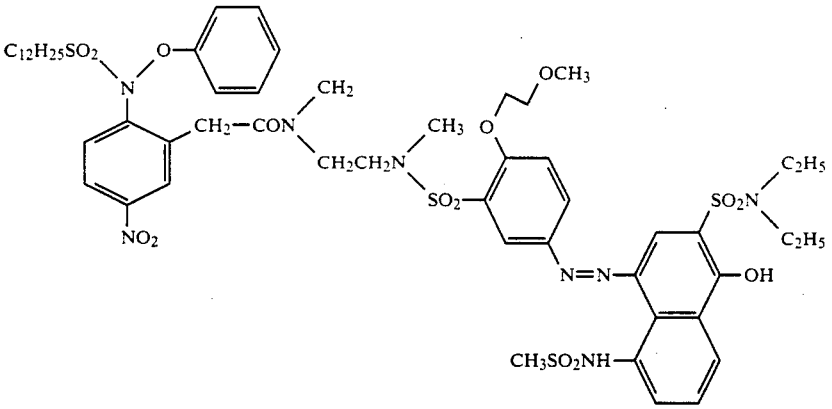
(12)
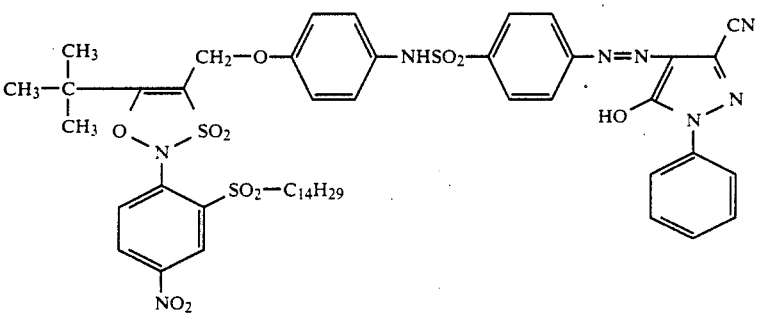

-continued
(13)
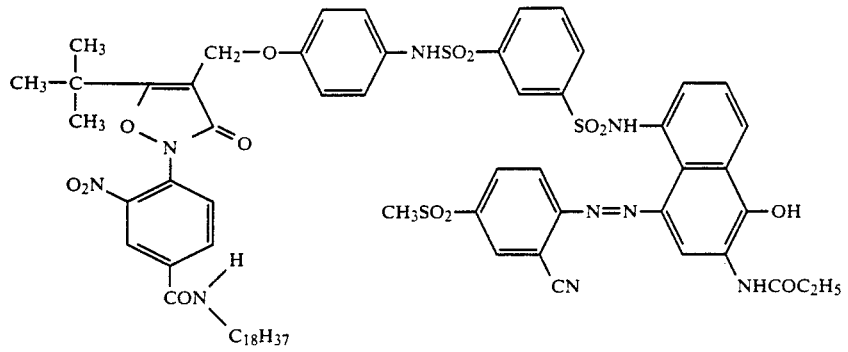
(14)
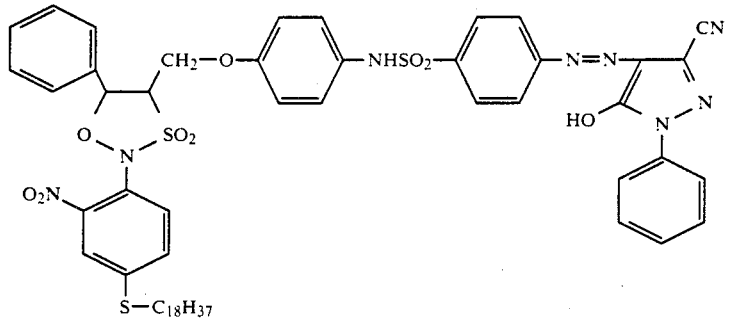
(15)
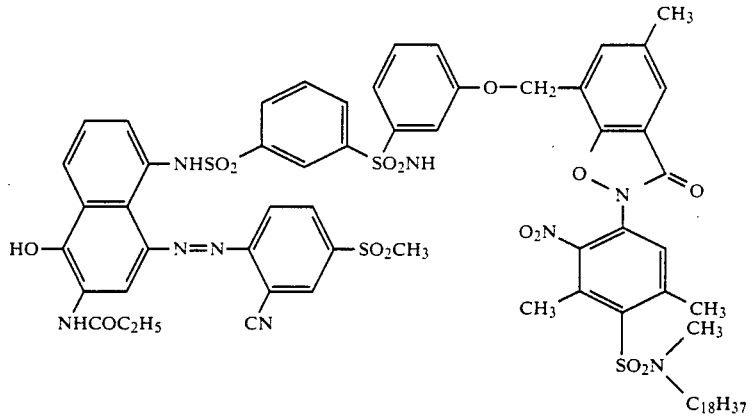
(16)
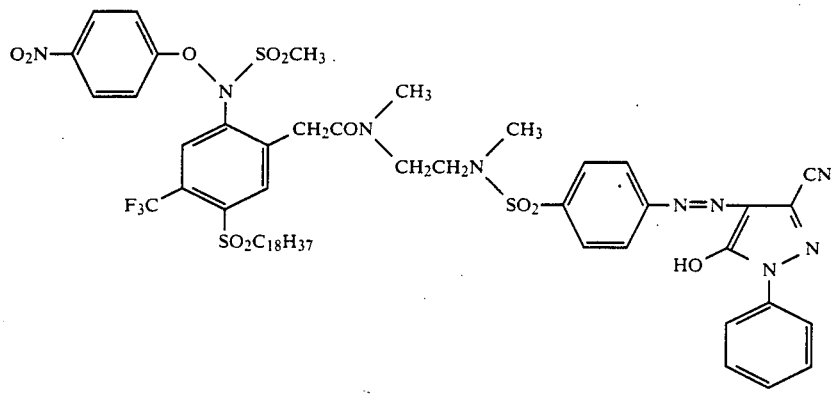

-continued
(17)
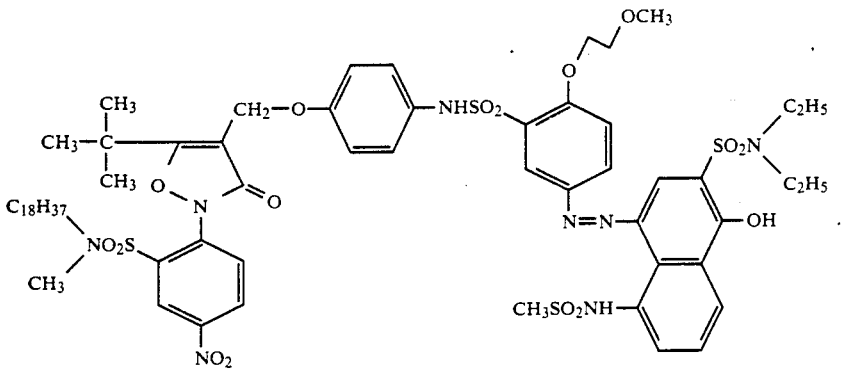
(18)
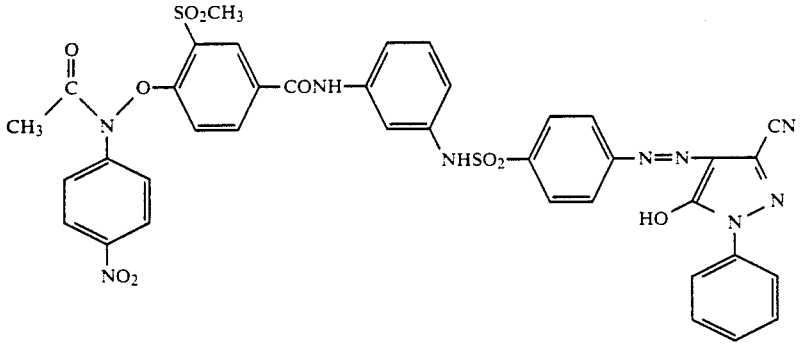
(19)
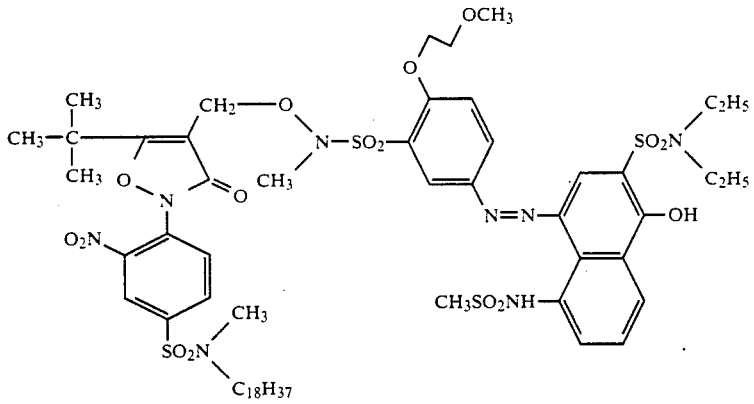
(20)
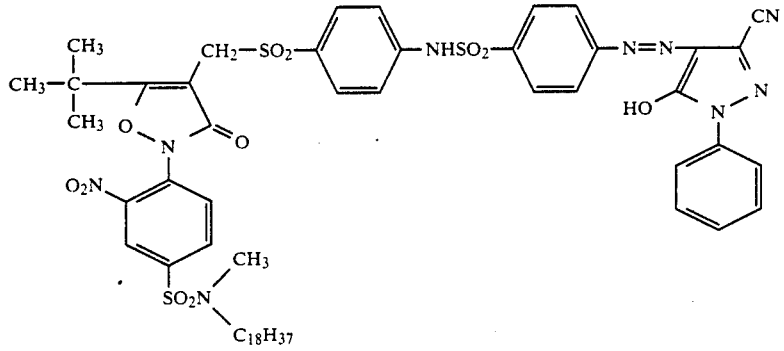

-continued
(21)
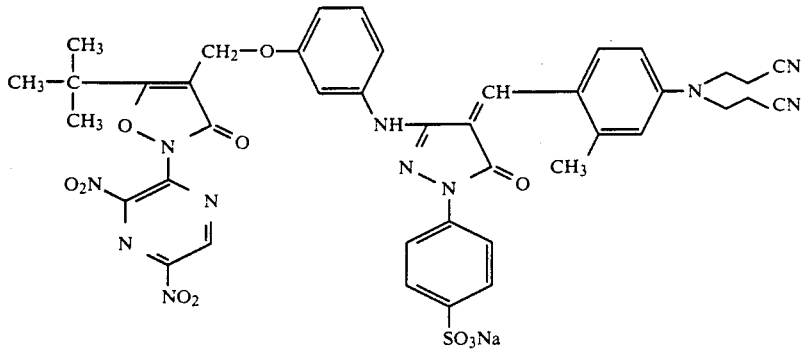
(22)
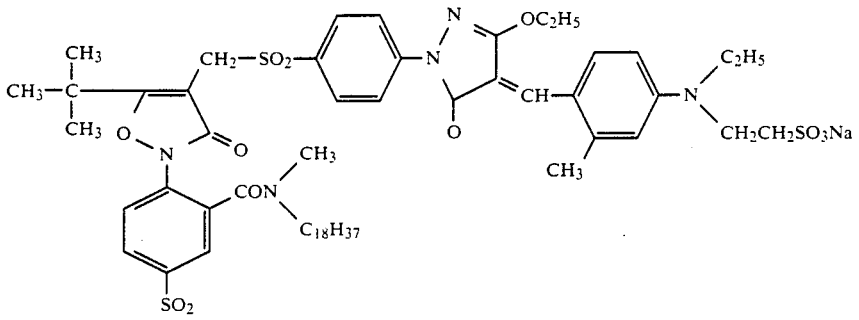
(23)
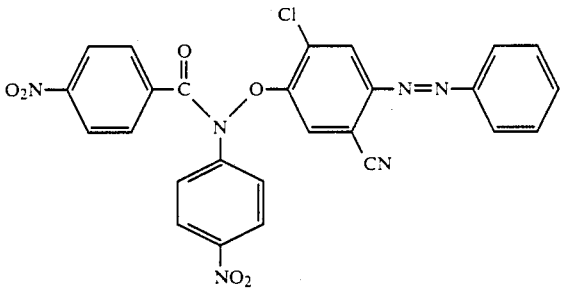
(24)
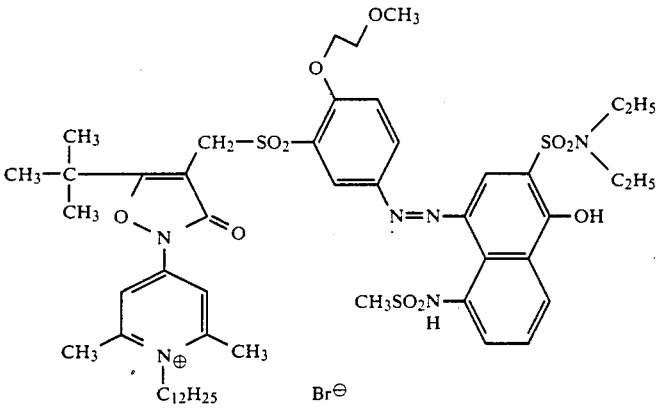

-continued
(25)
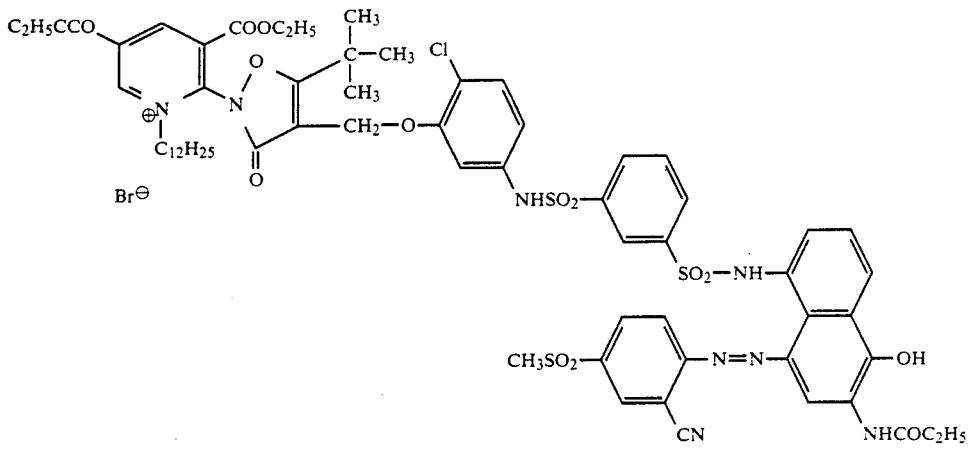
(26)
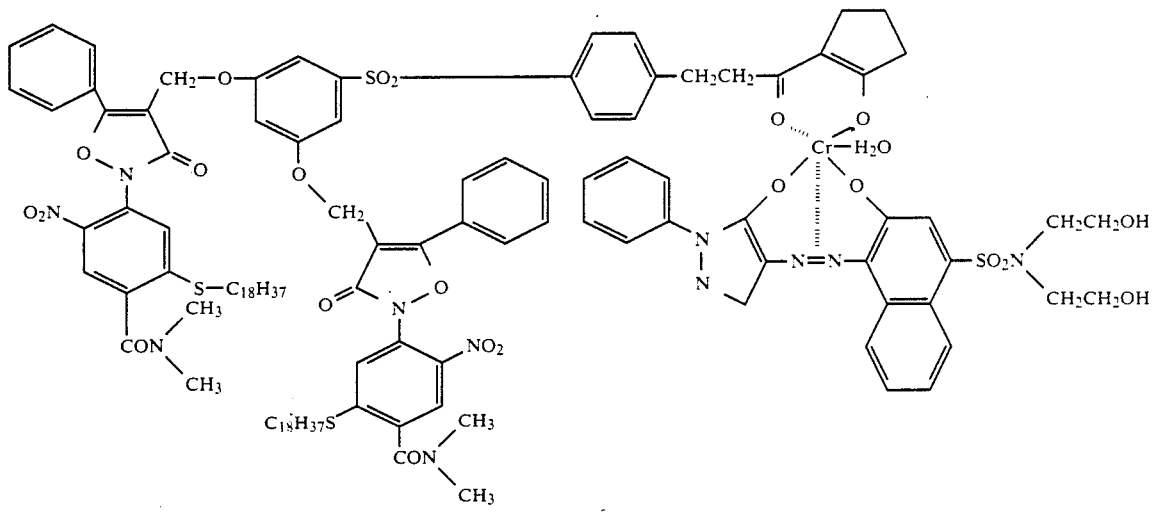
(27)
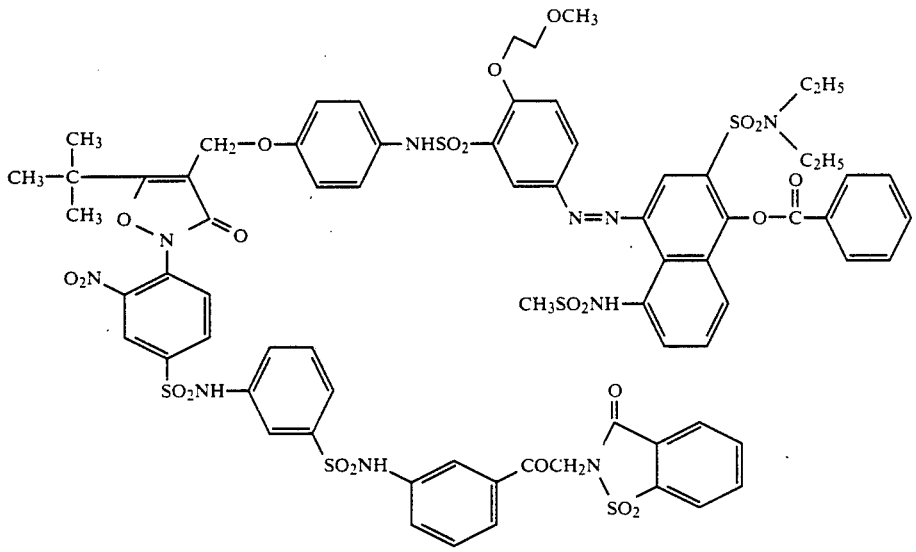

-continued
(28)
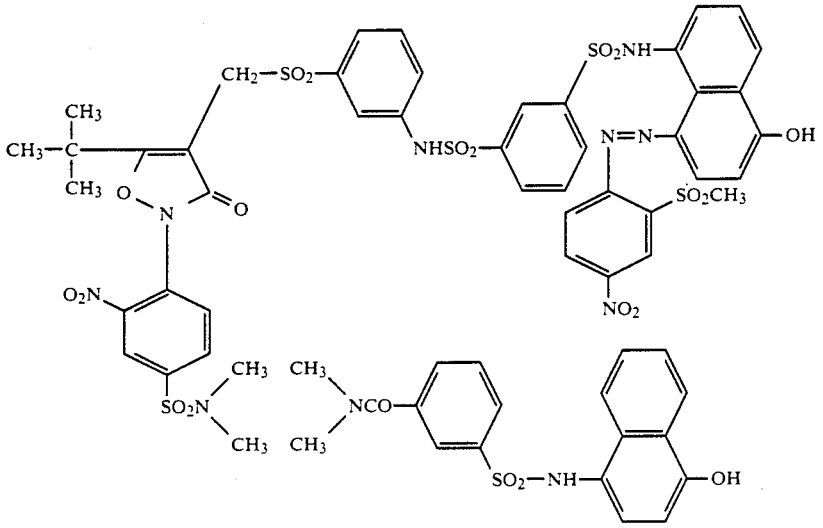
(29-1)
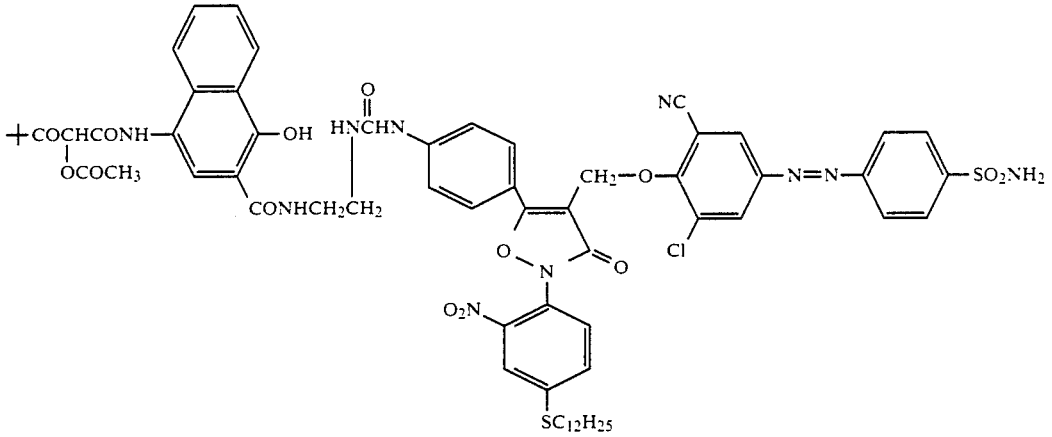
(29-2)
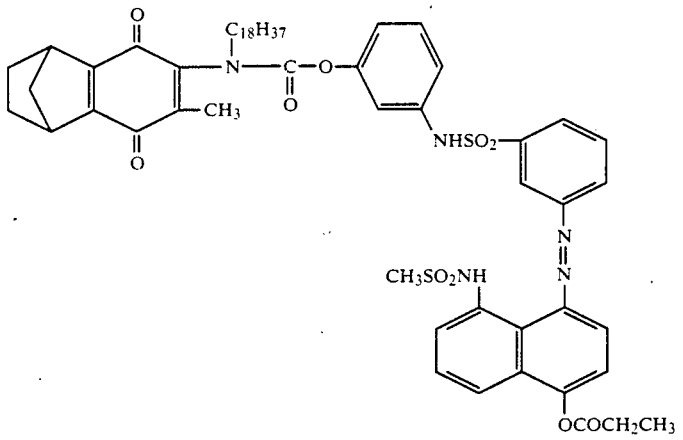

-continued
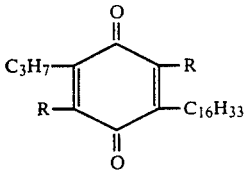
(30)
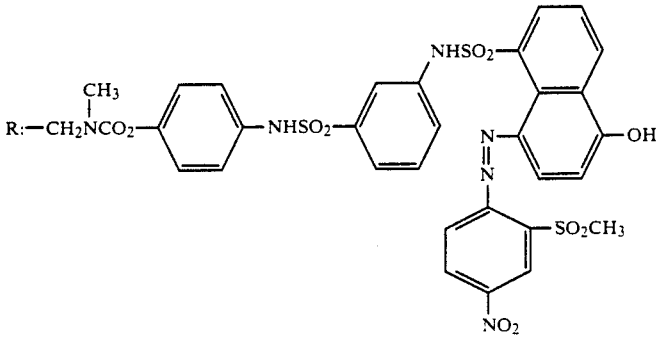
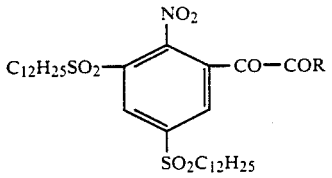
(31)
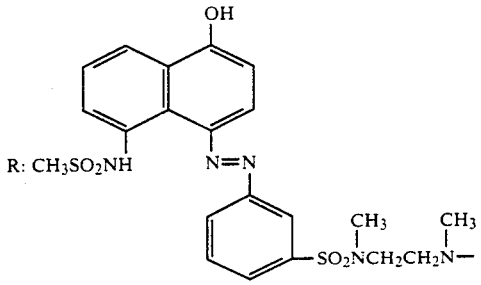
(32)
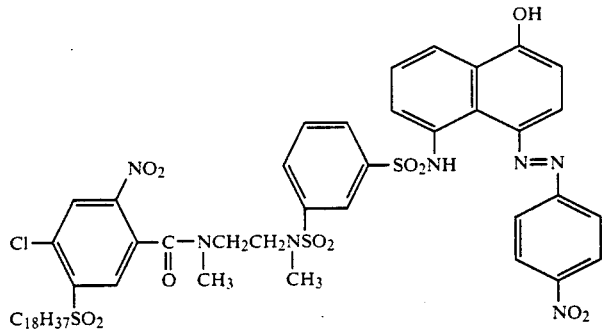
(33)
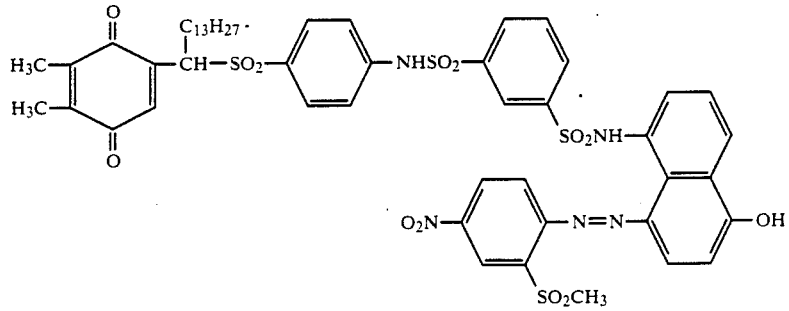

-continued
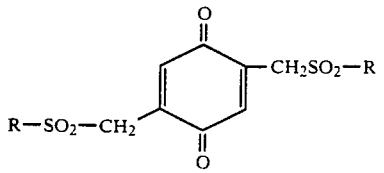
(34)
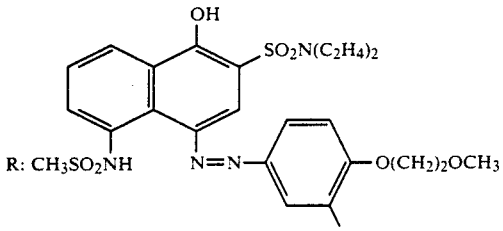
(35)
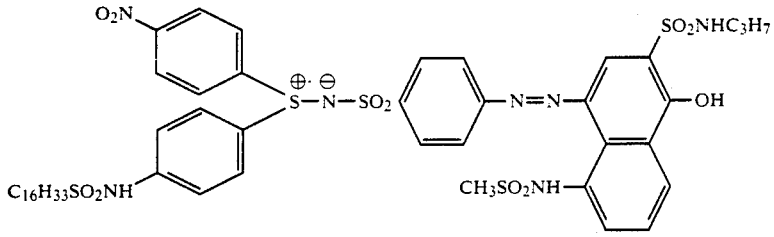
(36)
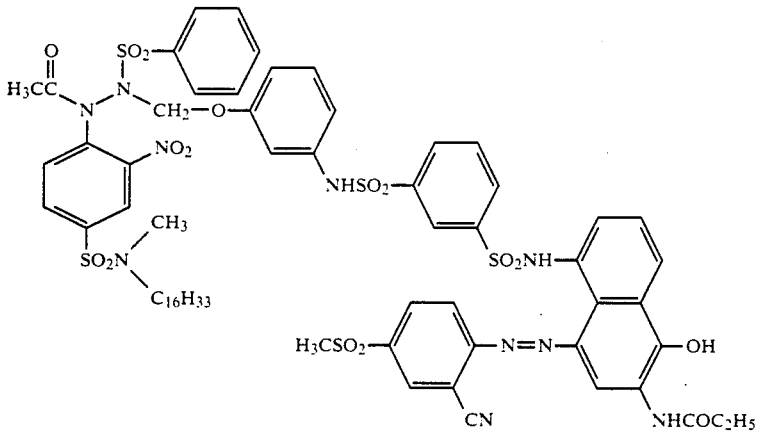
(37)
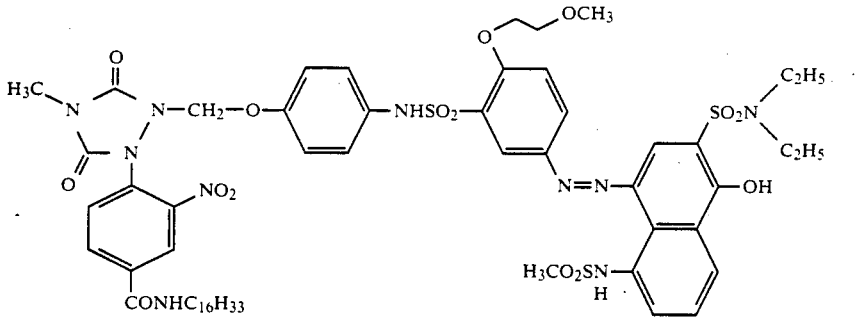
(38)
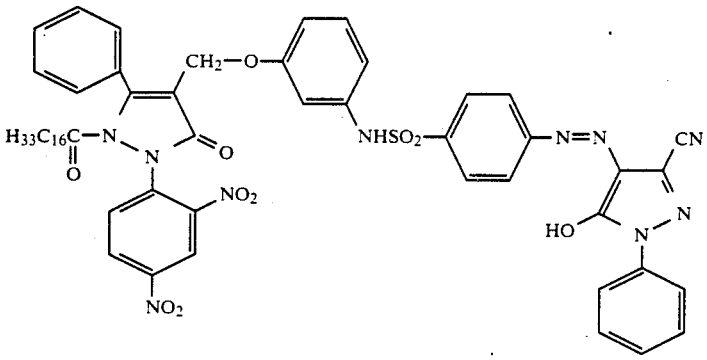

-continued
(39)
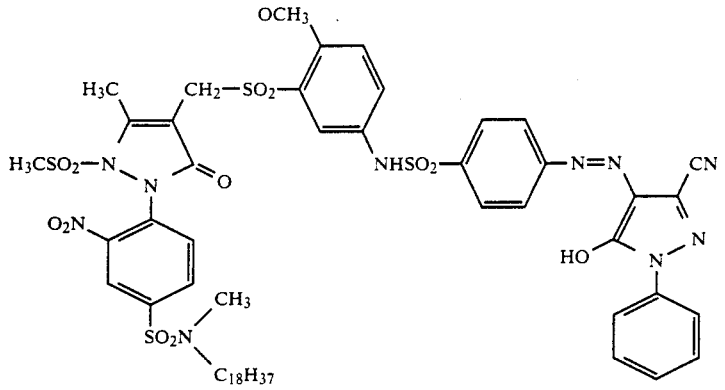
(40)
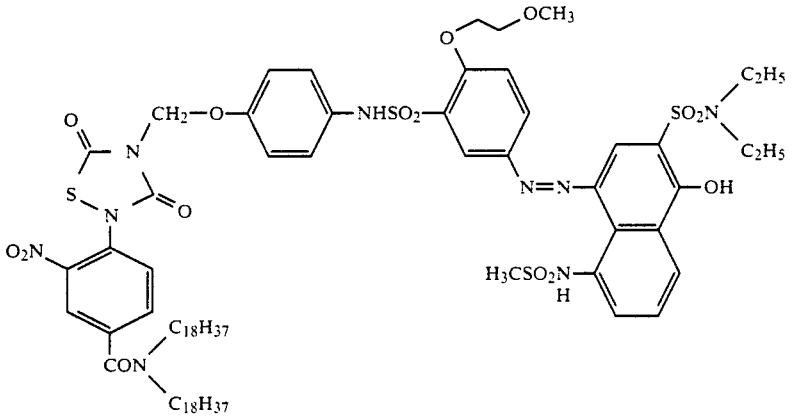
(41)
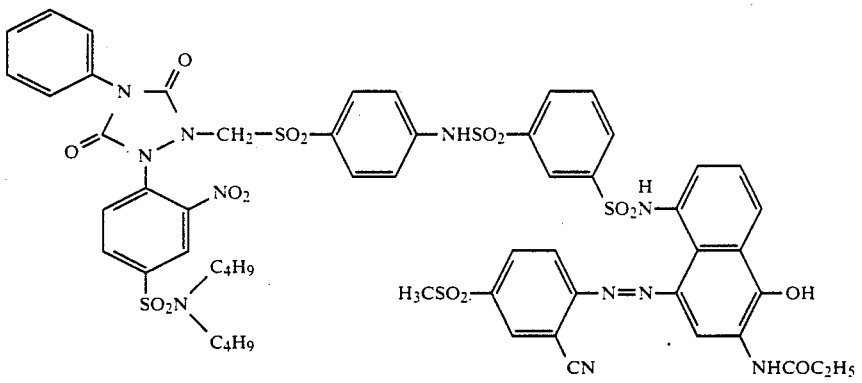
(42)
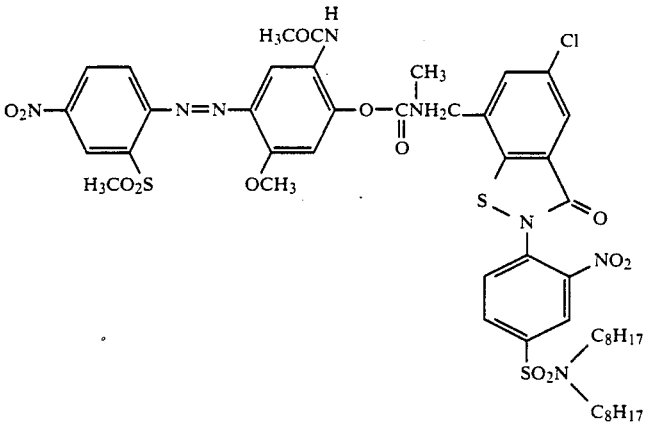

-continued (43)

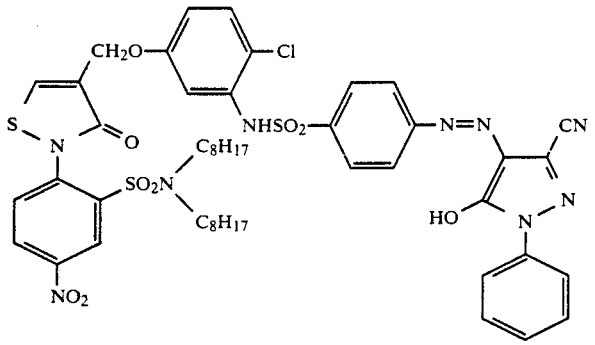

(44)

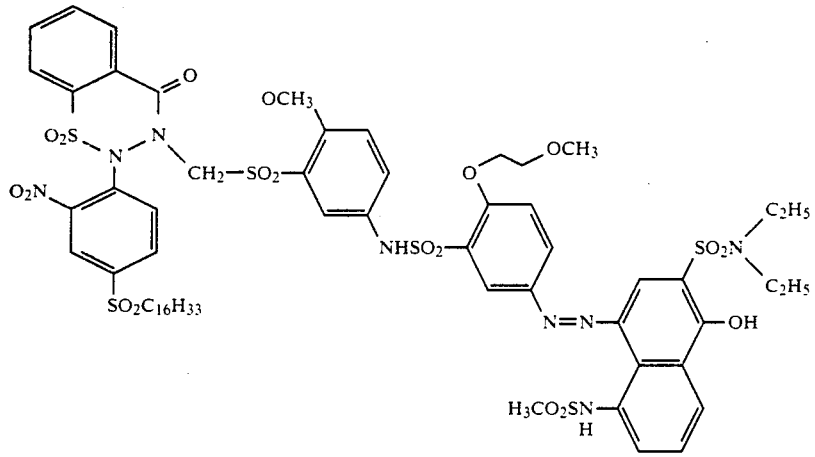

(45)

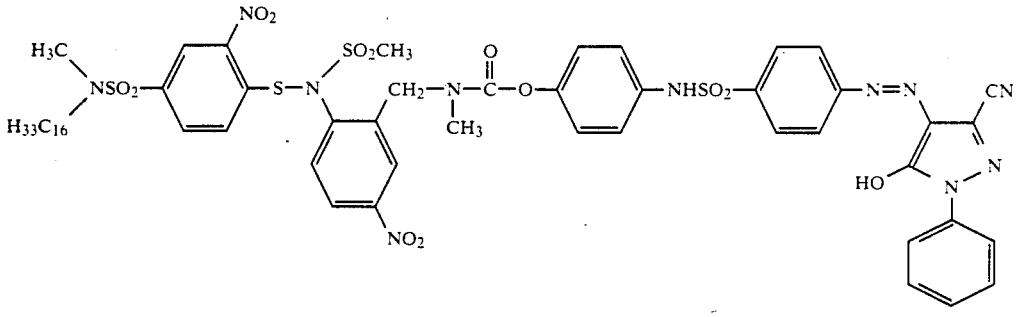

The amount of the dye providing substance to be used depends on the absorption coefficient of the dye and is generally in the range of 0.05 to 5 mmol/$m^2$, preferably 0.1 to 3 mmol/$m^2$. Such a dye providing substance may be used singly or in combination with other such dye providing substances.

In the present invention, a reductive substance may be used. The reductive substance may be incorporated in a processing solution from the outside of the present color light-sensitive material, or may be previously incorporated in the light-sensitive material. Alternatively, the same or different types of reductive substances may be incorporated in a processing solution while another reductive substance is previously incorporated in the light-sensitive material.

The reductive substance may be either an inorganic compound or an organic compound and its oxidation potential is preferably lower than the standard oxidation-reduction potential of silver ion/silver (0.8V).

Examples of such inorganic reductive substances include metals having an oxidation potential of 0.80V or less, such as Mn, Ti, Si, Zn, Cr, Fe, Co, Mo, Sn, Pb, W, $H_2$, Sb, Cu, and Hg; ions or complex compounds thereof having an oxidation potential of 0.8V or less, such as $Cr^{2+}$, $V^{2+}$, $Cu^{+}$, $Fe^{2+}$, $MnO_4^{2-}$, $I^-$, $Co(CN)_6^{4-}$, $Fe(CN)_6^{4-}$, and $(Fe\text{-}EDTA)^{2-}$; hydrogenated metals having an oxidation potential of 0.8 V or less, such as NaH, LiH, KH, $NaBH_4$, $LiBH_4$, $LiAl(O\text{—}t\text{—}C_4H_9)_3H$, and $LiAl(OCH_3)_3H$; and sulfur or phosphorus compounds having an oxidation potential of 0.8 V or less, such as $Na_2SO_3$, NaHS, $NaHSO_3$, $H_3P$, $H_2S$, $Na_2S$, and $Na_2S_2$.

As reductive substances of organic compound there may be used organic nitrogen compounds, such as alkylamines and arylamines; organic sulfur compounds such as alkylmercaptans and arylmercaptans; or organophosphorus compounds, such as alkylphosphines and arylphosphines. Particularly, a silver halide reductive agent according to Kendal-Pelz equation described in James, *The Theory of the Photographic Process* (4th edition, p. 299 (1977)) can preferably be used.

Preferred examples of such reductive agents include 3-pyrazolidones and precursors thereof, such as 1-phenyl-3-pyrazolidone, 1-phenyl-4,4-dimethyl-3-pyrazolidone, 4-hydroxymethyl-4-methyl-1-phenyl-3-pyrazolidone, 1-m-tolyl-3-pyrazolidone, 1-p-tolyl-3-pyrazolidone, 1-phenyl-4-methyl-3-pyrazolidone, 1-phenyl-5-methyl-3-pyrazolidone, 1-phenyl-4,4-bis(hydroxymethyl)-3-pyrazolidone, 1,4-di-methyl-3-pyrazolidone, 4-methyl 3-pyrazolidone, 4,4-dimethyl-3-pyrazolidone, 1-(3-chlorophenyl)-4-methyl-3-pyrazolidone, 1-(4-chlorophenyl)-4-methyl-3-pyrazolidone, 1-(4-tolyl)-4-methyl-3-pyrazolidone, 1-(2-tolyl)-4-methyl-3-pyrazolidone, 1-(4-tolyl)-3-pyrazolidone, 1-(3-tolyl)- 3-pyrazolidone, 1-(3-tolyl)-4,4-dimethyl-3-pyrazolidone, 1-(2-trifluoroethyl)-4,4-dimethyl-3-pyrazolidone, 5-methyl-3-pyrazolidone, 1,5-diphenyl-3-pyrazolidone, 1-phenyl-4-methyl-4-stearoyloxymethyl 3-pyrazolidone, 1-phenyl-4-methyl-4-lauroyloxymethyl-3-pyrazolidone, 1-phenyl-4,4-bis(lauroyloxymethyl)-3-pyrazolidone, 1-phenyl-2-acetyl-3-pyrazolidone, and 1-phenyl-3-acetoxypyrazolidon; and hydroquinones and precursors thereof, such as hydroquinone, trihydroquinone, 2,6-dimethylhydroquinone, t-butylhydroquinone, 2,5-di-t-butylhydroquinone, t-octylhydroquinone, 2,5-di-t-octylhydroquinone, pentadecylhydroquinone, sodium 5-pentadecylhydroquinone-2-sulfonate, p-benzoyloxyphenol, 2-methyl-4-benzoyloxyphenol, and 2-t-butyl-4-(4-chlorobenzoyloxy)phenol.

Other useful examples of silver halide reductive agents include a color developing agent such as a p-phenylene color developing agent, e.g. N,N-diethyl-3-methyl-p-phenylenediamine as described in U.S. Pat. No. 3,531,286. Examples of reductive agents which can be more preferably used include aminophenols as described in U.S. Pat. No. 3,761,270. Particularly preferred among such aminophenol reductive agents are 4-amino-2,6-dibromophenol, 4-amino-2,6-dibromophenol, 4-amino-2-methylphenol sulfate, 4-amino-3-methylphenol sulfate, and 4-amino-2,6-dichlorophenol hydrochloride. Other useful examples of such reductive agents include 2,6-dichloro-4-substituted sulfoamidophenols, and 2,6-dibromo-4-substituted sulfoamidophenols as described in *Research Disclosure,* No. 15108 and U.S. Pat. No. 4,021,240; and p-(N,N-dialkylphenyl)-sulfamines as described in Japanese Patent Application (OPI) No. 116740/84. Besides the above described phenolic reductive agents there may be used naphtholic reductive agents, particularly 4-amino-naphthol derivatives and 4-substituted sulfoamidonaphthol derivatives as described in Japanese Patent Application (OPI) No. 259253/86. Further examples of general color developing agents which can be used in the present invention include aminohydroxypyrazole derivatives as described in U.S. Pat. No. 2,895,825, aminopyrazoline derivatives as described in U.S. Pat. No. 2,892,714, and hydrazone derivatives as described in *Research Disclosure,* Nos. 19412 and 19415 (June 1980, pp. 227–230, pp. 236–240). These color developing agents may be used singly or in combination.

If a nondiffusible reductive substance is incorporated in the light-sensitive material, an electron transfer agent (ETA) may be preferably used in combination with the reductive substance in order to accelerate the transfer of electrons between the reductive substance and the developable silver halide emulsion.

Such an electron transfer agent can be selected among the above described reductive substances. Such as electron transfer agent preferably has a higher mobility than an immobile reductive substance in order to provide a better effect. In this case, as a reductive substance to be used in combination with ETA there can be used any one of the above described reductive agents which substantially doesn't move in the layer of light-sensitive material. Particularly preferred examples of such reductive agents include hydroquinones, aminophenols, aminonaphthols, 3-pyrazolidinones, saccharine and precursors thereof, picoliniums, and compounds as described as electron donors in Japanese Patent Application (OPI) No. 110827/78.

As ETA to be used in combination with these compounds there can be used any ETA whose oxide can undergo cross oxidation with these compounds. Preferred examples of such ETA include diffusible 3-pyrazolidinones, aminophenols, phenylenediamines, and reductones.

The present color light-sensitive material can be used as a so-called conventional color diffusion transfer light-sensitive material which is developed with a developing solution at near normal temperature or as a heat-developable color light-sensitive material.

If the color light-sensitive material of the present invention is applied to such a conventional color diffusion transfer light-sensitive material, the above described reductive substance or a combination of such a reductive substance and ETA may be preferably allowed to act on the light-sensitive material by supplying it to the light-sensitive material in the form of a developing solution during the development or by supplying ETA to the light-sensitive material in the form of a developing solution with the reductive substance incorporated in the light-sensitive material. In the former process, the amount of the reductive substance and/or ETA to be used is 0.001 to 1 mol per mol of the total solution. In the latter process, the amount of the reductive substance and ETA to be used are preferably 0.01 to 50 mols per mol of dye providing substance and 0.001 to 1 mol per liter of the total solution, respectively.

On the other hand, if the present color light-sensitive material is applied to a heat-developable color light-sensitive material, the reductive substance or a combination of such a reductive substance and ETA is preferably incorporated in the heat-developable color light-sensitive material. In this case, the amount of the reductive substance to be used is 0.01 to 50 mols, preferably 0.1 to 5 mols of dye providing substance, or 0.001 to 5 mols, preferably 0.01 to 1.5 mols, per mol of silver halide.

The incorporation of the above described development inhibitor precursor, dye providing compound, and other hydrophobic additives in the layer of light-sensitive element can be accomplished by any suitable methods as described in U.S. Pat. No. 2,332,027. In this process, a high boiling organic solvent as described in Japanese Patent Application (OPI) Nos. 83154/84, 178451/84, 178452/84, 178453/84, 178454/84, 178455/84, and 178457/84 can be optionally used in combination with a low boiling organic solvent having a boiling point of 50° to 160° C.

The amount of such a high boiling organic solvent to be used is 10 g or less, preferably 5 g or less, per gram of dye providing substance.

Alternatively, a dispersion process using a polymer as described in Japanese Patent Publication No. 39853/76 and Japanese Patent Application (OPI) No. 59943/76 can be used.

If the compound to be dispersed in the light-sensitive element is a substantially water-insoluble compound, it can be dispersed in the light-sensitive material by dispersing finely divided particles of the compound in a binder and then incorporating the binder in the light-sensitive material.

If a hydrophobic substance is dispersed in a hydrophilic colloid, it can be accomplished with various surface active agents. For example, surface active agents as described in Japanese Patent Application (OPI) No. 157636/84 can be used.

As suitable silver halide for the present color light-sensitive material there may be used silver chloride, silver bromide, silver bromochloride, silver iodochloride, or silver bromoiodochloride.

More specifically, any silver halide emulsions as described in U.S. Pat. No. 4,500,626, *Research Disclosure,* No. 17029 (June 1978, pp. 9–10), and Japanese Patent Application (OPI) Nos. 107240/86, 85241/87, and 87957/87 can be used.

The silver halide emulsion to be used in the present invention may be of the surface latent image type in which latent images are formed mainly in the surface thereof or the internal latent image type in which latent images are formed mainly in the interior thereof. The present silver halide emulsion may be a so-called core shell emulsion having different phases from the interior to the surface of the grains. In the present invention, a direct reversal emulsion comprising a combination of an internal latent image type emulsion and a nucleating agent can be used.

The silver halide emulsion may be used unripened but is normally used after being chemically sensitized. An emulsion for ordinary type light-sensitive material can be sensitized by a known sulfur sensitizing process, reduction sensitizing process, or noble metal sensitizing process, or a combination thereof. These chemical sensitizing processes may be effected in the presence of a nitrogen-containing heterocyclic compound as described in Japanese Patent Application (OPI) Nos. 126526/83 and 215644/83.

The coated amount of the present light-sensitive silver halide is 1 mg to 10 g/m$^2$ in terms of silver.

The silver halide to be used in the present invention may be spectrally sensitized with methine dyes or other dyes. Examples of such dyes which can be used in the spectral sensitization include cyanine dyes, melo cyanine dyes, complex cyanine dyes, complex melocyanine dyes, holopolar cyanine dyes, hemicyanine dyes, styryl dyes, and hemioxonol dyes.

More specifically, sensitizing dyes as described in Japanese Patent Application (OPI) Nos. 180550/84 and 140335/85 and *Research Disclosure,* No. 17029 (June 1978, pp. 12–13), and heat-decolorable sensitizing dyes as described in Japanese Patent Application (OPI) Nos. 111239/85 and 32446/87 may be used.

These sensitizing dyes can be used singly or in combination. A combination of sensitizing dyes is particularly useful for the purpose of supersensitization.

A dye which itself doesn't have a spectral sensitizing effect or supersensitizing substance which doesn't substantially absorb visible light may be incorporated in the emulsion together with such a sensitizing dye. Examples of such a dye or supersensitizing substance are described in U.S. Pat. Nos. 2,933,390, 3,635,721, 3,743,510, 3,615,613, 3,615,641, 3,617,295, and 3,635,721.

These sensitizing dyes can be added to the emulsion during or before or after the chemical ripening Alternatively, these sensitizing dyes can be added to the emulsion before or after the formation of particulate silver halide as described in U.S. Pat. Nos. 4,183,756 and 4,225,666.

The added amount of the sensitizing dye is normally in the range of $10^{-5}$ to $10^{-2}$ mol per mol of silver halide.

The present color light-sensitive material may be provided on a different support from the image-receiving element (dye fixing element) or a film unit combined with the image-receiving element.

In a typical embodiment of film unit, the above described image-receiving element and light-sensitive element are laminated on a transparent support so that the light-sensitive element doesn't need to be peeled off the image-receiving element after the completion of a transferred image. More specifically, the image-receiving element comprises at least one mordant layer. A preferred embodiment of the light-sensitive element may comprise a combination of a blue-sensitive emulsion layer, a green-sensitive emulsion layer, and a red-sensitive emulsion layer; a combination of a green-sensitive emulsion layer, a red-sensitive emulsion layer, and an infrared-sensitive emulsion layer; or a combination of a blue-sensitive emulsion layer, a red-sensitive emulsion layer, and an infrared-sensitive emulsion layer, with the respective emulsion layers combined with a yellow dye providing substance, a magenta dye providing substance, and a cyan dye providing substance, respectively. (The term "infrared-sensitive emulsion layer" as used herein means an emulsion layer having a light-sensitivity to light of wavelength of 700 nm or more, particularly 740 nm or more). Furthermore, a white reflecting layer containing a solid pigment such as titanium oxide may be provided between the mordant layer and the light-sensitive layer or the dye providing substance-containing layer so that a transferred image can be observed through the transparent support. A light-shielding layer may be further provided between the white reflecting layer and the light-sensitive layer so that the development processing can be conducted in a light place. A peel-apart layer may be optionally provided in a proper location so that the light-sensitive element can be entirely or partially peeled off the image receiving element. Such an embodiment is described in Japanese Patent Application (OPI) No. 67840/81 and Canadian Patent 674,082.

Another embodiment which doesn't need peeling may comprise the above described light-sensitive element coated on a transparent support, a white reflecting layer coated thereon, and an image-receiving layer laminated thereon. An embodiment which comprises a lamination of an image-receiving element, a white reflecting layer, a peel-apart layer, and a light-sensitive element on the same support so that the light-sensitive element can be intentionally peeled off the image-receiving element is described in U.S. Pat. No. 3,730,718. On the other hand, a construction comprising a light-sensitive element and an image-receiving element separately coated on two supports can be roughly divided into two typical embodiments, i.e. peel-apart type and non-peeling type. More specifically, a preferred embodiment of peel-apart type film unit comprises a light-reflecting layer provided on the back side of a support, the surface of the light-reflecting layer having at least one image-receiving layer coated thereon. A light-sensitive element is coated on a support having a light-shielding layer. In this arrangement, the light-sensitive layer-coated surface and the mordant layer-coated surface are not opposed to each other before exposure, but the light-sensitive layer-coated surface is turned over so that it is opposed to the image-receiving layer-coated surface after exposure (e.g., during development). After a transferred image is completed on the mordant layer, the light-sensitive element can be smoothly peeled off the image-receiving element.

A preferred embodiment of non-peeling film unit may comprise at least one mordant layer coated on a transparent support, and a light-sensitive element coated on a transparent support or support having a light-shielding layer, the light-sensitive layer-coated surface and the mordant layer-coated surface being opposed to each other.

The above two embodiments can be all applied to the color diffusion transfer process or heat development process. Particularly, in the former embodiment, a pressure-rupturable container (processing element) containing an alkaline processing solution may be provided. In a non-peeling film unit comprising an image-receiving element and a light-sensitive element laminated on a support, such a processing element is preferably provided between the light-sensitive element and a cover sheet superimposed thereon. In an embodiment comprising a light-sensitive element and an image-receiving element comprising a light-sensitive element and an image-receiving element separately coated on two supports, the processing element is preferably provided between the light-sensitive element and the image-receiving element at latest during development. Such a processing element preferably comprises a light-shielding layer (carbon black, or a dye which changes color under some pH condition) and/or white pigment (e.g., titanium oxide) depending on the embodiment of the film unit. In the film unit for color diffusion transfer process, a neutralization timing mechanism comprising a combination of a neutralization layer and a neutralization timing layer may be preferably incorporated in the cover sheet, image-receiving element, or light-sensitive element.

On the other hand, in a film unit for a heat development process, a heating layer containing electrically conductive fine particles of metal, carbon black, graphite, or the like may be provided in a proper position in the support, light-sensitive element, or image-receiving element so that Joules heat produced upon passage of electric current can be used for heat development or transfer of dye. Such electrically conductive particles can be replaced by semi-conductive inorganic materials such as silicon carbide, molybdenum silicate, lanthanum chloride, barium titanate ceramics, tin oxide, and zinc oxide.

The present invention will be further described with reference to the case where the present invention is applied to a heat-developable color light-sensitive material.

If the present invention is applied to a heat-developable color light-sensitive material, an organic metal salt may be used as an oxidizing agent together with silver halide. In this case, it is necessary that the light-sensitive silver halide and the organic metal salt be in contact with or in adjacent to each other.

Particularly preferred among these organic metal salts are organic silver salts.

As organic compounds to be used for the formation of the above described organic silver salt oxidizing agent there can be used compounds as described in Japanese Patent Application (OPI) No. 107240/86 and U.S. Pat. No. 4,500,626. Other useful examples of such compounds include silver salts of carboxylic acid containing an alkynyl group such as silver phenylpropiolate as described in Japanese Patent Application (OPI) No. 231542/86, and acetylene silver as described in Japanese Patent Application (OPI) No. 249044/86. These organic silver salts may be used in combination.

The amount of the above described organic silver salt to be used is normally in the range of 0.01 to 10 mols, preferably 0.01 to 1 mol, per mol of light-sensitive silver halide. The total coated amount of the light-sensitive halide and the organic silver salt is 50 mg to 10 g/m$^2$ in terms of silver.

In the present invention, a compound which serves to both activate development and stabilize images can be used. Specific examples of such a compound which can be preferably used in the present invention are described in U.S. Pat. No. 4,500,626.

In the present invention, various anti-foggants or photographic stabilizers can be used. Examples of such anti-foggants or photographic stabilizers which can be used in the present invention include azoles and azaindenes as described in *Resent Disclosure* (Dec. 1978, pp. 24 to 25), carboxylic acids and phosphoric acids containing nitrogen atoms as described in Japanese Patent Application (OPI) No. 168442/84, mercapto compounds and metal salts thereof as described in Japanese Patent Application (OPI) No. 111636/84, and acetylene compounds as described in Japanese Patent Application (OPI) No. 228267/85.

The present color light-sensitive material may optionally comprise various conventional additives for heat-developable light-sensitive material, or layers in addition to the light-sensitive layer such as protective layer, interlayer, anti-static layer, anti-halation layer, peel-apart layer for facilitating peeling from the dye fixing element, and matting layer. Examples of such various conventional additives include plasticizers, matting agents, sharpness improving dyes, antihalation dyes, surfacer active agents, fluorescent brightening agents, anti-slip agents, antioxidants, and anti-fading agents as described in *Research Disclosure* (June 1978, pp. 9 to 15) and Japanese Patent Application (OPI) No. 88256/86.

Particularly, the protective layer may normally contain an organic or inorganic matting agent to inhibit adhesion. The protective layer may also contain a mordant or ultraviolet light absorber. The protective layer and the interlayer each may consist of two or more layers.

The interlayer may also contain a reductive agent for inhibiting color fading or color stain, an ultraviolet light absorber, or a white pigment such as titanium dioxide. Such a white pigment may be incorporated in the emulsion layer besides the interlayer to improve sensitivity.

The image-receiving element (hereinafter referred to as "dye fixing element") may optionally comprise a protective layer, a peel-apart layer, an anticurl layer, or other auxiliary layers. Particularly, such a protective layer may be effectively provided. One or more of the above described layers may optionally contain a hydrophilic heat solvent, a plasticizer, an anti-fading agent, an ultraviolet light absorber, a lubricant, a matting agent, an antioxidant, a dispersed vinyl compound for increasing dimensional stability, a surface active agent, a fluorescent brightening agent, or the like. Particularly, in a system where heat development and dye transfer are simultaneously effected in the presence of a small amount of water, the dye fixing element may preferably contain a base and/or base precursor described later to improve the preservability of the light-sensitive element. Specific examples of these additives are described in Japanese Patent Application (OPI) No. 88256/86.

The light-sensitive element and/or dye fixing element in a heat developable color light-sensitive material may comprise an image formation accelerator. Such an image formation accelerator can serve to accelerate oxidation-reduction reaction of a silver salt oxidizing agent with a reductive agent, production or decomposition of a dye or release of a diffusible dye from a dye providing substance, and transfer of a dye from a light-sensitive material layer to a dye fixing layer. From the standpoint of physicochemical function, such an image formation accelerator has many categories such as base or base precursor, nucleophilic compound, high boiling organic solvent (oil), heat solvent, surface active agent, and compound capable of interacting with silver or silver ion. However, these substance groups normally have a composite function and thus have a plurality of the above described acceleration effects. This is further described in Japanese Patent Application (OPI) No. 93451/86.

There are various methods for generating a base. Compounds which can be used in these methods can be effectively used as base precursors. Examples of such methods include a method described in Japanese Patent Application (OPI) No. 169585/85 which comprises mixing a difficultly soluble metal compound with a compound capable of complexing with metal ions constituting said difficultly soluble metal compound (complexing compound) to generate a base, and a method described in Japanese Patent Application (OPI) No. 232451/86 which comprises electrolysis to generate a base.

Particularly, the former method may be effectively used. Examples of such a difficultly soluble metal compound, include carbonate, hydroxide, and oxide of zinc, aluminum, calcium, and barium. Such a complexing compound is further illustrated in A. E. Martell and R. M. Smith, *Critical Stability Constants* (Vol. 4 and Vol. 5, Plenum Press). Specific examples of such a complexing compound include salts of aminocarboxylic acids, iminodiacetic acids, pyridylcarboxylic acids, aminophosphoric acids, carboxylic acids (such as monocarboxylic acids, dicarboxylic acids, tricarboxylic acids, tetracarboxylic acids, and compounds containing substituents such as phosphono group, hydroxyl group, oxo group, ester group, amido group, alkoxy group, mercapto group, alkylthio group, and phosphino group), hydroxamic acids, polyacrylates, and polyphosphoric acids with alkali metals, guanidines, amidines, or quaternary ammonium salts.

The difficultly soluble metal compound and the complexing compound may be preferably separately incorporated in the light-sensitive element and the dye fixing element.

The light-sensitive element and/or the dye fixing element in a heat developable color light-sensitive material may comprise various development stop agents for the purpose of obtaining constant images against fluctuations in processing temperature and processing time during development.

The term "development stop agent" as used herein means a compound which rapidly neutralizes or reacts with a base after proper development to reduce the base density in the film to stop development or a compound which interacts with silver or silver salts to inhibit development. Specific examples of such a development stop agent include acid precursors which release an acid upon heating, electrophilic compounds which undergo displacement reaction with a coexisting base upon heating, and nitrogen-containing heterocyclic compounds, mercapto compounds, and precursors thereof as described in Japanese Patent Application (OPI) Nos. 108837/85, 192939/85, 230133/85, and 230134/85.

As suitable development stop agents there also may be effectively used compounds which release a mercapto compound upon heating. Specific examples are those described in Japanese Patent Application (OPI) Nos. 67851/86, 147244/86, 12494/86, 185743/86, 182039/86, 185744/86, 184539/86, 188549/86, and 53632/86.

As a binder for the light-sensitive element and/or dye fixing element in a heat developable color light-sensitive material there can be a hydrophilic binder. A typical example of such a hydrophilic binder is a transparent or semi-translucent hydrophilic binder. Examples of such a hydrophilic binder include proteins such as gelatin and gelatin derivative; natural substances such as starch, gum arabic, and other polysaccharides; and synthetic polymerized substances such as polyvinyl pyrrolidone, acrylamide polymer, and other water-soluble polyvinyl compounds. Other examples of hydrophilic binders which can be used in the present invention include a dispersed vinyl compound for increasing the dimensional stability of a photographic material. Such a dispersed vinyl compound is normally used in the form of a latex. These binders may be used singly or in combination.

In the present invention, the coated amount of the binder is 20 g or less, preferably 10 g or less, particularly 7 g or less, per $m^2$.

The amount of the high boiling solvent to be dispersed in the binder together with a hydrophobic compound such as dye providing substance is 1 cc to less, more preferably 0.5 cc or less, particularly 0.3 cc or less, per g of binder.

The layers constituting the light-sensitive element and/or dye fixing element (photographic emulsion layer, dye fixing layer, etc.) may optionally contain an organic or inorganic film hardener.

Specific examples of such a film hardener are described in Japanese Patent Application (OPI) Nos. 147244/86 and 157636/84. These film hardeners may be used singly or in combination.

In order to accelerate the transfer of a dye, a hydrophilic heat solvent which stays solid at room temperature but becomes soluble at an elevated temperature may be incorporated in the light-sensitive element or dye fixing element. Such a hydrophilic heat solvent may be incorporated in either or both of the light-sensitive element and the dye fixing element. In the light-sensitive element or dye fixing element, such a hydrophilic heat solvent may be incorporated in any one of the emulsion layer, interlayer, protective layer, and dye fixing layer. Preferably, such a heat solvent may be incorporated in the dye fixing layer and/or adjacent layers thereto. Examples of such a hydrophilic heat solvent include ureas, pyridines, amides, sulfonamides, imides, alcohols, oximes, and other heterocycles. In order to accelerate the transfer of a dye, a high boiling organic solvent may be incorporated in the light-sensitive element and/or dye fixing element.

The support to be used for the light sensitive element and/or dye fixing element must be able to withstand the processing temperature. In general, suitable supports can be glass, paper, polymer film, metal, and analogous materials thereto. Other examples of such supports include those described as supports in Japanese Patent Application (OPI) No. 147244/86.

In an embodiment, the light-sensitive element and/or dye fixing element may comprise an electrically conductive heating element layer as a heating means for heat development or dye diffusion transfer.

In this case, such a transparent or opaque heating element can be prepared as a heating resistor by any suitable known methods. As such a heating resistor there may be used a thin film of inorganic material showing semi-conductivity or an inorganic thin film containing an electrically conductive particles dispersed therein. Examples of materials which can be used to prepare such a heating resistor are those described in Japanese Patent Application (OPI) No. 29835/86.

The coating of heat developable light-sensitive layer, protective layer, interlayer, subbing layer, back layer, dye fixing layer, and other layers can be accomplished by any suitable methods as described in U.S. Pat. No. 4,500,626.

As sources of light for imagewise exposure to record images on the light-sensitive element there can be used radiant sources emitting visible light or other rays. In general, light sources commonly used for ordinary color print can be used. Examples of such light sources include tungsten lamp, mercury vapor lamp, halogen vapor lamp such as iodine vapor lamp, xenon vapor lamp, laser source, CRT source, light-emitting diode, and other light sources as described in Japanese Patent Application (OPI) No. 147244/86 and U.S. Pat. No. 4,500,626.

The heat development step and the dye transfer step may be separately or simultaneously effected. Alternatively, the two steps may be sequentially effected. That is, the development step may be followed by the dye transfer step in a process.

For example, in one process, a light-sensitive element is imagewise exposed to light and heated. A dye fixing element is then superimposed on the light sensitive element. If necessary, the laminate is heated so that a mobile dye is transferred to the dye fixing element. In another process, a light-sensitive element is imagewise exposed to light. A dye fixing element is superimposed on the light sensitive element and heated. These two processes may be effected in an environment substantially free of water or in the presence of a slight amount of water.

In the heat development step, development can be accomplished by a heating temperature of about 18° C. to about 80° C., particularly about 25° C. to about 50° C. In the case where heat development is effected in the presence of a slight amount of water, the upper limit of heating temperature is not higher than the boiling point of the material. In the case where the transfer step is effected after the completion of the heat development step, transfer can be accomplished by a heating temperature in the range of the heating temperature at the heat development step to room temperature, preferably between 50° C. and the temperature about 10° C. lower than the heating temperature at the heat development step.

A preferred method for forming images comprises heating a light-sensitive material in the presence of a slight amount of water and a base and/or base precursor after or at the same time with imagewise exposure, and then transferring to a dye fixing layer a diffusible dye produced at portions counter-corresponding to silver images at the same time with development. In accordance with this process, the production or release of a diffusible dye proceeds at an extremely high reaction rate, accelerating the transfer of the diffusible dye to the dye fixing layer. This can provide a high density color image in a short period of time.

The amount of water to be used for wet-heat development in this embodiment may be as small as at least 0.1 time, preferably 0.1 or more times by weight the weight of total coated amount of the light-sensitive element and the dye fixing element but not more than the weight of the solvent corresponding to the maximum wet volume of the whole film coated (particularly not higher than the amount obtaining subtracting the weight of the whole film coated from the weight of the solvent corresponding to the maximum wet volume of the whole film coated).

The film becomes unstable when wet. Thus, the film can show local stain under some conditions. In order to avoid such a problem, the amount of water to be used in this embodiment is preferably as much as the wet volume of the total coated film of the light-sensitive element and the dye fixing element or less. More specifically, the amount of water to be used is 1 to 50 g, preferably 2 to 35 g, particularly 3 to 25 g, per $m^2$ of the total area of the light-sensitive element and the dye fixing element.

The base and/or base precursor to be used in this embodiment may be incorporated in the light-sensitive element or the dye fixing element. The base or base precursor may be supplied in the form of an aqueous solution.

In the above described embodiment, the image formation reaction system may preferably contain as base precursors a difficultly water soluble basic metal compound and a compound capable of complexing metal ions constituting the difficultly water-insoluble metal compound with water as a medium so that the reaction of the two compounds upon heating raises the pH value of the system. The term "image formation reaction system" as used herein means a region where an image formation reaction occurs. Specific examples of such a system include a layer belonging to both the light-sensitive element and the dye fixing element. In the case where two or more layers exist, any of these layers can be such a system.

The difficultly soluble metal compound and the complexing compound need to be incorporated in at least separate layers to prevent reaction before development. For example, in a so-called monosheet material in which a light-sensitive element and a dye fixing element are provided on the same support, the two compounds are preferably incorporated in separate layers with another layer interposed therebetween. In a more preferred embodiment, a difficultly soluble metal compound and a complexing compound are incorporated in layers provided on separate supports For example, the difficultly soluble metal compound is incorporated in a light-sensitive element while the complexing compound is incorporated in a dye fixing element comprising a different support from that of the light-sensitive element. The complexing compound may be supplied in the form of a solution in the coexisting water. Such a difficultly soluble metal compound is preferably incorporated in the element in the form of a dispersion of finely divided particles prepared by a suitable method as described in Japanese Patent Application (OPI) Nos. 174830/81 and 102733/78. The average particle size of such finely divided particles of difficultly soluble metal compound is 50 μm or less, preferably 5 μm or less. Such a difficultly soluble metal compound may be incorporated in any layer selected from light-sensitive layer, interlayer, and protective layer in the light-sensitive element. Alternatively, such a difficultly soluble metal compound may be incorporated separately in two or more layers.

The amount of the difficultly soluble metal compound or the complexing compound to be incorporated in the layers above the support depends on the type of compound to be used, the particle size of the difficultly soluble compound, the complexing reaction rate, or the like but is normally in the range of 50% by weight or less, preferably 0.01 to 40% by weight, in terms of weight of coated film. In the case where the complexing compound is supplied in the form of an aqueous solution, its concentration is preferably in the range of 0.005 to 5 mols, particularly 0.05 to 2 mols, per liter. Furthermore, the amount of the complexing compound to be incorporated in the present reaction system is preferably 1/100 to 100 times, particularly 1/10 to 20 times, that of the difficultly soluble compound by molar ratio.

The incorporation of water in the light-sensitive layer or dye fixing layer can be accomplished by any suitable method as described in Japanese Patent Application (OPI) No. 147244/86.

As heating means for development and/or transfer process there may be used a heating plate, an iron, a heating roller, and the like as described in Japanese Patent Application (OPI) No. 147244/86. Furthermore, the light-sensitive element and/or dye fixing element may be laminated with an electrically conductive material layer of graphite, carbon black, metal, or the like. In such an arrangement, direct heating can be accomplished by passing an electric current through the electrically conductive layer.

The pressure conditions for close adhesion of the light-sensitive element and the dye fixing element and methods for applying pressure to such a laminate are described in Japanese Patent Application (OPI) No. 147244/86.

The processing of the present heat developable color light-sensitive material can be accomplished by any suitable heat developing device as described in Japanese Patent Application (OPI) Nos. 75247/84, 177547/84, 181353/84, and 18951/85, and Japanese Utility Model Application (OPI) No. 25942/87.

The present invention will be further illustrated in the following examples, but the present invention should not be construed as being limited thereto.

EXAMPLE 1

The preparation of an emulsion for 1st layer will be described hereinafter.

600 ml of an aqueous solution containing sodium chloride and potassium bromide and an aqueous solution of nitric acid which had been prepared by dissolving 0.59 mol of silver nitrate in 600 ml of water were added at the same time to a well stirred aqueous solution of gelatin which had been prepared by dissolving 20 g of gelatin and 3 g of sodium chloride in 1,000 ml of water and kept at a temperature of 75° C. for 40 minutes at the same flow rates. As a result, a monodisperse emulsion of cubic particulate silver bromochloride having an average grain size of 0.35 μm (bromine: 80 mol %) wa obtained.

The emulsion thus obtained was then washed with water and desalted. 5 mg of sodium thiosulfate and 20 mg of 4-hydroxy-6-methyl-1,3,3a,7-tetrazaindene were added to the emulsion thus processed. The emulsion was then chemically sensitized at a temperature of 60° C. The yield of the desired emulsion was 600 g.

The preparation of an emulsion for the 3rd layer will be described hereinafter.

600 ml of an aqueous solution containing sodium chloride and potassium bromide, an aqueous solution of silver nitrate which had been prepared by dissolving 0.59 mol of silver nitrate in 600 ml of water, and a dye solution (I) described hereinafter were added at the same flow rates at the same time to a well stirred aqueous solution which had been prepared by dissolving 20 g of gelatin and 3 g of sodium chloride in 1,000 ml of water and kept at a temperature of 75° C. for 40 minutes. As a result, a monodisperse emulsion of dye-adsorbed cubic particulate silver bromochloride having an average grain size of 0.35 μm (bromine: 80 mol %) was obtained.

The emulsion thus obtained was then washed with water and desalted. 5 mg of sodium thiosulfate and 20 mg of 4-hydroxy-6-methyl-1,3,3a,7-tetrazaindene were added to the emulsion thus processed. The emulsion was chemically sensitized at a temperature of 60° C. The yield of the desired emulsion was 600 g.

| Dye Solution (I) | |
|---|---|
| 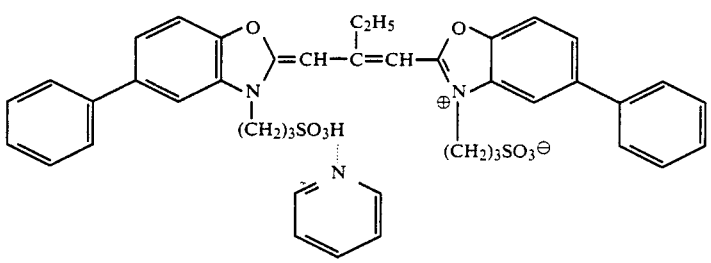 | 160 mg |
| Methanol | 400 ml |

The preparation of a silver halide emulsion for 5th layer will be described hereinafter.

1,000 ml of an aqueous solution containing potassium iodide and potassium bromide and an aqueous solution of silver nitrate which had been prepared by dissolving 1 mol of silver nitrate in 1,000 ml of water were added at the same time to a well stirred aqueous solution which had been prepared by dissolving 20 g of gelatin and ammonia in 1,000 ml of water and kept at a temperature of 50° C., and the pAg value of the system was kept constant. As a result, a monodisperse emulsion of octahedral particulate silver bromoiodide having an average grain size of 0.5 μm (iodine: 5 mol %) was obtained.

The emulsion thus obtained was then washed with water and desalted. 5 mg of chloroauric acid (tetrahydrate) and 2 mg of sodium thiosulfate were added to the emulsion thus processed. The emulsion was subjected to gold and sulfur sensitization at a temperature of 60° C. The yield of the desired emulsion was 1.0 kg.

The preparation of a gelatin dispersion of a dye providing substance will be described hereinafter.

18 g of a yellow dye providing substance (1) of the undermentioned structure, $2.2\times10^{-2}$ mol of a reductive substance ED-1, and 9 g of a high boiling solvent (*4) were weighed and combined. 46 ml of cyclohexanone was added to the admixture. The admixture was then heated to a temperature of about 60° C. to prepare a uniform solution. To the solution thus obtained, 100 g of a 10% solution of lime-treated gelatin and 1.5 g of sodium dodecylbenzenesulfonate were mixed with stirring. The admixture was then subjected to dispersion by means of a homogenizer at 10,000 rpm for 10 minutes. The dispersion thus obtained is referred to hereafter as a dispersion of a yellow dye providing substance.

A dispersion of a magenta dye providing substance and a dispersion of a cyan dye providing substance were similarly prepared from a magenta dye providing substance (7) and a cyan dye providing substance (8), respectively.

With these emulsions and dispersions, a multilayer color light-sensitive material 101 shown in Table 1 was prepared.

Light-sensitive materials 102 to 105 having the similar construction were prepared in the same manner as in the light sensitive material 101 except that compounds of the present invention shown in Table 2 were added to the 1st layer, 3rd layer, and 5th layer in the light-sensitive material 101 in amounts of 0.5 molar time that of the respective dye providing substances.

ED-1

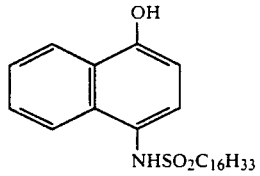

TABLE 1

| | |
|---|---|
| 6th Layer: | |
| Gelatin | 80 mg/m² |
| Film hardener*6 | 100 mg/m² |
| Silica* | 100 mg/m² |
| Zinc hydroxide*7 | 300 mg/m² |
| 5th Layer: Blue-sensitive emulsion layer | |
| Silver bromoiodide emulsion (iodine: 5 mole %) | 500 mg/m² as silver |
| Yellow dye providing substance (1) | 400 mg/m² |
| Gelatin | 1,000 mg/m² |
| Electron donor ED-1 | 277 mg/m² |
| 1,5-Diphenyl-3-pyrazolidone | 60 mg/m² |
| High boiling solvent*4 | 200 mg/m² |
| Surface active agent*2 | 100 mg/m² |
| 4th Layer: Interlayer | |
| Gelatin | 800 mg/m² |
| Zinc hydroxide*7 | 300 mg/m² |

TABLE 1-continued

| | |
|---|---|
| 3rd Layer: Green-sensitive emulsion Layer | |
| Silver bromochloride emulsion (bromine: 80 mol %) | 400 mg/m² as silver |
| Magenta dye providing substance (7) | 400 mg/m² |
| Gelatin | 1,000 mg/m² |
| Electron donor ED-1 | 277 mg/m² |
| 1,5-Diphenyl-3-pyrazolidone | 50 mg/m² |
| High boiling solvent*4 | 200 mg/m² |
| Surface active agent*2 | 100 mg/m² |
| 2nd Layer: Interlayer | |
| Gelatin | 800 mg/m² |
| Zinc hydroxide*7 | 300 mg/m² |
| 1st Layer: Red-sensitive emulsion layer | |
| Silver bromochloride emulsion (bromine: 80 mol %) | 350 mg/m² as silver |
| Sensitizing dye*3 | $8\times10^{-7}$ mol/m² |
| Cyan dye providing substance (8) | 300 mg/m² |
| Gelatin | 1,000 mg/m² |
| Electron donor ED-1 | 208 mg/m² |
| 1,5-Diphenyl-3-pyrazolidone | 50 mg/m² |
| High boiling solvent*4 | 150 mg/m² |
| Surface active agent*2 | 100 mg/m² |
| Support*1 | |

*1 Polyethylene terephthalate (film thickness: 100 μm)

*2

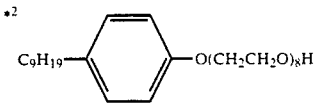

*3

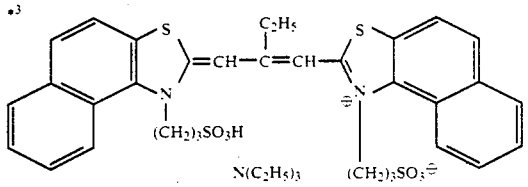

*4

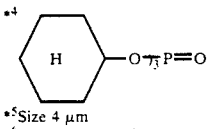

*5 Size 4 μm

*6 1,2-Bis(vinyl sulfonylacetamide)ethane

*7 Size 0.2 μm

The preparation of a dye fixing material will be described hereinafter.

63 g of gelatin, 130 g of a mordant of the undermentioned structure, and 80 g of guanidine picolate were dissolved in 1,300 ml of water. The solution thus obtained was coated on a paper support laminated with polyethylene in an amount such that the wet film thickness reached 45 μm. The film thus coated was then dried.

Mordant

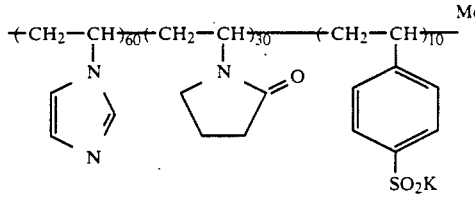

A solution of 35 g of gelatin and 1.05 g of 1,2-bis(vinyl sulfonylacetamide)ethane in 800 ml of water was coated on the film thus obtained in an amount such that the wet film thickness reached 17 μm. The film thus coated was then dried. As a result, a dye fixing material was prepared.

The multilayered color light-sensitive material was then exposed to a light of 2,000 lux from a tungsten lamp through blue, green, red, and grey color separation filters having a density gradation.

The emulsion surface of the light-sensitive material thus exposed was supplied with 15 ml/m$^2$ of water through a wire bar. The light-sensitive material was then laminated with the dye fixing material in such a manner that the film surface of the two materials faced each other.

The laminate was heated for 25 seconds by means of a heat roller whose temperature had been adjusted so as to keep the temperature of the water-absorbed film at 80° C. The light-sensitive material was then peeled off the dye fixing material. As a result, blue, green, red, and grey sharp images corresponding to the blue, green, red, and grey color separation filters, respectively, on the dye fixing material were obtained.

The maximum density ($D_{max}$) and the minimum density ($D_{min}$) of cyan, magenta, and yellow on the grey portion were measured. The results are shown in Table 2.

TABLE 2

| Light-sensitive Material No. | Present Compound No. | Dmax | | | Dmin | | |
|---|---|---|---|---|---|---|---|
| | | Yellow | Magenta | Cyan | Yellow | Magenta | Cyan |
| 101 | None (control) | 1.50 | 1.62 | 1.70 | 0.26 | 0.30 | 0.32 |
| 102 | AF-3 | 1.98 | 2.00 | 2.20 | 0.22 | 0.25 | 0.26 |
| 103 | AF-6 | 2.01 | 2.10 | 2.30 | 0.21 | 0.24 | 0.25 |
| 104 | AF-9 | 2.11 | 2.20 | 2.38 | 0.20 | 0.23 | 0.24 |
| 105 | AF-36 | 1.96 | 2.02 | 2.18 | 0.22 | 0.25 | 0.26 |

Table 2 shows that the use of the present compounds can provide images having a high density and a low stain.

The analysis of the amount of reduced silver in the unexposed portions on the light-sensitive materials showed that the light-sensitive materials 102 to 105 were ⅓ or less of the light-sensitive material 101 in the amount of reduced silver. It was thus found that the use of the present compounds can help release an antifoggant during heat development, inhibiting development fog.

EXAMPLE 2

Light-sensitive materials 201 and 202 having the same construction as the light-sensitive materials 101 and 102 were prepared in the same manner as in the light-sensitive materials 101 and 102 except that the dye providing substances (1), (7), and (8) were replaced by the dye providing substances (10), (2), and (13) in the same amounts, respectively. Furthermore, light-sensitive materials 203 and 204 having the same construction as the light-sensitive materials 101 and 102 were prepared in the same manner as in the light-sensitive materials 101 and 102 except that the reductive substance ED-1 was replaced by the undermentioned reductive substance ED-2 in the same molar amount, respectively. These light-sensitive materials were then processed with the dye fixing material in accordance with the same processing step in Example 1 except that heat development and transfer steps were effected at a temperature of 90° C. for 20 seconds. As a result, photographic properties shown in Table 3 were obtained.

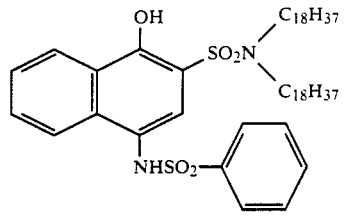

ED-2

TABLE 3

| Light-sensitive Material No. | Present Compound No. | Dmax | | | Dmin | | |
|---|---|---|---|---|---|---|---|
| | | Yellow | Magenta | Cyan | Yellow | Magenta | Cyan |
| 201 | None (control) | 1.52 | 1.63 | 1.75 | 0.25 | 0.29 | 0.29 |
| 202 | AF-3 | 2.05 | 2.20 | 2.39 | 0.20 | 0.20 | 0.24 |
| 203 | None (control) | 1.40 | 1.52 | 1.69 | 0.28 | 0.31 | 0.32 |
| 204 | AF-3 | 1.93 | 2.06 | 2.16 | 0.21 | 0.23 | 0.23 |

Table 3 shows that the light-sensitive materials comprising the present compounds provide an image having a high density and a low stain.

EXAMPLE 3

A color light-sensitive material 301 shown in Table 4 was prepared, comprising the same emulsion, dye providing substance, and reductive substance as used in the light-sensitive material 101 of Example 1.

A light-sensitive material 302 having the same construction as the light-sensitive material 301 was prepared except that the present compound (AF-3) was added to each of 1st layer, 3rd layer, and 5th layer of the light-sensitive material 301 in a molar amount of 0.5 time that of the respective dye providing substance.

Furthermore, an organic silver salt emulsion was prepared as follows.

20 g of gelatin and 5.9 g of 4-acetylaminophenylpropiolic acid were dissolved in 1,000 ml of a 0.1% aqueous solution of sodium hydroxide and 200 ml of ethanol.

The solution was stirred while keeping at a temperature of 40° C.

A solution of 4.5 g of silver nitrate in 200 ml of water was added to the solution over 5 minutes.

The pH of the dispersion was adjusted to precipitate excess salts which were then removed. The pH of the solution was adjusted to 6.3. As a result, 300 g of a dispersion of an organic silver salt was obtained.

TABLE 4

| | |
|---|---|
| 6th Layer: | |
| Gelatin | 100 mg/m$^2$ |
| Base precursor*3 | 500 mg/m$^2$ |
| Film hardener*6 | 100 mg/m$^2$ |
| 5th Layer: Blue-sensitive emulsion layer | |
| Silver bromoiodide emulsion (iodine: 5 mol %) | 400 mg/m$^2$ as silver |
| Dimethylsulfamide | 180 mg/m$^2$ |
| Organic silver salt emulsion | 100 mg/m$^2$ as silver |
| Base precursor*3 | 200 mg/m$^2$ |
| Yellow dye providing substance (1) | 400 mg/m$^2$ |
| Gelatin | 1,300 mg/m$^2$ |
| ED-1 | 277 mg/m$^2$ |
| 1,5-Diphpenyl-3-pyrazolidone | 60 mg/m$^2$ |

TABLE 4-continued

| | |
|---|---|
| High boiling solvent*4 | 800 mg/m² |
| Surface active agent*2 | 100 mg/m² |
| 4th Layer: Interlayer | |
| Gelatin | 1,200 mg/m² |
| Base precursor*7 | 500 mg/m² |
| 3rd Layer: Green-sensitive emulsion Layer | |
| Silver bromochloride emulsion (bromine: 80 mole %) | 300 mg/m² |
| Dimethylsulfamide | 180 mg/m² |
| Organic silver salt emulsion | 100 mg/m² as silver |
| ED-1 | 277 mg/m² |
| Base precursor*3 | 200 mg/m² |
| 1,5-Diphenyl-3-pyrazolidone | 50 mg/m² |
| Magenta dye providing substance (2) | 400 mg/m² |
| Gelatin | 1,200 mg/m² |
| High boiling solvent*4 | 600 mg/m² |
| Surface active agent*2 | 100 mg/m² |
| 2nd Layer: Interlayer | |
| Gelatin | 1,000 mg/m² |
| Base precursor*7 | 500 mg/m² |
| 1st Layer: Red-sensitive emulsion layer | |
| Silver bromochloride emulsion (bromine: 80 mol %) | 300 mg/m² as silver |
| Benzenesulfonamide | 180 mg/m² |
| Organic silver salt emulsion | 100 mg/m² as silver |
| Sensitizing dye*5 | 8 × 10⁻⁷ mol/m² |
| Base precursor*3 | 200 mg/m² |
| ED-1 | 208 mg/m² |
| 1,5-Diphenyl-3-pyrazolidone | 50 mg/m² |
| Cyan dye providing substance (8) | 300 mg/m² |
| Gelatin | 1,200 mg/m² |
| High boiling solvent*4 | 450 mg/m² |
| Surface active agent*2 | 100 mg/m² |
| Support*1 | |

*1 Polyethylene terephthalate (film thickness: 100 μm)

*2

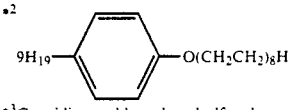

*3 Guanidine p-chlorophenylsulfonylacetate

*4 $(iso—C_9H_{19}O)_3P=O$

*5

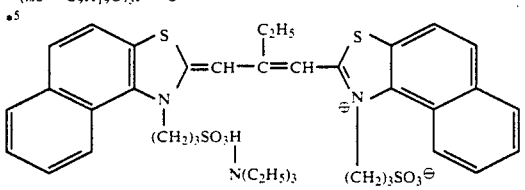

*6 1,2-Bis(vinyl sulfonylacetamide)ethane

The preparation of a dye fixing material will be described hereinafter.

10 g of poly(methyl acrylate-co-N,N,N-trimethyl-N-vinylbenzylammonium chloride) (ratio of methyl acrylate to vinylbenzylammonium chloride: 1:1) was dissolved in 200 ml of water. The solution was uniformly mixed with 100 g of 10% lime-treated gelatin. A film hardener was added to the mixed solution. The mixed solution was then uniformly coated on a paper support laminated with polyethylene containing titanium dioxide dispersed therein in an amount such that the wet film thickness reached 90 μm. The specimen was dried. The specimen thus dried was used as a dye fixing material comprising a mordant layer.

After being exposed to light as in Example 1, the specimen was uniformly heated for 20 seconds over a heat block which had been heated to a temperature of 150° C.

The film surface of the dye fixing material was supplied with 20 ml/m² of water. The light-sensitive material thus heated and the dye fixing material were laminated in such a manner that the film surface of the two materials faced each other.

The laminate was then heated for 6 seconds over a heat block which had been heated to a temperature of 80° C. The dye fixing material was then peeled off the light-sensitive material. As a result, color images were obtained on the dye fixing material.

The photographic properties are shown in Table 5.

TABLE 5

| Light-sensitive Material No. | Present Compound No. | Dmax Yellow | Dmax Magenta | Dmax Cyan | Dmin Yellow | Dmin Magenta | Dmin Cyan |
|---|---|---|---|---|---|---|---|
| 301 | None (control) | 1.39 | 1.58 | 1.62 | 0.44 | 0.58 | 0.60 |
| 302 | AF-3 | 2.00 | 2.08 | 2.21 | 0.24 | 0.26 | 0.29 |

The above results show that the light-sensitive material comprising the present compounds can provide images having a high density and a low stain.

EXAMPLE 4

A light-sensitive material 401 was prepared by coating sequentially the below mentioned layers on a transparent polyethylene terephthalate support.

(I) A dye receiving layer containing:
- a) copoly[styrene-N-vinylbenzyl-N,N,N-trihexylammonium chloride] (4.0 g/m²) and
- b) gelatin (4.0 g/m²).

(II) A white reflecting layer containing:
- a) titanium dioxide (22 g/m²) and
- b) gelatin (2.2 g/m²).

(III) An opaque layer containing:
- a) carbon black (2.7 g/m²) and
- b) gelatin (2.7 g/m²).

(IV) A cyan dye providing layer containing:
- a) gelatin dispersion of a cyan dye providing compound (15) (0.33 mmol/m²) and ED-1 (0.4 mmol/m²) and
- b) gelatin (including that in the component a) (1.1 g/m²).

(V) A red-sensitive layer containing:
- a) a red-sensitive silver bromoiodide emulsion (0.5 g-Ag/m²) and
- b) gelatin (including that in the component a) (1.1 g/m²).

(VI) An interlayer containing:
- a) 2,5-di(t-pentadecyl)hydroquinone (0.82 g/m²),
- b) vinyl acetate (0.8 g/m²), and
- c) gelatin (0.4 g/m²).

(VII) A magenta dye providing layer containing:
- a) gelatin dispersion of a magenta dye providing compound (2) (0.3 mmol/m²) and ED-1 (0.4 mmol/m²) and
- b) gelatin (including that in the component a) (1.1 g/m²).

(VIII) A green sensitive layer containing:
- a) green-sensitive silver bromoiodide emulsion (0.5 g-Ag/m²) and
- b) gelatin (including that in the component a) (1.1 g/m²).

(IX) Same as the interlayer (VI)

(X) A yellow dye providing layer containing:

a) gelatin dispersion of a yellow dye providing compound (10) (0.5 mmol/m$^2$) and ED-1 (0.6 mmol/m$^2$) and b) gelatin (including that in the component a) (1.1 g/m$^2$).

(XI) A blue-sensitive layer containing:

a) blue-sensitive silver bromoiodide emulsion (0.5 g/m$^2$) and b) gelatin (including that in the component a) (1.1 g/m$^2$).

(XII) A protective layer containing:

a) latex of polyethylene acrylate (0.9 g/m$^2$), b) Tinuvin® (0.5 g/m$^2$), c) triacryloyl perhydrotriazine as film hardener (0.026 g/m$^2$), and d) gelatin (1.3 g/m$^2$).

A light-sensitive material 402 having the same composition as the light-sensitive material 401 was prepared in the same manner as in the light-sensitive material 401 except that the compound AF-9 of the present invention was added to the (IV) layer, (VII) layer, and (X) layer of the light-sensitive material 401 in a molar amount of 0.4 time that of the respective dye providing substance.

A cover sheet was prepared by sequentially coating the undermentioned layers on a transparent polyethyleneterephthalate film.

(I) An acid neutralization layer containing:

a) polyacrylic acid (17 g/m$^2$), b) N-hydroxysuccinimidobenzene sulfonate (0.06 g/m$^2$), and c) ethylene glycol (0.5 g/m$^2$).

(II) A timing layer comprising a 2-μm thick coat of cellulose acetate (degree of acetylation: 54%).

(III) A timing layer comprising a 4-μm thick coat of a latex of copolymer of vinylidene chloride and acrylic acid.

A processing solution having the undermentioned composition was prepared.

| | |
|---|---|
| Potassium hydroxide | 48 g |
| 4-Hydroxymethyl-4-methyl-1-p-tolyl-3-pyrazolidinone | 10 g |
| 5-Methylbenzenetriazole | 1.5 g |
| Sodium sulfite | 1.5 g |
| Potassium bromide | 1 g |
| Benzyl alcohol | 1.5 ml |
| Carboxymethyl cellulose | 6.1 g |
| Carbon black | 150 g |
| Water to make | 1 l |

The light-sensitive materials 401 and 402 were exposed to light through a wedge. The cover sheet was then superimposed on these light-sensitive materials thus exposed. The above described processing solution was uniformly spread over between the two sheets to a thickness of 80 μm by means of a pair of superposed rollers.

One hour after processing, sensitometry was conducted. The results are shown in Table 6.

TABLE 6

| Light-sensitive Material No. | Present Compound No. | Dmax | | | Dmin | | |
|---|---|---|---|---|---|---|---|
| | | Yellow | Magenta | Cyan | Yellow | Magenta | Cyan |
| 401 | None (control) | 1.58 | 1.70 | 1.98 | 0.24 | 0.25 | 0.38 |
| 402 | AF-9 | 1.96 | 2.01 | 2.22 | 0.22 | 0.24 | 0.29 |

Thus, a color image having less stain in the white background and a higher transfer density was obtained.

EXAMPLE 5

The preparation of a gelatin dispersion of a dye providing substance will be described hereinafter.

20 ml of cyclohexanone was added to 5.5 g of a dye providing substance (30), 6 g of a reductive substance of the structural formula:

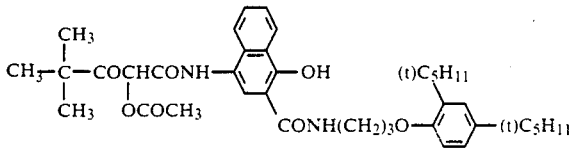

0.5 g of succinic acid-2-ethyl-sodium hexylestersulfonate, and 5 g of tri-cresyl phosphate (TCP). The admixture was heated to a temperature of about 60° C. to further dissolution. The solution and 100 g of a 10% gelatin solution were mixed with stirring. The mixture was then subjected to homogenization by means of a homogenizer at 10,000 rpm for 10 minutes.

The preparation of light-sensitive coating solution will be described hereinafter.

| | | |
|---|---|---|
| (a) | Silver bromochloride emulsion (emulsion for 1st layer in Example 1) | 10 g |
| (b) | Dispersion of a dye providing substance | 3.5 g |
| (c) | 5% aqueous solution of compound of the formula: 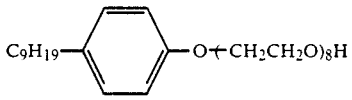 | 1.5 ml |
| (d) | Basic zinc carbonate (20% aqueous dispersion) | 3.0 g |
| (e) | 4-Hydroxymethyl-4-methyl-1-phenyl-3-pyrazolidone (3% methanol solution) | 1 ml |

The above described components (a) to (e) were mixed and heated to further dissolution. The coating solution thus prepared was then coated on a polyethylene terephthate film to a wet film thickness of 30 μm and dried.

A protective layer having the undermentioned composition was coated on the film thus coated to a wet film thickness of 30 μm and dried to prepare a light-sensitive material 501.

| | | |
|---|---|---|
| (a) | Gelatin (10% aqueous solution) | 30 g |
| (b) | 2% Aqueous solution of 1,2-bis-(vinyl sulfonylacetamide)ethane | 5 ml |
| (c) | Water | 70 ml |

A light-sensitive material 502 was prepared in the same manner as in the light-sensitive material 501 except that the present compound AF-9 was added to a gelatin dispersion of a dye providing substance of the light-sensitive material 501 in a molar amount of 0.4 time that of the dye providing substance.

These light-sensitive materials were then image-wise exposed to a light of 2,000 lux from a tungsten lamp for 1 second.

As a dye fixing material there was used the same dye fixing material as in Example 1.

The light sensitive materials 501 and 502 were wetted by immersing in water. These light-sensitive materials were squeezed to remove surface water. These light-sensitive materials were then laminated with the dye fixing material in such a manner that the film surface of the two sheets faced each other.

The laminate was then heated for 20 seconds by means of a press which had been temperature-adjusted so as to keep the temperature of the film at 80° C. The light-sensitive material was then peeled off the dye fixing element.

The image density of images on the dye fixing material was measured. The results are shown below.

| Light-sensitive Material No. | Maximum Density | Minimum Density |
|---|---|---|
| 501 (control) | 1.65 | 0.24 |
| 502 | 2.03 | 0.22 |

With the present compound, an image having a high maximum density and a low stain was obtained.

EXAMPLE 6

Light-sensitive materials 601 to 605 having the same construction as the light-sensitive material 101 were prepared in the same manner as in the light-sensitive material 101 except that the present compounds AF-76, AF-91, AF-96, AF-97, and AF-98 were separately added to each of 1st layer, 3rd layer, and 5th layer of the light-sensitive material 101 in Example 1 in a molar amount of 0.5 time that of the respective dye providing substance.

These light-sensitive materials were processed with the same dye fixing material as used in Example 1 in the same manner as in Example 1. As a result, the light-sensitive materials 601 to 605 provided a higher $D_{max}$ and a lower $D_{min}$ than the light-sensitive material 101.

EXAMPLE 7

Light-sensitive materials 701 and 702 having the same construction as the light-sensitive material 201 except that the present compound AF-10 or AF-98 was added to each of 2nd layer and 4th layer of the light-sensitive material 201 in Example 2 in an amount of 0.2 mmol/m$^2$.

These light-sensitive materials were processed in the same manner as in Example 2. Photographic properties shown in Table 7 were obtained.

TABLE 7

| Light-sensitive Material No. | Present Compound No. | Dmax | | | Dmin | | |
|---|---|---|---|---|---|---|---|
| | | Yellow | Magenta | Cyan | Yellow | Magenta | Cyan |
| 201 | None (control) | 1.52 | 1.63 | 1.75 | 0.25 | 0.29 | 0.29 |
| 701 | AF-10 | 1.95 | 2.03 | 2.10 | 0.22 | 0.24 | 0.26 |
| 702 | AF-98 | 1.90 | 2.00 | 2.02 | 0.23 | 0.24 | 0.27 |

Thus, it was found that the present compounds can exert the effect even when added to an interlayer.

While the invention has been described in detail and with reference to specific embodiments thereof, it will be apparent to one skilled in the art that various changes and modifications can be made therein without departing from the spirit and scope thereof.

What is claimed is:

1. A color light-sensitive material, comprising on a support at least a light-sensitive silver halide, a binder, a dye providing substance which provides a mobile dye in inverse relationship to the reduction reaction of silver ion to silver, and a development inhibitor precursor of the general formula (II):

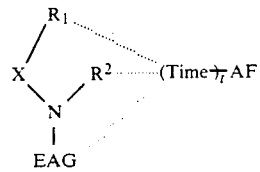

(II)

wherein AF represents a group which serves as a development inhibitor after being released; wherein EAG represents an electron accepting group; N represents a nitrogen atom; X represents an oxygen atom (—O—), sulfur atom (—S—), or a nitrogen atom-containing group,

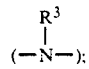

$R^1$, $R^2$ and $R^3$ each represents a simple bond or a group other than a hydrogen atom, with the proviso that any two of $R^1$, $R^2$, $R^3$, and EAG may be bonded to each other to form a ring; Time represents a group which releases AF through a reaction triggered by the cleavage of the N—X bond; t represents an integer of 0 or 1; the solid lines indicate a bond; and the broken lines indicate that at least one thereof represents a bond; wherein the dye providing substance is a positive dye providing substance represented by general formula (CII); wherein the N—X bond is reduced by a reductive substance to undergo cleavage which causes the release of a mobile dye;

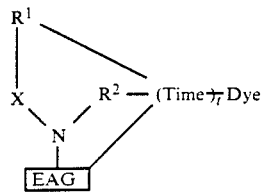

(CII)

wherein Dye represents a group providing a compound which serves as a mobile dye after being reduced; and $R^1$, $R^2$, EAG, Time, t, N, X, broken lines, and solid lines have the same meanings as defined in the general formula (II), and wherein the amount of the compound of general formula (II) is from $1\times10^{-3}$ to $1\times10^{2}$ mols per mol of the positive dye providing substance.

2. A color light-sensitive material as in claim 1, wherein said compound of the general formula (II) is represented by the general formula (III):

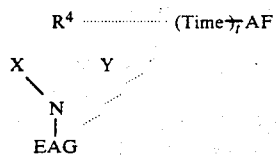

(III)

wherein Y represents a divalent connecting group; $R^4$ represents an atomic group which is bonded to X and Y to form a five- to eight-membered heterocyclic ring together with nitrogen atom; and N, X, EAG, Time, t, and AF are as defined in claim 1.

3. A color light-sensitive material as in claim 1, wherein X is an oxygen atom.

4. A color light-sensitive material as in claim 1, wherein $R^1$ and $R^3$ are each substituted or unsubstituted alkyl group, a substituted or unsubstituted aryl group, a substituted or unsubstituted heterocyclic residual group, a substituted or unsubstituted acyl group, or a substituted or unsubstituted sulfonyl group; $R^2$ is a substituted or unsubstituted acyl group or a substituted or unsubstituted sulfonyl group; and any two of $R^1$, $R^2$ and $R^3$ may be bonded to each other to form a 5-membered to 8-membered ring.

5. A color light-sensitive material as in claim 1, wherein AF represents a mercapto group bonded to a heterocyclic ring selected from the group consisting of a substituted or unsubstituted mercapto azole, a substituted or unsubstituted mercapto azaindene, and a substituted or unsubstituted mercapto pyrimidine.

6. A color light-sensitive material as in claim 1, wherein AF comprises a heterocyclic compound capable of producing imino silver selected from the group consisting of substituted or unsubstituted benzotriazoles, substituted or unsubstituted indazoles, and substituted or unsubstituted benzimidazoles.

7. A color light-sensitive material as in claim 1, wherein AF represents a development inhibitor which is released from an oxidation-reduction nucleus in the general formula (I) by a reaction following an oxidation-reduction reaction in the development step.

8. A color light-sensitive material as in claim 7, wherein AF is selected from the group consisting of 1-(3-phenoxycarbonylphenyl)-5-mercaptotetrazole, 1-(4-phenoxycarbonylphenyl)-5-mercaptotetrazole, 1-(3-maleimidophenyl)-5-mercaptotetrazole, 5-(phenoxycarbonyl)benzotriazole, 5-(p-cyanophenoxycarbonyl)benzotriazole, 2-phenoxycarbonylmethylthio-5-mercapto-1,3,4-thiadiazole, 5-nitro-3-phenoxycarbonylindazole, 5-phenoxycarbonyl-2-mercaptobenzimidazole, 5-(2,3-dichloropropyloxycarbonyl)benzotriazole, 5-benzyloxycarbonylbenzotriazole, 5-(butylcarbamoylmethoxycarbonyl)benzotriazole, 5-(butoxycarbonylmethoxycarbonyl)benzotriazole, 1-(4-benzoyloxyphenyl)-5-mercaptotetrazole, 5-(2-methanesulfonylethoxycarbonyl)-2-mercaptobenzothiazole, 1-[4-(2-chloroethoxycarbonyl)phenyl]-2-mercaptoimidazole, 2-[3-(thiophene-2-ylcarbonyl)propyl]thio-5-mercapto-1,3,4-thiadiazole, 5-cinnamoylaminobenzotriazole, 1-(3-vinylcarbonylphenyl)-5-mercaptotetrazole, 5-succinimidomethylbenzotriazole, 2-[4-succinimidophenyl]-5-mercapto-1,3,4-oxadiazole, 3-[4-(benzo-1,2-isothiazole-3-oxo-1,1-dioxy-2-yl)phenyl]-5-mercapto-4-methyl-1,2,4-triazole, and 6-phenoxycarbonyl-2-mercaptobenzoxazole.

9. A color light-sensitive material as in claim 1, wherein the development inhibitor precursor of the general formula (I) is present in an amount of from $1\times10^{-7}$ to 1 mol per mol of silver halide or $1\times10^{-3}$ to $1\times10^{-2}$ mol per mol of positive dye providing substance.

10. The color light-sensitive material as in claim 1, wherein the amount of the compound of general formula (II) is from $1\times10^{-2}$ to 10 mols per mol of the positive dye providing substance.

* * * * *